US012686313B2

(12) United States Patent        (10) Patent No.:  US 12,686,313 B2

Mizoi et al.        (45) Date of Patent:        Jul. 21, 2026

(54) CONVEYANCE SEAT

(71) Applicant: TS TECH CO., LTD., Asaka (JP)

(72) Inventors: Kensuke Mizoi, Tochigi (JP); Naoya Nishimoto, Tochigi (JP); Yudai Matsui, Tochigi (JP); Takanori Yamaguchi, Tochigi (JP); Naoto Yamauchi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/261,945

(22) PCT Filed: Jan. 20, 2022

(86) PCT No.: PCT/JP2022/002071

§ 371 (c)(1),
(2) Date: Jul. 18, 2023

(87) PCT Pub. No.: WO2022/158546

PCT Pub. Date: Jul. 28, 2022

(65) Prior Publication Data

US 2024/0300395 A1        Sep. 12, 2024

Related U.S. Application Data

(60) Provisional application No. 63/212,380, filed on Jun. 18, 2021, provisional application No. 63/139,967, filed on Jan. 21, 2021.

(30) Foreign Application Priority Data

Jan. 29, 2021  (JP) ................................ 2021-013846

(51) Int. Cl.
B60N 2/02        (2006.01)
B60N 2/22        (2006.01)
(Continued)

(52) U.S. Cl.
CPC ............. B60N 2/914 (2018.02); B60N 2/026 (2023.08); B60N 2/2222 (2013.01); B60N 2/66 (2013.01)

(58) Field of Classification Search
CPC ....... B60N 2/914; B60N 2/2222; B60N 2/026
See application file for complete search history.

(56) References Cited

U.S. PATENT DOCUMENTS 9,809,131 B2 *  11/2017  Line ................... B60N 2/02246
10,427,554 B2 *  10/2019  Ketels .................. B60N 2/0273
(Continued)

FOREIGN PATENT DOCUMENTS

CN        113635817 A  *  11/2021  .......... B60N 2/0224
DE        10248537 A1 *  5/2004   .......... B60N 2/0277
(Continued)

OTHER PUBLICATIONS

Japanese Notice of Reasons for Refusal (w/ English translation) for corresponding Application No. 2022-028368, dated Jan. 23, 2024, 16 pages.
(Continued)

*Primary Examiner* — Timothy J Brindley
(74) *Attorney, Agent, or Firm* — Dority & Manning, P.A.

(57)        ABSTRACT

Provided is a conveyance seat that can be appropriately changed in shape so that a seated occupant can take a comfortable posture. The conveyance seat includes a seat back frame; a skin material covering the seat back frame; movable bodies arranged between the seat back frame and the skin material and protruding forward with respect to the seat back frame; and a control device controlling movements of the movable bodies. The movable bodies have the right and left shoulder movable bodies arranged at upper parts of the seat back frame, and the lumbar movable body arranged below the shoulder movable bodies in the seat back frame, (Continued)

and the control device controls the amount of protrusion of one of the shoulder movable body and the lumbar movable body based on the amount of protrusion of the other.

11 Claims, 47 Drawing Sheets

(51) Int. Cl.
   B60N 2/66        (2006.01)
   B60N 2/90        (2018.01)

(56)                References Cited

U.S. PATENT DOCUMENTS

| | | | |
|---|---|---|---|
| 2007/0193279 | A1 | 8/2007 | Yoneno et al. |
| 2013/0300179 | A1 | 11/2013 | Ota |
| 2014/0015234 | A1 | 1/2014 | Nukaya |
| 2016/0368405 | A1 | 12/2016 | Ishii et al. |
| 2017/0057385 | A1 | 3/2017 | Kanto et al. |
| 2017/0057386 | A1 | 3/2017 | Kanto |
| 2017/0088029 | A1 | 3/2017 | Mizoi et al. |
| 2017/0349061 | A1* | 12/2017 | Benson ................ B60N 2/1615 |
| 2018/0086238 | A1 | 3/2018 | Onuma et al. |
| 2018/0178698 | A1 | 6/2018 | Izukawa |
| 2018/0222350 | A1* | 8/2018 | Hirayama .............. B60N 2/162 |
| 2018/0257534 | A1 | 9/2018 | Mizoi et al. |
| 2019/0241099 | A1* | 8/2019 | Sugiyama ................ B60N 2/99 |
| 2019/0283639 | A1* | 9/2019 | Mizoi .................... B60N 2/914 |
| 2019/0359161 | A1* | 11/2019 | Ogiso ..................... G10L 25/78 |
| 2020/0031257 | A1 | 1/2020 | Okimura et al. |
| 2020/0130551 | A1 | 4/2020 | Mizoi et al. |
| 2020/0282878 | A1* | 9/2020 | Gandhi ................ B60N 2/4279 |
| 2021/0146814 | A1 | 5/2021 | Mizoi et al. |
| 2021/0237620 | A1 | 8/2021 | Mizoi |
| 2021/0316691 | A1* | 10/2021 | Ito ............................ B60N 2/22 |
| 2021/0331612 | A1 | 10/2021 | Sakota et al. |
| 2021/0380021 | A1* | 12/2021 | Fu ........................ B60N 2/0273 |
| 2023/0249599 | A1* | 8/2023 | Nicola ..................... B60N 2/56 297/284.6 |
| 2024/0217420 | A1* | 7/2024 | Roth ........................ B60N 2/62 |

FOREIGN PATENT DOCUMENTS

| | | | | | |
|---|---|---|---|---|---|
| DE | 102017214313 | A1 * | 2/2019 | ........... | B60N 2/5685 |
| EP | 2774805 | | 9/2014 | | |
| EP | 3575144 | A1 * | 12/2019 | ............. | B60N 2/914 |
| EP | 3822167 | A1 * | 5/2021 | ........... | B64D 11/064 |
| FR | 2867725 | A1 * | 9/2005 | ........... | B60N 2/2222 |
| JP | H06286508 | A | 10/1994 | | |
| JP | 2005253493 | A | 9/2005 | | |
| JP | 2009172145 | A | 8/2009 | | |
| JP | 2013095373 | | 5/2013 | | |
| JP | 2013233860 | A | 11/2013 | | |
| JP | 2013244922 | A | 12/2013 | | |
| JP | 2014083916 | A | 5/2014 | | |
| JP | 2014148235 | | 8/2014 | | |
| JP | 2014151062 | A | 8/2014 | | |
| JP | 2015054573 | A | 3/2015 | | |
| JP | 2015143067 | | 8/2015 | | |
| JP | 2015193312 | A | 11/2015 | | |
| JP | 2018051151 | A | 4/2018 | | |
| JP | 2018075872 | A | 5/2018 | | |
| JP | 2018140777 | | 9/2018 | | |
| JP | 2018144721 | | 9/2018 | | |
| JP | 2020001695 | | 1/2020 | | |
| JP | 2020023322 | | 2/2020 | | |
| JP | 2020050269 | | 4/2020 | | |
| JP | 2020066404 | A | 4/2020 | | |
| JP | 2020110702 | | 7/2020 | | |
| JP | 2023001005 | A | 1/2023 | | |
| KR | 20190058969 | | 5/2019 | | |
| WO | WO-2021170536 | A1 * | 9/2021 | ............. | B60N 2/914 |
| WO | WO-2021215434 | A1 * | 10/2021 | ............. | B60N 2/682 |

OTHER PUBLICATIONS

PCT International Search Report (w/ English translation) and Written Opinion for corresponding PCT Application No. PCT/JP2022/002071, mailed Apr. 5, 2022, 9 pages.
Notice of Reasons for Refusal (w/ English translation) for corresponding Japanese Application No. 2022-028368, mailed Sep. 5, 2023, 10 pages.
Japanese Office Action (w/English translation) for corresponding Application No. 2022-576748, dated May 7, 2025, 12 pages.
Japanese Office Action (w/English translation) for corresponding Application No. 2024-156825, dated Dec. 9, 2025, 8 pages.

* cited by examiner

CONVEYANCE SEAT

CROSS REFERENCE TO RELATED APPLICATIONS

This application is the U.S. National Stage entry of International Application No. PCT/JP2022/002071, filed on Jan. 20, 2022, which, in turn, claims priority to U.S. Provisional Patent Application No. 63/139,967, filed on Jan. 21, 2021; Japanese Patent Application No. 2021-013846, filed on Jan. 29, 2021; and U.S. Provisional Patent Application No. 63/212,380, filed on Jun. 18, 2021; all of which are hereby incorporated herein by reference in their entireties for all purposes.

TECHNICAL FIELD

The present invention relates to a conveyance seat. Particularly, the present invention relates to a conveyance seat provided with a movable body.

BACKGROUND ART

A conveyance seat proposed in the related art can be changed in shape in accordance with a seated occupant's body shape. Specifically, a bag body is incorporated in the conveyance seat. Further, the bag body is inflated or deflated by controlling the amount of air to be supplied to the bag body. As a result, the conveyance seat can be partially changed in shape in accordance with the seated occupant's body shape.

PATENT LITERATURE 1 discloses a conveyance seat in which a bag body is incorporated in a side support portion of a seat cushion. Further, in the conveyance seat, cushion side supports can be changed in shape in accordance with a seated occupant's buttocks and thighs.

CITATION LIST

Patent Literature

PATENT LITERATURE 1: JP 2014-148235 A

SUMMARY OF INVENTION

Technical Problem

Further improvements have been desired although seated occupant supportability can be ensured with the conveyance seat disclosed in PATENT LITERATURE 1. That is, it has been desired to improve seated occupant supportability and reduce the seated occupant's fatigue to improve his or her comfort. For example, there has been a demand for a conveyance seat that can be appropriately changed in shape so that a seated occupant can take a comfortable posture.

The present invention has been made in view of the above problems, and an object of the present invention is to provide a conveyance seat that can be appropriately changed in shape so that a seated occupant can take a comfortable posture.

Solution to Problem

The above problems can be solved by means of a conveyance seat of the present invention including: a seat back frame; a skin material covering the seat back frame; a movable body arranged between the seat back frame and the skin material and protruding forward with respect to the seat back frame; and a control device controlling movement of the movable body, in which the movable body has right and left first movable bodies arranged at upper parts of the seat back frame, and a second movable body arranged below the first movable body in the seat back frame, and the control device controls the amount of protrusion of one of the first movable body and the second movable body based on the amount of protrusion of the other.

According to the above configuration, the amount of protrusion of the second movable body is controlled based on the amount of protrusion of the first movable body arranged at the upper part of the seat back frame. As a result, the part of a seated occupant in a stooped-back posture that is bent forward can be supported by, for example, the first movable body protruding, and the second movable body can be deflated in accordance with the amount of protrusion of the first movable body. As a result, the burden on the part of the seated occupant in the stooped-back posture that protrudes rearward is reduced.

In addition, the amount of protrusion of the first movable body is controlled based on the amount of fluctuation of the second movable body arranged at the lower part of the back frame. As a result, the part of a seated occupant in a curved-back posture that is warped forward can be supported by the second movable body by, for example, the second movable body protruding, and the first movable body can be deflated in accordance with the amount of protrusion of the second movable body and the burden on the seated occupant in the curved-back posture is reduced. In this manner, the seated occupant can be appropriately supported in accordance with the posture of the seated occupant. By appropriately changing the shape of the conveyance seat in this manner, the seated occupant can take a comfortable posture.

In addition, preferably, the first movable body is a shoulder movable body supporting an occupant's shoulder, the second movable body is a lumbar movable body supporting the occupant's waist, and, when the amount of protrusion of one of the shoulder movable body and the lumbar movable body is large in controlling protrusion operations of the shoulder movable body and the lumbar movable body, the control device controls the amount of protrusion of the other to decrease.

According to the above configuration, control is performed such that the amount of protrusion of one of the shoulder movable body and the lumbar movable body decreases when the amount of protrusion of the other is large. For example, by the first movable body protruding, it is possible to support both shoulders of a seated occupant in a stooped-back posture and deflate the second movable body in accordance with the amount of protrusion of the first movable body. As a result, the burden on the waist of the seated occupant in the stooped-back posture is reduced.

In addition, the amount of protrusion of the first movable body is controlled based on the amount of fluctuation of the second movable body arranged at the lower part of the back frame. As a result, the waist of a seated occupant in a curved-back posture can be supported by the second movable body by, for example, the second movable body protruding, and the first movable body can be deflated in accordance with the amount of protrusion of the second movable body and the burden on the seated occupant in the curved-back posture is reduced. By appropriately changing the shape of the conveyance seat in this manner, the seated occupant can take a comfortable posture.

In addition, preferably, the movable body has an inflatable and deflatable bag body, and the control device acquires a pressure signal related to pressure applied to the bag body and performs control based on the pressure signal so as to limit the amount of protrusion of the bag body.

According to the above configuration, an excessive inflation of the bag body can be suppressed based on the pressure signal output by the pressure sensor. Therefore, the seated occupant can be appropriately supported in accordance with the seated occupant's posture and body shape, and the seated occupant can take a comfortable posture.

In addition, preferably, the control device acquires a steering angle signal related to a steering angle of a conveyance and controls the amount of protrusion of the movable body in real time based on the steering angle signal.

According to the above configuration, the amount of protrusion of the movable body can be controlled in real time to appropriately correspond to the state of travel of the vehicle. As a result, the seated occupant can take a comfortable posture in response to various states of travel.

In addition, preferably, the first movable bodies have inside first movable bodies arranged on both the right and left sides of the seat back frame in the seat width direction and right and left outside first movable bodies arranged at positions outside the inside first movable bodies in the seat width direction.

According to the above configuration, the outside first movable body is arranged outside the inside first movable body. Therefore, it is possible to appropriately support the seated occupant in accordance with the seated occupant's body shape and appropriately support the seated occupant against the load that is applied in the right to left direction during travel.

In addition, preferably, the seat back frame has right and left lower side frames extending in the up to down direction, right and left upper side frames attached to respective upper end portions of the right and left lower side frames and pivotable in the front to back direction with respect to the lower side frames, and an upper frame connecting the upper side frames, and the first movable body is arranged at a position sandwiched between the right and left upper side frames in the seat width direction.

According to the above configuration, by pivoting the right and left upper side frames pivotable in the front to back direction with respect to the lower side frames, the shape of the conveyance seat can be appropriately changed in accordance with the seated occupant's posture. As a result, the seated occupant can take a comfortable posture.

In addition, preferably, the conveyance seat includes a seat cushion frame, in which the seat back frame is attached to a rear end portion of the seat cushion frame and is pivotable in the front to back direction with respect to the seat cushion frame, and the control device acquires a first pivoting angle signal related to a pivoting angle of the seat back frame with respect to the seat cushion frame and a second pivoting angle signal related to a pivoting angle of the upper side frame with respect to the lower side frame and controls the amount of protrusion of the movable body based on the first pivoting angle signal and the second pivoting angle signal.

According to the above configuration, by controlling the amount of protrusion of the movable body in accordance with the pivoting angle and the center folding angle of the seat cushion frame, the seated occupant can take a comfortable posture.

In addition, preferably, the conveyance seat includes a lifting and lowering mechanism supporting the first movable body to be capable of ascending and descending in the up to down direction with respect to the seat back frame.

According to the above configuration, the first movable body can be lifted and lowered in the up to down direction in accordance with the seated occupant's body shape. As a result, the seated occupant can take a comfortable posture.

In addition, preferably, the lifting and lowering mechanism supports the second movable body to be capable of ascending and descending in the up to down direction with respect to the seat back frame, and the control device controls the lifting and lowering mechanism so as to lift and lower the first movable body to correspond to a position of the second movable body in the up to down direction.

According to the above configuration, the first movable body ascends and descends to correspond to the position in the up to down direction of the second movable body arranged below the first movable body. As a result, the first movable body is capable of interlocking with the second movable body and protruding in accordance with the seated occupant's body shape, and the conveyance seat can be appropriately changed in shape in accordance with the seated occupant's body shape. As a result, the seated occupant can take a comfortable posture.

In addition, preferably, the movable body has right and left third movable bodies arranged at positions between the first and second movable bodies in the up to down direction of the seat back frame, the third movable body has a plurality of inflatable and deflatable bag bodies, and the plurality of bag bodies are stacked, have mutually different sizes, and are disposed in mutually different directions.

According to the above configuration, seated occupant supportability can be enhanced by supporting the seated occupant with the third movable body in addition to the first movable body and the second movable body. In addition, the third movable body can be flexibly changed in shape and size, and the seated occupant can be appropriately supported in accordance with the seated occupant's body shape.

Advantageous Effects of Invention

According to the present invention, the seated occupant can take a comfortable posture by appropriately changing the shape of the conveyance seat.

In addition, the seated occupant can be appropriately supported in accordance with the seated occupant's posture and body shape, and the seated occupant can take a comfortable posture.

In addition, the seated occupant can take a comfortable posture in response to various states of travel.

In addition, it is possible to appropriately support the seated occupant in accordance with the seated occupant's body shape and appropriately support the seated occupant against the load that is applied in the right to left direction during travel.

BRIEF DESCRIPTION OF DRAWINGS

FIG. 36 is a diagram illustrating a state where an airbag is deflated and is a partial cross-sectional view illustrating a seat cushion main part in an enlarged manner.

FIG. 37 is a diagram illustrating a state where the front of the airbag is inflated and is a partial cross-sectional view illustrating the seat cushion main part in an enlarged manner.

DESCRIPTION OF EMBODIMENTS

First Embodiment

Hereinafter, a vehicle seat according to a first embodiment of the present invention will be described with reference to the drawings. However, the embodiment described below is for easy understanding of the present invention and does not limit the present invention. In other words, the present invention can be modified and improved without departing from the spirit thereof, and it is a matter of course that the present invention includes equivalents thereof.

It should be noted that in the following description, "front to back direction" is the front to back direction seen from an occupant seated in the vehicle seat and coincides with the direction of travel of the vehicle. "Seat width direction" is the breadth direction of the vehicle seat and coincides with the right to left direction seen from the occupant seated in the vehicle seat. In addition, in the following description, "left" is the left seen from the seated occupant and, likewise, "right" is the right seen from the seated occupant. In addition, "height direction" is the height direction of the vehicle seat, which coincides with the up to down direction when the vehicle seat is seen from the front.

In addition, in the following description, in a case where various directions are described with "seat" as in "seat width direction" and "seat height direction", the directions are indicated with respect to the vehicle seat. Further, in the case of descriptions with "vehicle" such as "vehicle inner side" and "vehicle outer side", the directions are indicated with respect to the vehicle.

In addition, "outer side of the vehicle" in the seat width direction means the side that is closer to the outside of the body of the vehicle (to make it easier to understand, side close to the nearest door), and "inner side of the vehicle" means the side that is closer to the inside of the body of the vehicle (to make it easier to understand, side away from the nearest door).

A vehicle seat S1 according to the first embodiment will be described with reference to FIGS. 1 to 7.

<<Main Configuration of Vehicle Seat>>

First, the basic configuration of the vehicle seat S1 will be described based on FIG. 1.

Figure 1:
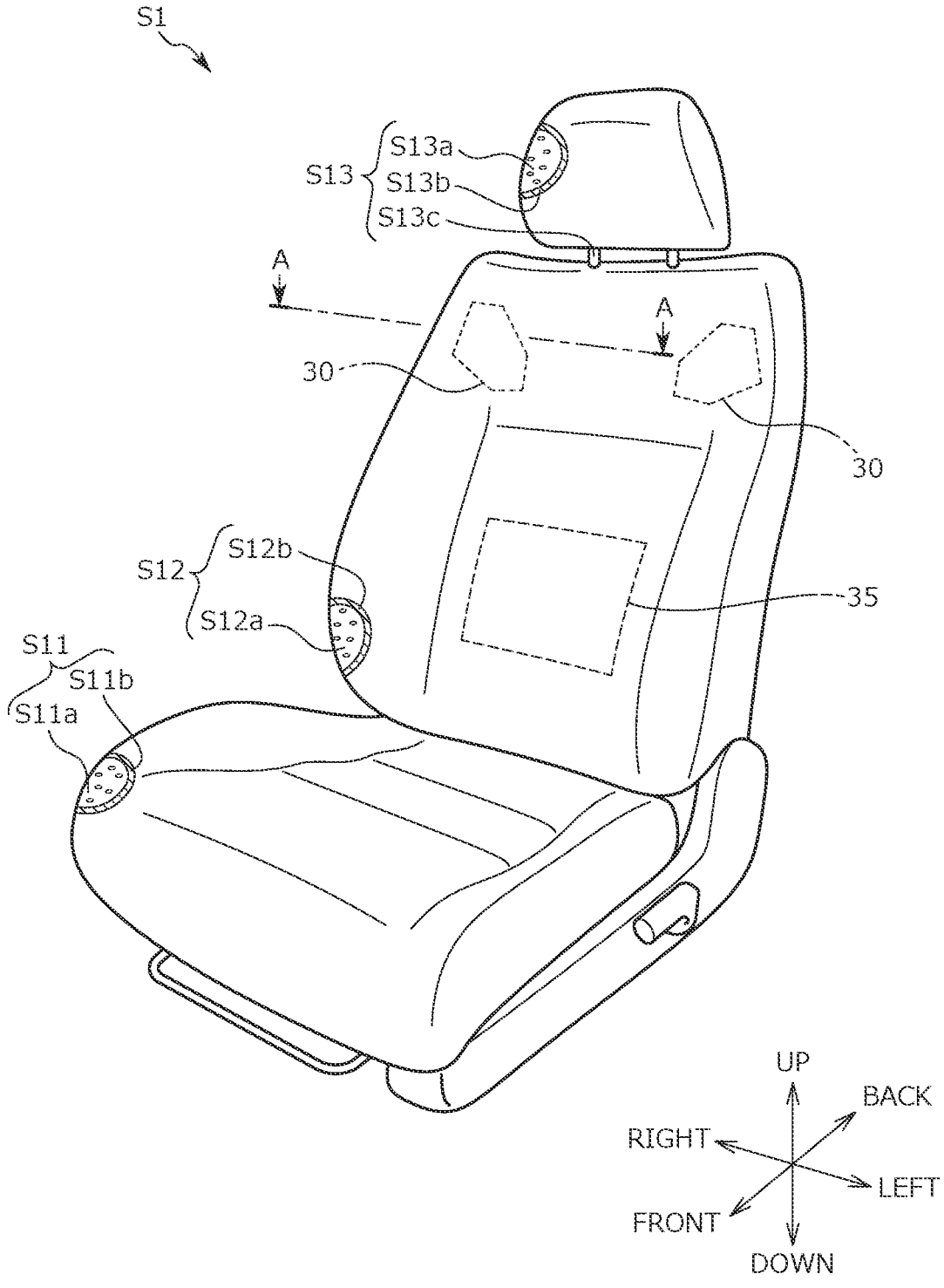
FIG. 1 is an explanatory diagram of the basic configuration of a vehicle seat according to a first embodiment.

FIG. 1 is a perspective view illustrating the basic configuration of the vehicle seat S1. As illustrated in FIG. 1, the vehicle seat S1 has a seat cushion S11, a seat back S12, and a headrest S13.

The seat cushion S11 is configured by covering a seat cushion frame 10 (see FIG. 2) with a seat cushion pad S11a and a skin material S11b. The seat back S12 is configured by covering a seat back frame 20 (see FIG. 2) with a seat back pad S12a and a skin material S12b. The headrest S13 is configured by covering pillars S13c with a headrest pad S13a and a skin material S13b.

In addition, the seat back S12 incorporates right and left shoulder supports 30 and a lumbar support 35 between the seat back frame 20 and the skin material S12b. The right and left shoulder supports 30 and the lumbar support 35 will be described later.

Figure 2:
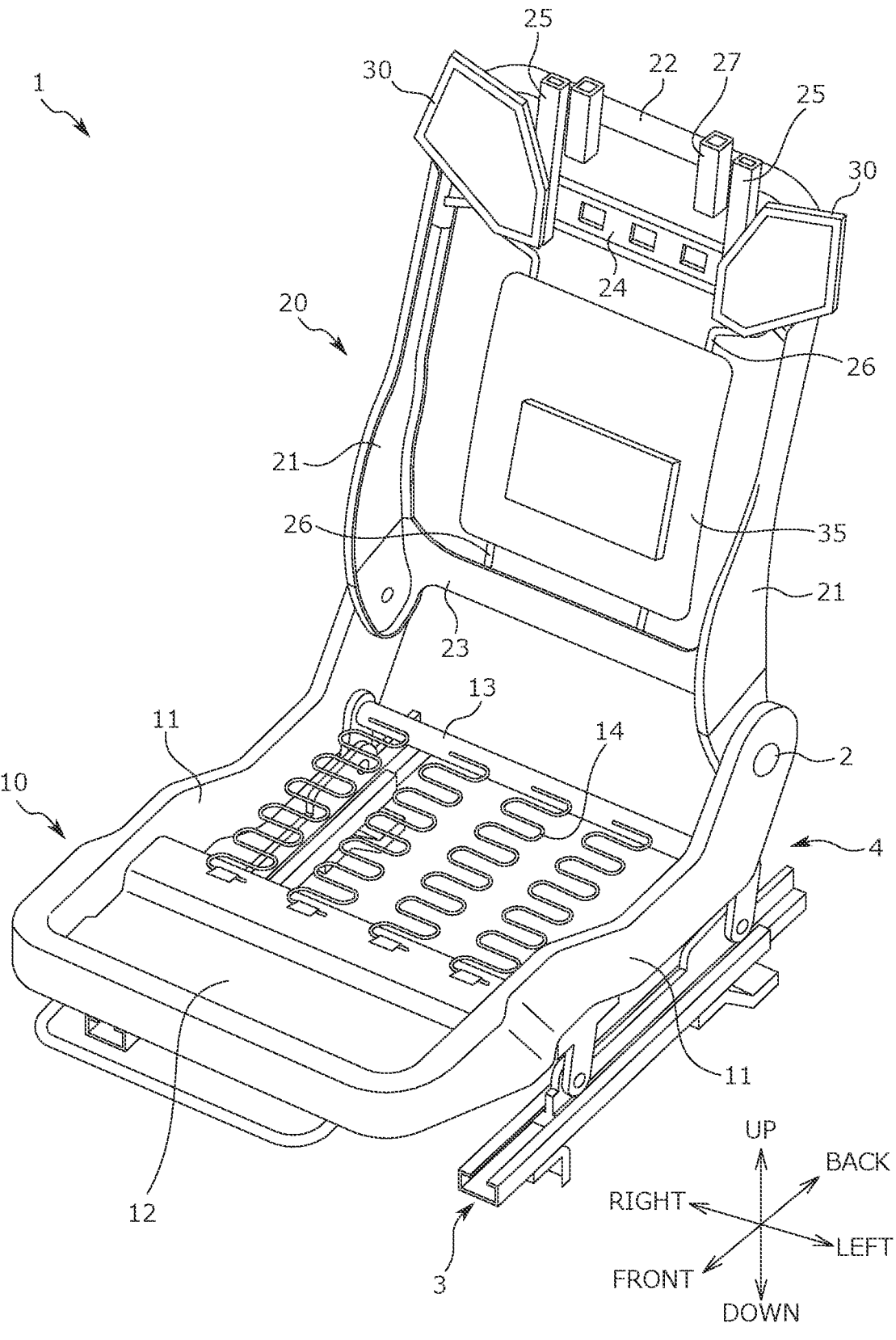
FIG. 2 is a perspective view of a seat frame.

FIG. 2 is a perspective view of a seat frame 1. The vehicle seat S1 includes the seat frame 1 as the skeleton thereof. The seat frame 1 has the seat cushion frame 10 and the seat back frame 20 as main components.

The seat frame 1 is fixed via a height adjustment mechanism 4 to a slide mechanism 3, which slides the vehicle seat S1 in the front to back direction.

The seat cushion frame 10 is configured mainly from cushion side frames 11 as side frames, a pan frame 12, a rear pipe 13 as a connecting pipe, and a plurality of elastic springs 14.

One of the cushion side frames 11 is disposed on the right of the seat cushion frame 10, and the other cushion side frame 11 is disposed on the left of the seat cushion frame 10. The cushion side frames 11 extend in the front to back direction.

The pan frame 12 is interposed on the front end sides of the right and left cushion side frames 11 and connects the right and left cushion side frames 11.

The rear pipe 13 is interposed on the rear end sides of the right and left cushion side frames 11 and connects the right and left cushion side frames 11.

Each elastic spring 14 is hooked on the pan frame 12 and the rear pipe 13 and extends in the seat front to back direction while meandering.

Next, the seat back frame 20 is a substantially rectangular frame-shaped body as illustrated in FIG. 2. The seat back frame 20 is pivotable about a pivot shaft 2 with respect to the seat cushion frame 10.

The seat back frame 20 is configured mainly from right and left back side frames 21, an upper frame 22, and a lower frame 23.

The seat back frame 20 further has a horizontal connecting frame 24 connecting the upper parts of the right and left back side frames 21 and vertical connecting frames 25 connecting the upper frame 22 and the horizontal connecting frame 24.

One of the back side frames 21 is disposed on the right of the seat back frame 20, and the other back side frame 21 is disposed on the left of the seat back frame 20. The back side frames 21 extend in the up to down direction. The back side frames 21 are configured from plate-shaped members.

The upper frame 22 connects the upper end portions of the right and left back side frames 21. The upper frame 22 is a pipe-shaped body having an inverted U shape.

The lower frame 23 connects the lower end portions of the right and left back side frames 21. The lower frame 23 is a plate-shaped body. The upper frame 22 and the lower frame 23 extend in the seat width direction.

The horizontal connecting frame 24 connects the right and left upper parts of the seat back frame 20. The horizontal connecting frame 24 is a plate-shaped body. The horizontal connecting frame 24 extends in the seat width direction.

The vertical connecting frames 25 are bridged between the upper frame 22 and the horizontal connecting frame 24 on both sides of the horizontal connecting frame 24 in the seat width direction. The vertical connecting frame 25 has a rectangular cross section and extends in the up to down direction.

Further, the shoulder supports 30 are attached to the upper part of the seat back frame 20, the front surfaces of the vertical connecting frames 25 to be specific. The lumbar support 35 is arranged at a position below the shoulder supports 30 and between the horizontal connecting frame 24 and the lower frame 23. The lumbar support 35 is supported by wire members 26 stretched between the horizontal connecting frame 24 and the lower frame 23.

One of the wire members 26 is disposed on the right of the seat back frame 20, and the other wire member 26 is disposed on the left of the seat back frame 20. Specifically, the wire members 26 are stretched upward and downward on both the right and left sides of the horizontal connecting frame 24 and both the right and left sides of the lower frame 23.

In addition, the seat back frame 20 includes pillar attachment members 27 for attaching the pillars S13c of the headrest S13 at the middle part of the upper frame 22 in the seat width direction.

Figure 3:
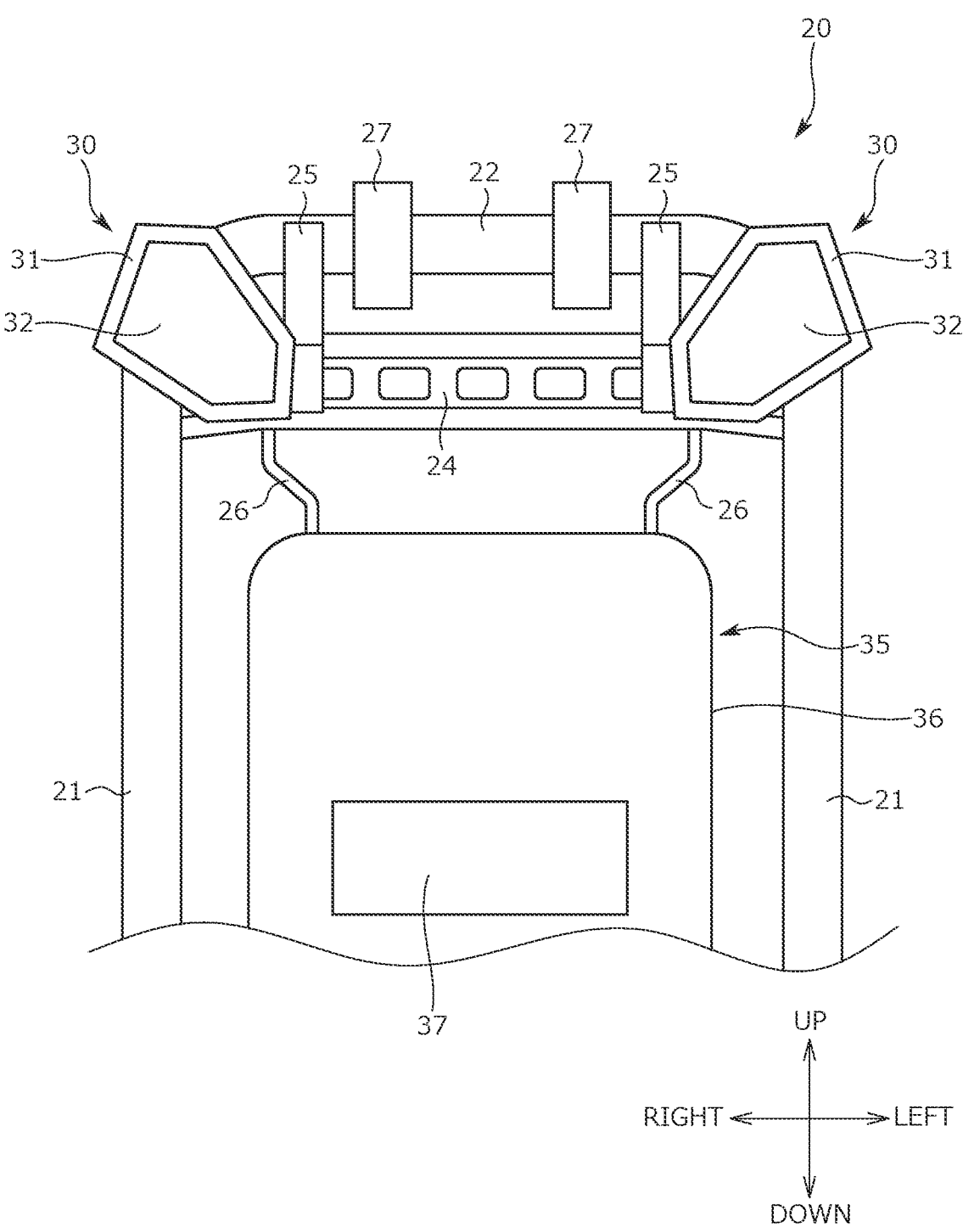
FIG. 3 is a front view of a seat back frame.

As illustrated in FIG. 3, the right and left shoulder supports 30 supporting both shoulders of the seated occupant are attached to the front surfaces of the right and left vertical connecting frames 25. The shoulder support 30 has a shoulder support plate 31 functioning as a base material and a shoulder fluid bag 32 arranged on the shoulder support plate 31.

The lumbar support 35 supporting the waist of the seated occupant is attached to the wire members 26. The lumbar support 35 has a lumbar support plate 36 functioning as a base material and a lumbar fluid bag 37 arranged on the lumbar support plate 36.

<<Regarding Shoulder Support 30>>

The shoulder supports 30 are attached to the back surface of the seat back pad S12a on the right and left of the upper side of the seat back S12 in the seat width direction. The shoulder support 30 is attached to the overlapping part of the front surface of the vertical connecting frame 25 where the horizontal connecting frame 24 is connected.

The shoulder support plate 31, which constitutes the shoulder support 30, is a plate member elongated in the seat width direction. The shoulder support plate 31 spans the front surface of the vertical connecting frame 25 and the front surface of the back side frame 21.

The shoulder fluid bags 32 are arranged on the front surface sides of the right and left shoulder support plates 31. The shoulder fluid bag 32 has a hexagonal shape elongated in the seat width direction and extends from the vertical connecting frame 25 so as to protrude outward in the seat width direction.

Figure 4A:
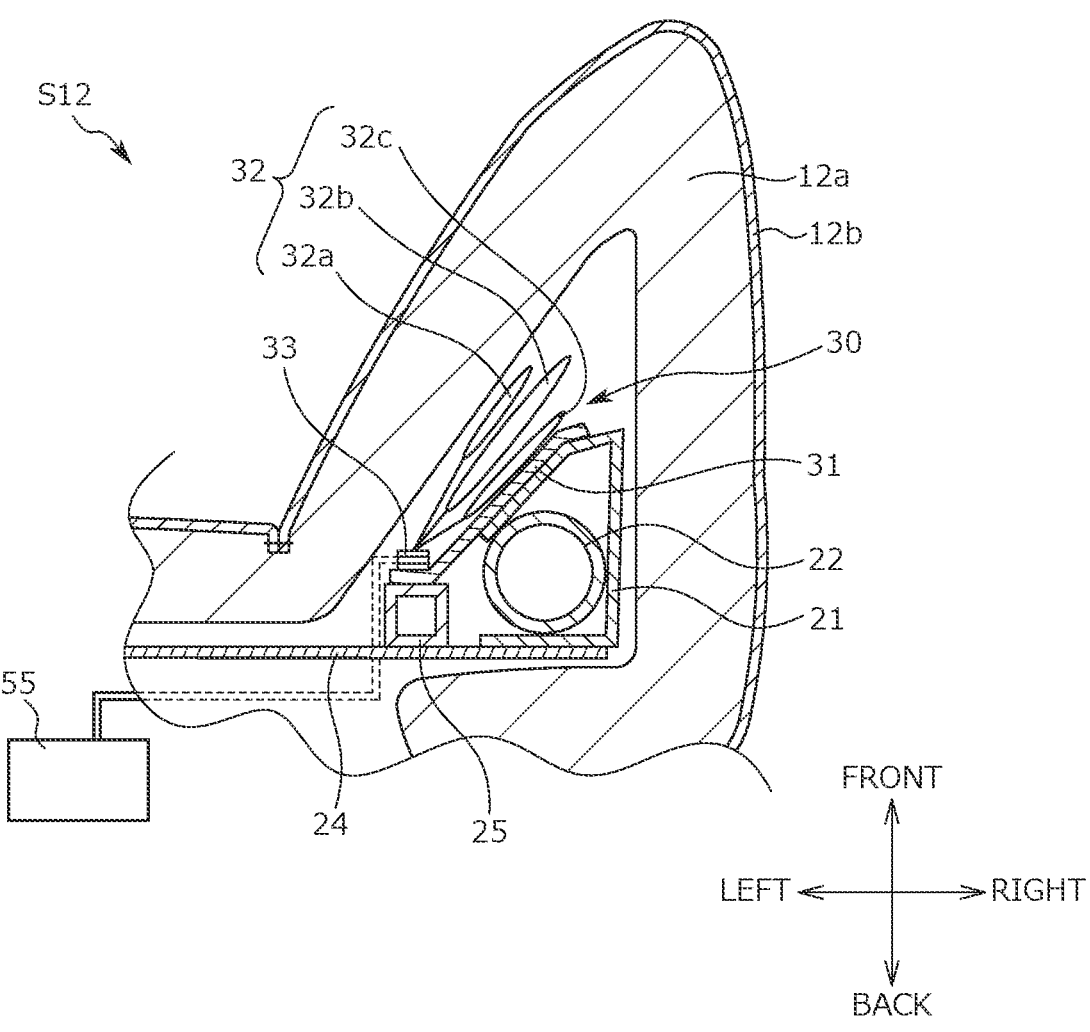
FIG. 4A is a cross-sectional view taken along line A-A of FIG. 1 and illustrates a state where a shoulder fluid bag is deflated.

As illustrated in FIG. 4A, three shoulder fluid bags 32 are arranged on the front surface of the shoulder support plate 31.

The shoulder fluid bag 32 is attached to the shoulder support plate 31 by an attachment member 33 provided at the inside end portion of the front surface of the shoulder support plate 31 in the seat width direction. By compressed air being injected into the shoulder fluid bag 32 that is deflated, the shoulder fluid bag 32 inflates and protrudes to the front side of the seat.

Each of the three shoulder fluid bags 32 has a different size. Specifically, the capacity of a first shoulder fluid bag 32*a*, which is positioned closest to the seat front side, is smaller than the capacities of a second shoulder fluid bag 32*b* and a third shoulder fluid bag 32*c*. Further, the capacity of the second shoulder fluid bag 32*b*, which is positioned behind the first shoulder fluid bag 32*a*, is larger than the capacities of the first shoulder fluid bag 32*a* and the third shoulder fluid bag 32*c*. The capacity of the third shoulder fluid bag 33*c* positioned behind the second shoulder fluid bag 32*b* is larger than the capacity of the first shoulder fluid bag 32*a* and smaller than the capacity of the second shoulder fluid bag 32*b*.

Figure 4B:
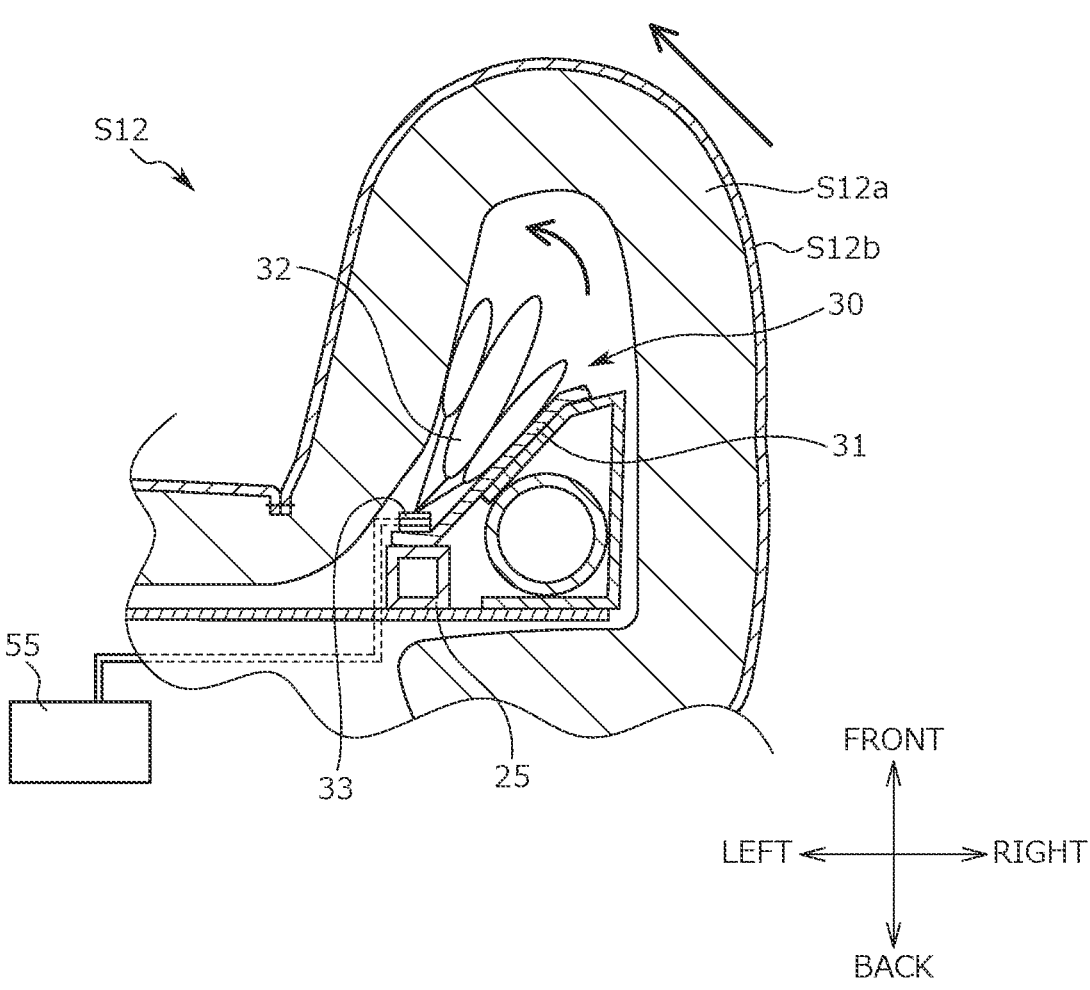
FIG. 4B is a cross-sectional view taken along line A-A of FIG. 1 and illustrates a state where the shoulder fluid bag is inflated.

As illustrated in FIGS. 4A and 4B, the first shoulder fluid bag 32*a*, the second shoulder fluid bag 32*b*, and the third shoulder fluid bag 32*c* inflate and protrude in mutually different directions by compressed air being injected. In this manner, the first shoulder fluid bag 32*a*, the second shoulder fluid bag 32*b*, and the third shoulder fluid bag 32*c* are arranged in mutually different directions and inflate and deflate in mutually different directions and with mutually different capacities (protrusion amounts) as a result of compressed air injection. As a result, it is possible to flexibly adjust the direction and amount of protrusion of the seat back S12.

The first shoulder fluid bag 32*a*, the second shoulder fluid bag 2*b*, and the third shoulder fluid bag 32*c* may be in the state of inflation and protrusion in the initial state (normal state). As a result, it is possible to suppress wrinkling and loosening of the skin material S12*b* of the seat back S12. It should be noted that the shoulder fluid bags 32 are not limited to three in number. Two shoulder fluid bags 32 may be arranged or four or more shoulder fluid bags 32 may be arranged.

The shoulder fluid bag 32 corresponds to a bag body and a movable body and corresponds to a first movable body and a shoulder movable body.

The operation of the shoulder fluid bag 32 configured as above will be described. An ECU 50, which will be described later, controls the flow of compressed air supplied to the shoulder fluid bag 32. As a result, the shoulder support 30 changes in shape between the deflation state illustrated in FIG. 4A and the protrusion state illustrated in FIG. 4B.

FIG. 4A is a cross-sectional view taken along line A-A of FIG. 1 and illustrates the deflation state of the shoulder support 30. The shoulder fluid bag 32 is deflated between the shoulder support plate 31 and the skin material S12*b* in the seat front to back direction.

FIG. 4B is a cross-sectional view taken along line A-A of FIG. 1 and illustrates the protrusion state of the shoulder support 30. The shoulder fluid bag 32 is arranged in the state of inflation and forward protrusion between the shoulder support plate 31 and the skin material S12*b* in the seat front to back direction.

Specifically, the shoulder fluid bag 32 that is deflated inflates by compressed air being supplied from an actuator 55, which will be described later. As a result, the part of the seat back S12 that supports the seated occupant's shoulder changes in shape to the front of the seat to result in the protrusion state illustrated in FIG. 4B.

In addition, the shoulder fluid bag 32 deflates as the compressed air injected into the shoulder fluid bag 32 is discharged. As a result, the part of the seat back S12 that supports the seated occupant's shoulder changes in shape to the rear of the seat to return to the deflation state illustrated in FIG. 4A.

<<Regarding Lumbar Support 35>>

Returning to FIG. 3, the lumbar support 35 will be described. The lumbar support 35 is attached to the back surface of the seat back pad S12*a* below the shoulder support 30 of the seat back S12.

The lumbar support plate 36, which constitutes the lumbar support 35, is a substantially rectangular plate member. The lumbar support plate 36 spans the right and left wire members 26.

The lumbar fluid bag 37 is supported on the front surface of the lumbar support plate 36. The lumbar fluid bag 37 has a plurality of the lumbar fluid bags 37 in the same manner as the shoulder fluid bags 32. The plurality of lumbar fluid bags 37 may be mutually equal or different in capacity.

The lumbar fluid bag 37 corresponds to a bag body and a movable body and corresponds to a second movable body and a lumbar movable body.

The ECU 50, which will be described later, controls the flow of compressed air with respect to the lumbar fluid bag 37. As a result, the lumbar support 35 changes in shape between deflation and protrusion states.

The lumbar fluid bag 37 that is deflated inflates by compressed air being supplied from the actuator 55, which will be described later. As a result, the portion of the seat back S12 that supports the seated occupant's waist protrudes to the front of the seat.

In addition, the lumbar fluid bag 37 deflates as the compressed air injected into the lumbar fluid bag 37 is discharged. As a result, the part of the seat back S12 that supports the seated occupant's waist changes in shape to the rear of the seat to return to the deflation state.

<<Regarding Functional Configuration of Vehicle Seat S1>>

Next, the functional configuration of the vehicle seat S1 will be described.

Figure 5:
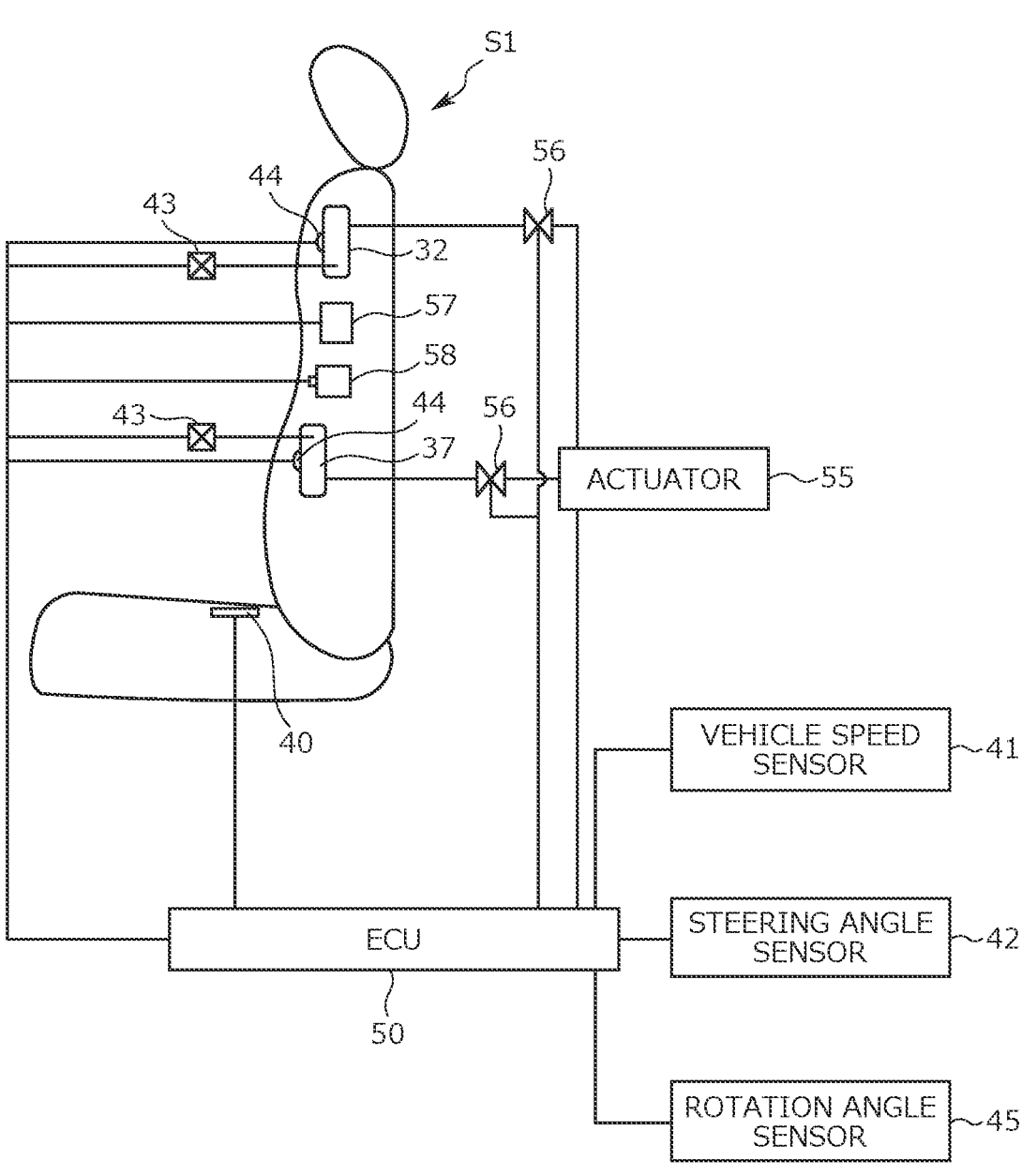
FIG. 5 is a block diagram illustrating the functional configuration of the seat frame.

FIG. 5 illustrates the functional configuration of the vehicle seat S1. As described above, the vehicle seat S1 has the shoulder fluid bag 32 and the lumbar fluid bag 37. Compressed air is supplied to the shoulder fluid bag 32 and the lumbar fluid bag 37 by the actuator 55. The compressed air supplied from the actuator 55 is injected into the shoulder fluid bag 32 and the lumbar fluid bag 37 through tubes forming air supply paths. Each air supply path is provided with an electromagnetic valve 56 for adjusting the amount of compressed air injection.

It should be noted that the fluid injected into the shoulder fluid bag 32 and the lumbar fluid bag 37 is not limited to compressed air. The shoulder fluid bag 32 or the lumbar fluid bag 37 may be inflated by liquid injection. The shoulder fluid bag 32 and the lumbar fluid bag 37 may be either a compressed air bag inflated by compressed air or a liquid bag inflated by liquid or may be a compressed air bag-liquid bag combination. Compressed air and liquid have different moduli of elasticity, and thus it is possible to flexibly adjust the elasticity of the shoulder fluid bag 32 and the elasticity of the lumbar fluid bag 37 by compressed air bag-liquid bag combination.

In addition, the vehicle seat S1 may incorporate a heater 57. By the vehicle seat S1 incorporating the heater 57, the seated occupant's body can be warmed from the back and the seated occupant's comfort can be improved especially in winter.

Further, the vehicle seat S1 may incorporate a vibration imparting device 58. By the vehicle seat S1 incorporating the vibration imparting device 58, it is possible to promote the blood flow of the seated occupant who drives for a long time and fatigue reduction can be achieved.

The vehicle seat S1 includes a control device that controls the actuator 55 and the electromagnetic valve 56 described above. The control device includes the electronic control unit (ECU) 50 mounted in the vehicle. The ECU 50 controls the inflation and deflation of the shoulder fluid bag 32 and the lumbar fluid bag 37 by controlling the on and off of the actuator 55 and the degree of opening of the electromagnetic valve 56. As a result, the shoulder and lumbar portions of the vehicle seat S1 change in shape in accordance with the seated occupant's body shape and seated occupant support-ability is improved.

In addition, the ECU 50 acquires detection values from various sensors installed in the vehicle by communicating with the various sensors through an in-vehicle network. The various sensors include a weight sensor 40 capable of seating state detection, a vehicle speed sensor 41 capable of vehicle speed detection, a steering angle sensor 42 capable of steering angle detection, pressure sensors 43 of the shoulder fluid bag 32 and the lumbar fluid bag 37, an inflation pressure sensor 44, and a pivoting angle sensor 45.

The weight sensor 40 detects the load that acts on the vehicle seat S1. Based on the detection value of the weight sensor 40, the ECU 50 is capable of identifying the presence or absence of the seated occupant.

The vehicle speed sensor 41 and the steering angle sensor 42 detect the state of travel of the vehicle. Based on the detection results of the vehicle speed sensor 41 and the steering angle sensor 42, the ECU 50 estimates the state of travel of the vehicle and performs real-time control based on the estimation result such that the shoulder fluid bag 32 and the lumbar fluid bag 37 inflate or deflate. In other words, the amounts of compressed air injection into the shoulder fluid bag 32 and the lumbar fluid bag 37 are controlled such that the seated occupant can take an appropriate posture with respect to the state of travel of the vehicle.

The inflation pressure sensor 44 is attached to each fluid bag in order to detect the pressure that is attributable to the compressed air injected into the shoulder fluid bag 32 and the lumbar fluid bag 37. The pressure sensor 43 is attached to each fluid bag in order to detect the load from the seated occupant. The pressure sensor 43 is attached to the front surfaces of the shoulder fluid bag 32 and the lumbar fluid bag 37. The ECU 50 controls the amounts of compressed air injection into the shoulder fluid bag 32 and the lumbar fluid bag 37 based on pressure signals output by the pressure sensor 43 and the inflation pressure sensor 44. In addition, the ECU 50 stops compressed air injection based on pressure signals output by the pressure sensor 43 and the inflation pressure sensor 44 such that the shoulder fluid bag 32 and the lumbar fluid bag 37 do not inflate excessively.

The pivoting angle sensor 45 detects the pivoting angle of the seat back S12 with respect to the seat cushion S11. Based on the detection value of the pivoting angle sensor 45, the ECU 50 is capable of determining that the seat back S12 is in a reclining state where the seat back S12 is pivoted rearward. When it is determined by the ECU 50 that the seat back S12 is in the reclining state, the ECU 50 performs control such that compressed air is injected into the shoulder fluid bag 32 and the lumbar fluid bag 37 and the shoulders and waist of the seated occupant who is resting are supported effectively.

Although FIG. 5 illustrates the weight sensor 40, the vehicle speed sensor 41, the steering angle sensor 42, the pressure sensor 43, the inflation pressure sensor 44, and the pivoting angle sensor 45, the present invention is not limited thereto. For example, a road surface sensor may be included to detect a road surface situation by road surface situation taking images during travel. In addition, the vehicle seat S1 may be capable of detecting the driving mode of the vehicle (for example, the vehicle traveling in an autonomous driving mode).

<<Regarding Functional Configuration of ECU<<

Figure 6:
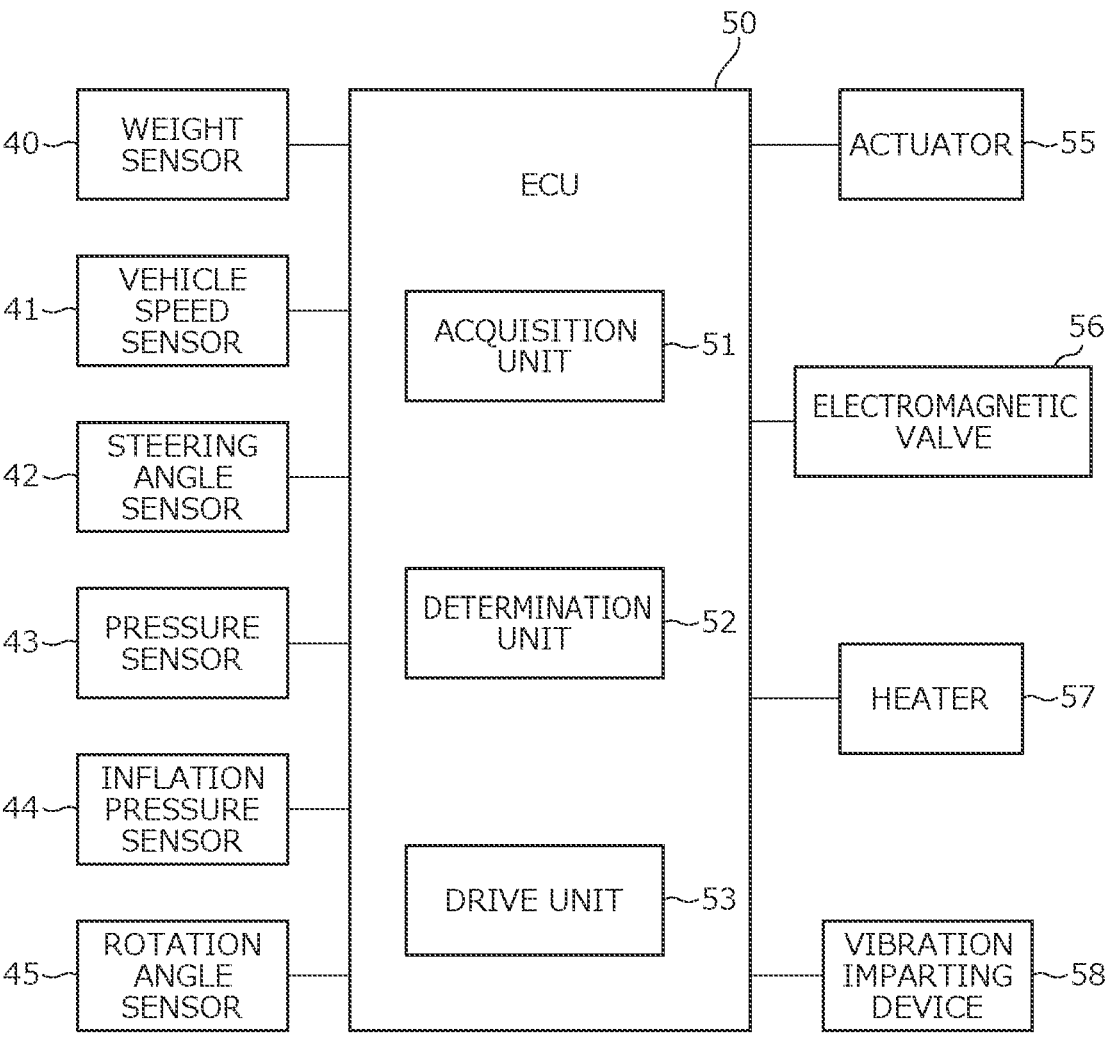
FIG. 6 is a block diagram illustrating the functional configuration of an ECU.

FIG. 6 illustrates the functional configuration of the ECU 50. As illustrated in FIG. 6, the ECU 50 has an acquisition unit 51, a determination unit 52, and a drive unit 53 as main functional configurations. The ECU 50 functions as the acquisition unit 51, the determination unit 52, and the drive unit 53 by loading a program from a nonvolatile memory (not illustrated) and executing the program with a processor (not illustrated), which is a hardware resource.

The acquisition unit 51 acquires detection values from various sensors installed in the vehicle. Specifically, the acquisition unit 51 acquires detection values from the weight sensor 40, the vehicle speed sensor 41, the steering angle sensor 42, the pressure sensor 43, the inflation pressure sensor 44, and the pivoting angle sensor 45. The acquisition unit 51 has an analog-to-digital converter (ADC) and is capable of converting analog signals output by the various sensors into digital signals. In addition, the acquisition unit 51 has a noise removal filter and is capable of improving the signal power-to-noise power ratio (S/N ratio) by removing a signal in a frequency band including a noise component.

The determination unit 52 determines the seated occu-pant's seating posture based on a detection value acquired by the acquisition unit 51. More specifically, the determi-nation unit 52 determines one that corresponds to the seated occupant's seating posture out of the five of "stooped back", "slightly stooped back", "ideal posture", "slightly curved back", and "curved back".

The determination unit 52 has a determination condition table that defines determination conditions for determining which of the five sitting postures described above corre-sponds. Further, the determination unit 52 determines the seated occupant's seating posture by comparing the detec-tion values of the pressure sensor 43 and the inflation pressure sensor 44 with the determination conditions defined in the determination condition table.

Which of the five seating postures the detection values of the pressure sensor 43 and the inflation pressure sensor 44 correspond to can be set in any manner by editing the determination condition table. In addition, seating posture candidates are not limited to the five postures described above and can be determined in any manner.

The drive unit 53 outputs control signals to the actuator 55 and the electromagnetic valve 56 based on the determination result of the determination unit 52 such that the seated occupant can take an appropriate posture. As a result, the shoulder fluid bag 32 and the lumbar fluid bag 37 inflate and protrude or deflate. The determination result of the deter-mination unit 52 and the drive unit 53 controlling the inflation and deflation of the shoulder fluid bag 32 and the lumbar fluid bag 37 will be described in more detail with reference to FIGS. 7A and 7B.

Figure 7A:
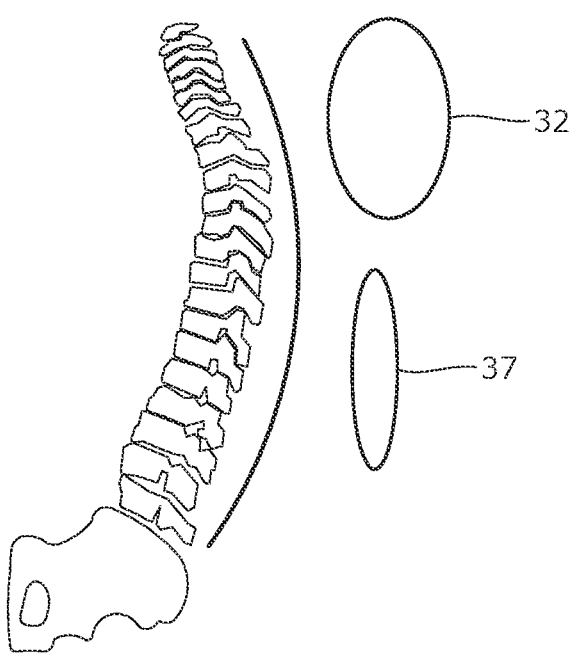
FIG. 7A is a diagram illustrating the inflation and deflation states of the shoulder fluid bag and a lumbar fluid bag in a case where it is determined that a seated occupant is in a stooped-back posture.

FIG. 7A illustrates the inflation and deflation states of the shoulder fluid bag 32 and the lumbar fluid bag 37 in a case where it is determined by the determination unit 52 that the seated occupant's seating posture is "stooped back". As illustrated in FIG. 7A, in the case of "stooped back" determination, the drive unit 53 causes the shoulder fluid bag 32 to inflate considerably. Then, the drive unit 53 deflates the lumbar fluid bag 37 based on the amount of protrusion (that is, the amount of inflation) of the shoulder fluid bag 32. As a result, the burden on the seated occupant's back bent so as to protrude rearward is reduced, and fatigue reduction and comfort improvement can be achieved. Here, the amount of protrusion of the shoulder fluid bag 32 can be estimated based on the output signal of the inflation pressure sensor 44 attached to the shoulder fluid bag 32. In addition, the amount of protrusion of the shoulder fluid bag 32 may be estimated based on the degree of opening of the electromagnetic valve 56.

Figure 7B:
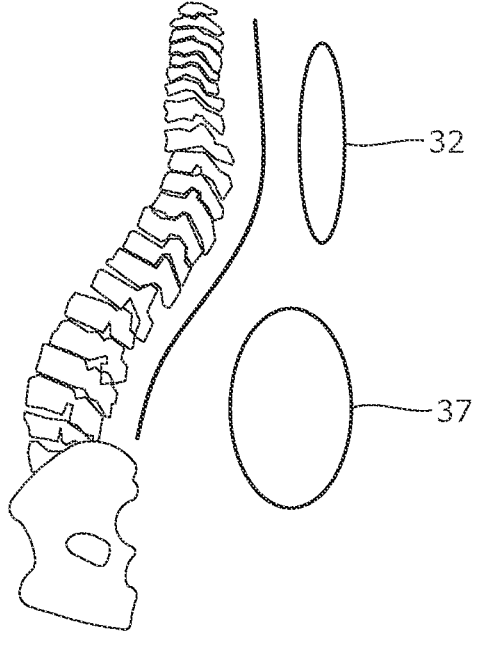
FIG. 7B is a diagram illustrating the inflation and deflation states of the shoulder fluid bag and the lumbar fluid bag in a case where it is determined that the seated occupant is in a curved-back posture.

FIG. 7B illustrates the inflation and deflation states of the shoulder fluid bag 32 and the lumbar fluid bag 37 in a case where it is determined by the determination unit 52 that the seated occupant's seating posture is "curved back". As illustrated in FIG. 7B, in the case of "curved back" determination, the drive unit 53 causes the lumbar fluid bag 37 to inflate considerably. Then, the drive unit 53 deflates the shoulder fluid bag 32 based on the amount of protrusion (that is, the amount of inflation) of the lumbar fluid bag 37. As a result, the seated occupant's back bending so as to warp forward can be supported appropriately, the seated occupant's burden can be reduced, and fatigue reduction and comfort improvement can be achieved. Here, the amount of protrusion of the lumbar fluid bag 37 can be estimated based on the output signal of the inflation pressure sensor 44 attached to the lumbar fluid bag 37. In addition, the amount of protrusion of the lumbar fluid bag 37 may be estimated based on the degree of opening of the electromagnetic valve 56.

In this manner, in controlling the shoulder fluid bag 32 and the lumbar fluid bag 37 to protrude, the drive unit 53 performs real-time control such that the amount of protrusion of one of the shoulder fluid bag 32 and the lumbar fluid bag 37 decreases when the amount of protrusion of the other is large. Here, although the real-time control means detecting that the amount of protrusion of one of the shoulder fluid bag 32 and the lumbar fluid bag 37 is large and simultaneously controlling the amount of protrusion of the other to decrease, the detection and the control do not have to be strictly simultaneous. For example, it is sufficient if the seated occupant does not feel uncomfortable due to the deviation between the inflation and deflation timings of the shoulder fluid bag 32 and the lumbar fluid bag 37.

Here, the drive unit 53 compares the pressure signal output by the inflation pressure sensor 44 with a predetermined threshold determined in advance and stops or limits compressed air supply based on the comparison result. In other words, when the detection value of the inflation pressure sensor 44 exceeds a predetermined value determined in advance, the amounts of compressed air supply to the shoulder fluid bag 32 and the lumbar fluid bag 37 are limited. As a result, an excessive inflation of the shoulder fluid bag 32 and the lumbar fluid bag 37 can be suppressed, and the seated occupant can be appropriately supported in accordance with the seated occupant's posture and body shape. Therefore, the seated occupant can take a comfortable posture.

In addition, the drive unit 53 may control the amounts of compressed air injection into the shoulder fluid bag 32 and the lumbar fluid bag 37 based on the detection values of the vehicle speed sensor 41 and the steering angle sensor 42. For example, the drive unit 53 may estimate the load applied to the seated occupant based on the vehicle speed signal output by the vehicle speed sensor 41 and the steering angle signal output by the steering angle sensor 42 and inflate the shoulder fluid bag 32 and the lumbar fluid bag 37 in real time based on the estimation result. As a result, seated occupant supportability can be improved quickly.

Further, the drive unit 53 may control the inflation and deflation of the shoulder fluid bag 32 and the lumbar fluid bag 37 based on the output signal of the road surface sensor described above, a driving mode-related signal (for example, a signal indicating that driving in an autonomous driving mode is in progress), or the output signal of the pivoting angle sensor 45. As a result, it is possible to flexibly support the seated occupant in accordance with situations and the seated occupant's posture during travel and reduce the seated occupant's burden.

Although it has been described that the drive unit 53 controls the actuator 55 and the electromagnetic valve 56 based on the determination result of the determination unit 52, the present invention is not limited thereto. The drive unit 53 may control the amount of protrusion of one of the shoulder fluid bag 32 and the lumbar fluid bag 37 based on the amount of protrusion of the other regardless of the determination result of the determination unit 52. In this manner, the amounts of protrusion of the shoulder fluid bag 32 and the lumbar fluid bag 37 can be controlled more quickly. However, by the seated occupant's posture being determined by the determination unit 52 and the shoulder fluid bag 32 and the lumbar fluid bag 37 being controlled based on the determination result to inflate or deflate, the seated occupant can be more precisely supported in accordance with the seated occupant's posture. Therefore, the seated occupant can take a comfortable posture.

First Modification Example

Although the configuration of the vehicle seat S1 has been described above, the embodiment described above is merely an example for easy understanding of the present invention and does not limit the present invention. In other words, the present invention can be modified and improved without departing from the spirit thereof, and it is a matter of course that the present invention includes equivalents thereof.

Figure 8:
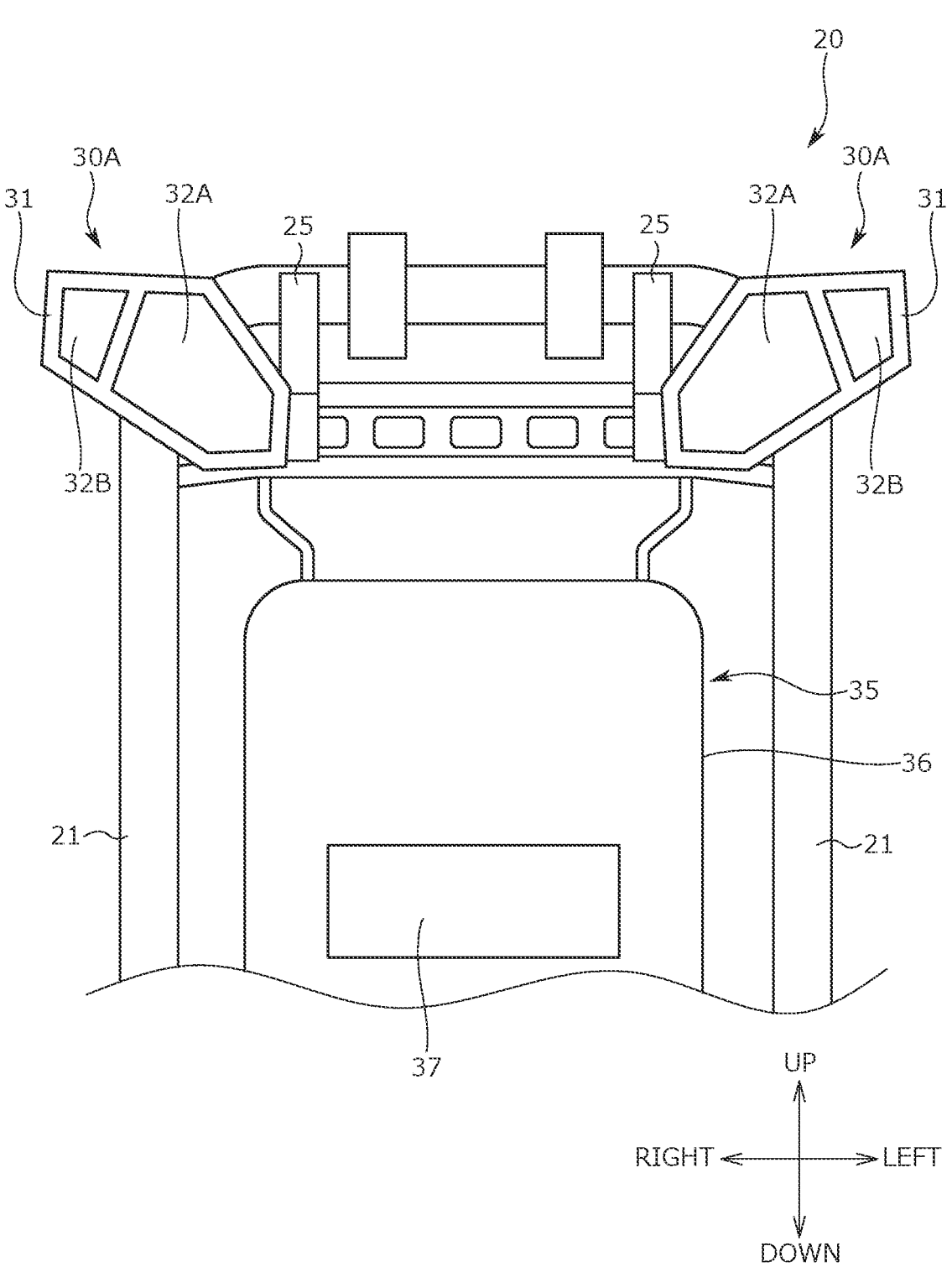
FIG. 8 is a front view illustrating a first modification example of the seat back frame.

Shoulder supports 30A according to a first modification example will be described with reference to FIG. 8. In the embodiment described above, the shoulder support 30 has the shoulder support plate 31 and the shoulder fluid bag 32. Meanwhile, the shoulder support 30A according to the first modification example has the shoulder support plate 31, an inside shoulder fluid bag 32A arranged at an inside position in the right to left direction, and an outside shoulder fluid bag 32B arranged at an outside position in the right to left direction.

The pressure sensor 43 and the inflation pressure sensor 44 described above are attached to each of the inside shoulder fluid bag 32A and the outside shoulder fluid bag 32B. Further, the ECU 50 controls compressed air supply based on the detection values of the pressure sensor 43 and the inflation pressure sensor 44. Specifically, the determination unit 52 of the ECU 50 determines the seated occupant's body shape (shoulder width to be more specific) based on the detection values of the pressure sensor 43 and the inflation pressure sensor 44. In a case where it is estimated by the determination unit 52 that the seated occupant's shoulder width is narrow, the drive unit 53 inflates the inside shoulder fluid bag 32A. On the other hand, in a case where it is estimated by the determination unit 52 that the seated occupant's shoulder width is wide, the drive unit 53 inflates the outside shoulder fluid bag 32B. As a result, seated occupant supportability can be improved in accordance with the seated occupant's body shape.

In addition, the drive unit 53 estimates the centrifugal force that is applied to the seated occupant based on the detection values of the vehicle speed sensor 41 and the steering angle sensor 42 and inflates the inside shoulder fluid bag 32A and the outside shoulder fluid bag 32B based on the estimation result. As a result, it is possible to appropriately support the seated occupant against the centrifugal force that is applied to the seated occupant during travel.

The inside shoulder fluid bag 32A corresponds to an inside first movable body, and the outside shoulder fluid bag 32B corresponds to an outside first movable body.

Second Modification Example

Next, the vehicle seat S1 according to a second modification example will be described. The vehicle seat S1 according to the second modification example includes biasing members 34 inside the shoulder supports 30 in the seat width direction. The biasing member 34 biases forward the seat back pad S12*a* and the skin material S12*b* around the seated occupant's shoulder blades.

Figure 9:
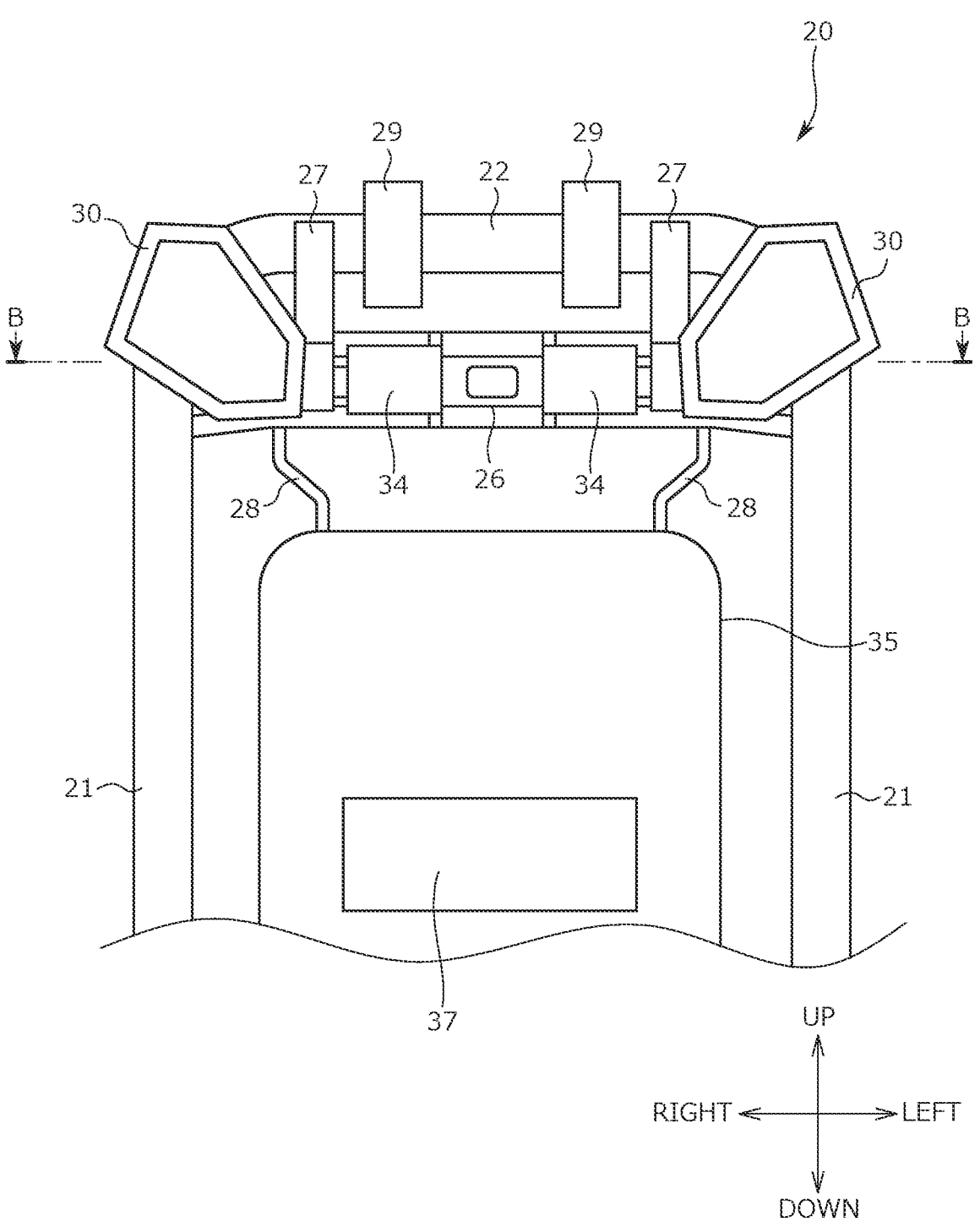
FIG. 9 is a front view illustrating a second modification example of the seat back frame.

FIG. 9 is a front view of a seat back frame 20B according to the second modification example. As illustrated in FIG. 9, in the seat back frame 20B according to the second embodiment, the biasing members 34 are attached to the front surface of the horizontal connecting frame 24 inside the shoulder supports 30 in the seat width direction.

Figure 10A:
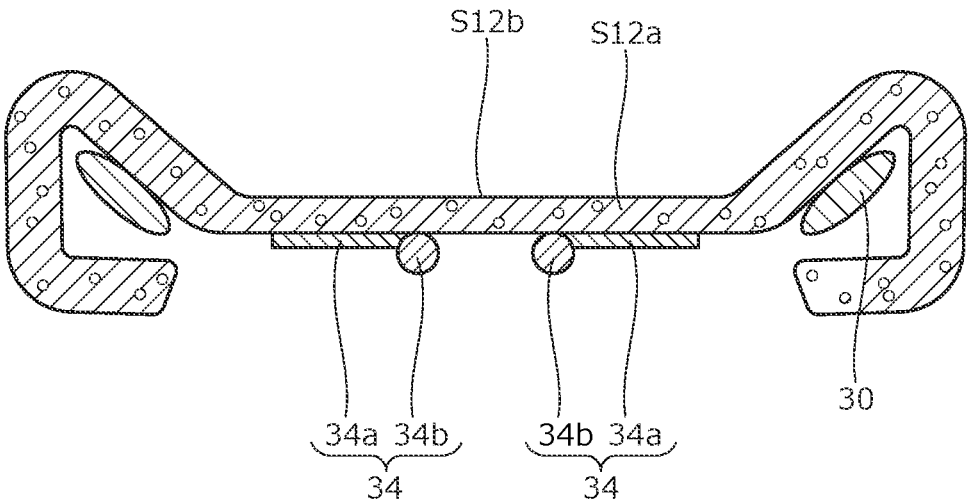
FIG. 10A is a cross-sectional view taken along line B-B of FIG. 9 and illustrates a state where a plate is at a normal position.
Figure 10B:
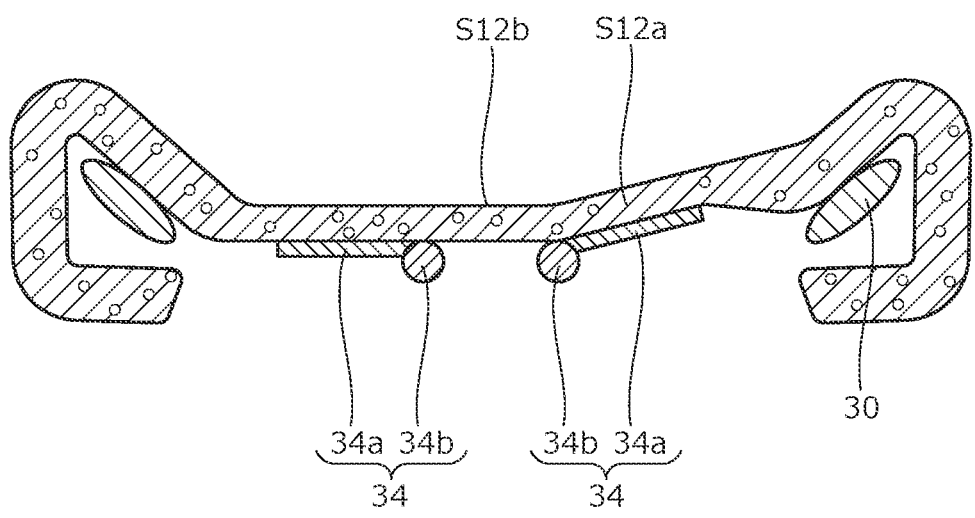
FIG. 10B is a diagram illustrating a state where the plate is at a protrusion position.

As illustrated in FIG. 10A, the biasing member 34 has a plate 34*a*, a pivot shaft 34*b*, and an elastic member (not illustrated). The plate 34*a* is biased forward by the elastic member including a torsion spring. Then, as illustrated in FIG. 10B, the plate 34*a* pivots about the pivot shaft 34*b* extending in the up to down direction to cause the seat back pad S12*a* and the skin material S12*b* positioned in front of the plate 34*a* to protrude forward. As a result, it is possible to prevent separation of the back around the shoulder blades from the seat back S12 when the seated occupant steers the steering wheel and supportability can be improved on the seated occupant's back.

It should be noted that the configuration of the biasing member 34 is not limited to the configuration described above. For example, the elastic member may be a fluid bag instead of the torsion spring. At this time, the plate 34*a* is biased forward by fluid supply to the fluid bag.

Further, the biasing force can be flexibly adjusted by controlling the fluid supplied to the fluid bag.

Third Modification Example

Figure 11A:
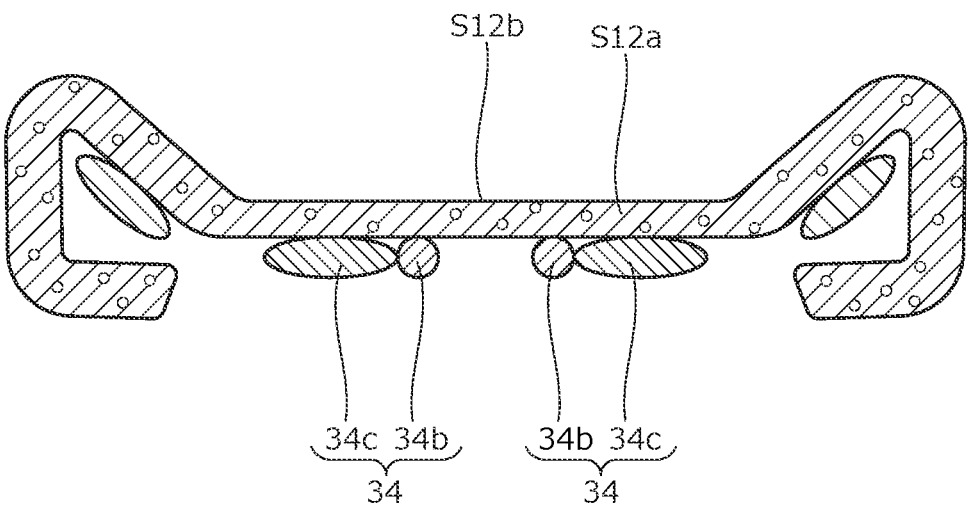
FIG. 11A is a cross-sectional view taken along line B-B of FIG. 9 and illustrates a state where a fluid bag is at a normal position.
Figure 11B:
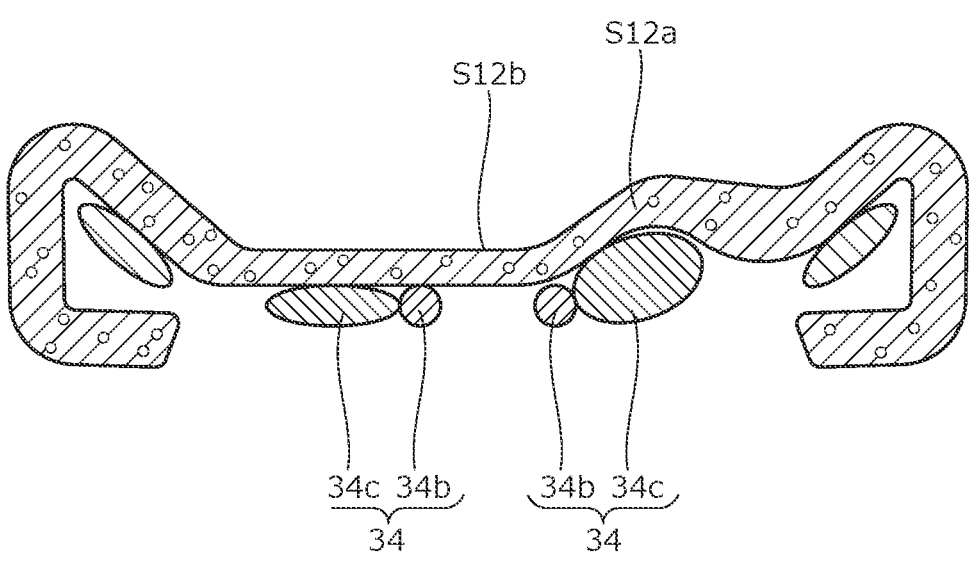
FIG. 11B is a diagram illustrating a state where the fluid bag is at a protrusion position.

The biasing member 34 according to a third modification example has a fluid bag 34*c* instead of the plate 34*a*. As illustrated in FIG. 11A, the biasing member 34 has the fluid bag 34*c*, the pivot shaft 34*b*, and an elastic member (not illustrated). The fluid bag 34*c* is biased forward by the elastic member including, for example, a torsion spring. Then, as illustrated in FIG. 11B, the fluid bag 34*c* pivots about the pivot shaft 34*b* extending in the up to down direction to cause the seat back pad S12*a* and the skin material S12*b* positioned in front of the fluid bag 34*c* to protrude forward. As a result, supportability can be improved on the seated occupant's back around the shoulder blades. In addition, by controlling the compressed air that is supplied to the fluid bag 34*c*, it is possible to flexibly adjust the amounts of protrusion of the seat back pad S12*a* and the skin material S12*b*.

In addition, the inflation and deflation of the fluid bag 34*c* may be controlled based on the detection values of the vehicle speed sensor 41 and the steering angle sensor 42 to adjust the amounts of protrusion of the seat back pad S12*a* and the skin material S12*b* in real time.

Second Embodiment

Hereinafter, a vehicle seat according to a second embodiment will be described with reference to FIGS. 12 to 14. The vehicle seat according to the second embodiment has a center folding-type seat back frame 220. Further, the vehicle seat according to the second embodiment has a pivoting angle sensor 245 capable of detecting the pivoting angle of the seat back frame 220 with respect to a seat cushion frame 210 and a center folding angle sensor 246 capable of detecting the center folding angle of the seat back frame 220. An ECU 250, which controls the vehicle seat, determines that the vehicle seat is in a reclining state based on the detection values of the pivoting angle sensor 245 and the center folding angle sensor 246 and controls the inflation and deflation of a shoulder fluid bag 232 arranged on a shoulder support 230 based on the determination result.

<<Main Configuration of Seat Frame>>

Figure 12:
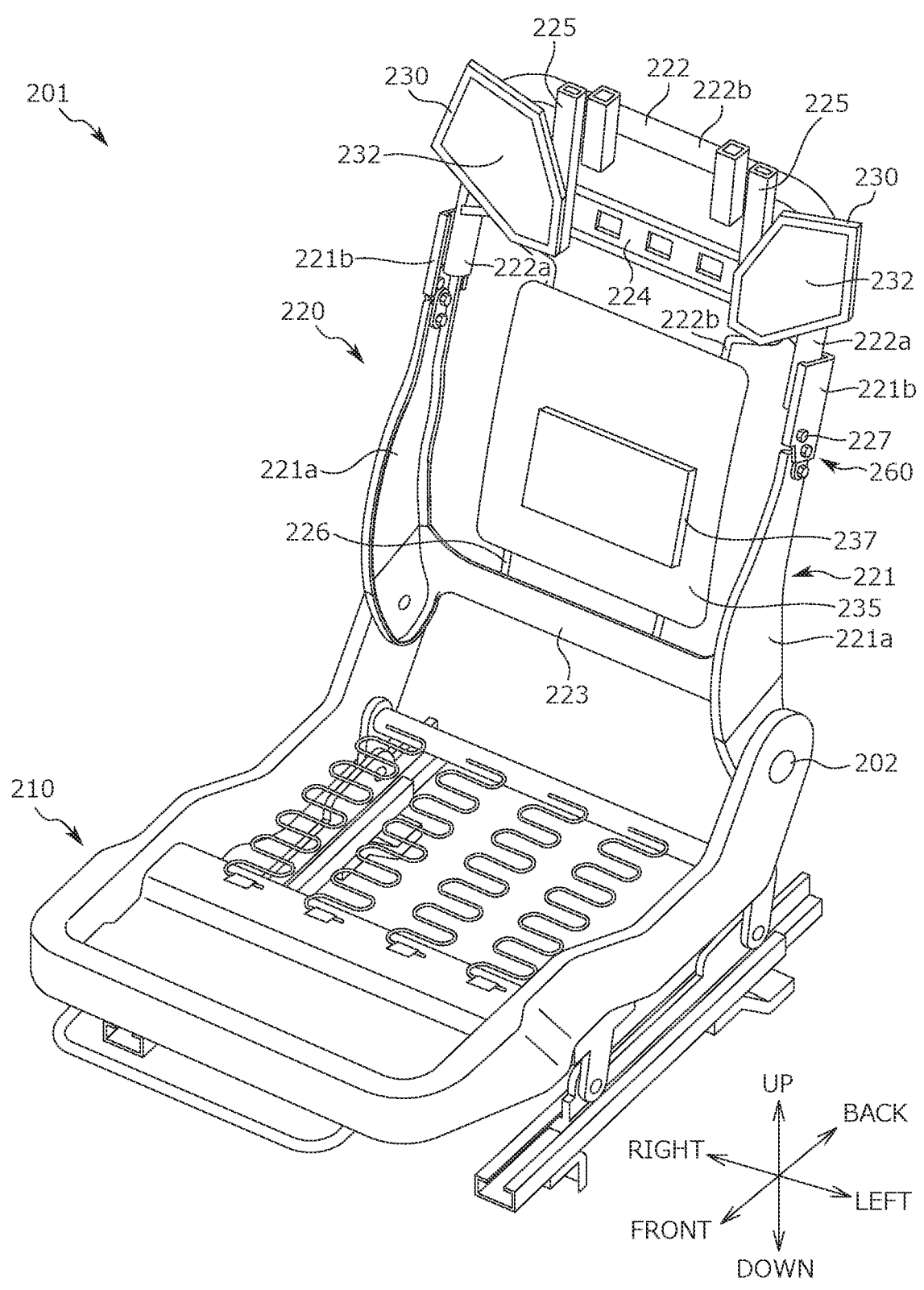
FIG. 12 is a perspective view of a seat frame according to a second embodiment.

FIG. 12 is a perspective view of a seat frame 201 according to the second embodiment. The seat frame 201 has the seat cushion frame 210 and the seat back frame 220 as main components.

The seat back frame 220 is a substantially rectangular frame-shaped body and is pivotable about a pivot shaft 202 with respect to the seat cushion frame 210. The seat back frame 220 is configured mainly from right and left back side frames 221, an upper frame 222, and a lower frame 223.

The seat back frame 220 further has a horizontal connecting frame 224 connecting the upper parts of the right and left back side frames 221 and vertical connecting frames 225 connecting the upper frame 222 and the horizontal connecting frame 224.

One of the back side frames 221 is disposed on the right of the seat back frame 220, and the other back side frame 221 is disposed on the left of the seat back frame 220. The back side frames 221 extend in the up to down direction.

The back side frame 221 has a lower side frame 221*a*, a connecting frame 221*b* attached to the upper end portion of the lower side frame 221*a* and pivotable in the front to back direction with respect to the lower side frame 221*a*, and a drive mechanism 260 pivoting the connecting frame 221*b*.

The lower frame 223 is bridged at the lower end portions of the right and left lower side frames 221*a* to connect the lower side frames 221*a*.

The right and left connecting frames 221*b* are connected to be pivotable about center folding shafts 227 at the upper end portions of the lower side frames 221*a*. Further, the connecting frames 221*b* connect the right and left lower side frames 221*a* and vertical portions 222*a* extending in the up to down direction below the upper frame 222. The connecting frame 221*b* and the vertical portion 222*a* correspond to upper side frames.

The upper frame 222 has a horizontal portion 222*b* interposed between the vertical portions 222*a* and connecting the vertical portions 222*a*. The horizontal portion 222*b* corresponds to an upper frame.

The shoulder supports 230 supporting both shoulders of the seated occupant are attached to the right and left vertical connecting frames 225. The shoulder fluid bags 232 are arranged on the front surfaces of the shoulder supports 230. The shoulder fluid bags 232 are arranged at positions sandwiched between the right and left vertical portions 222*a* in the seat width direction.

A lumbar support 235 is arranged below the shoulder supports 230 and supported by wire members 226 to support the seated occupant's waist. A lumbar fluid bag 237 is arranged on the front surface of the shoulder support 230.

The shoulder fluid bag 232 and the lumbar fluid bag 237 are supplied with fluid and inflate when the back side frame 221 is in a reclining state. As a result, it is possible to improve the comfort of the seated occupant relaxing in a vehicle seat S201.

Next, the drive mechanism 260 will be described.

Figure 13:
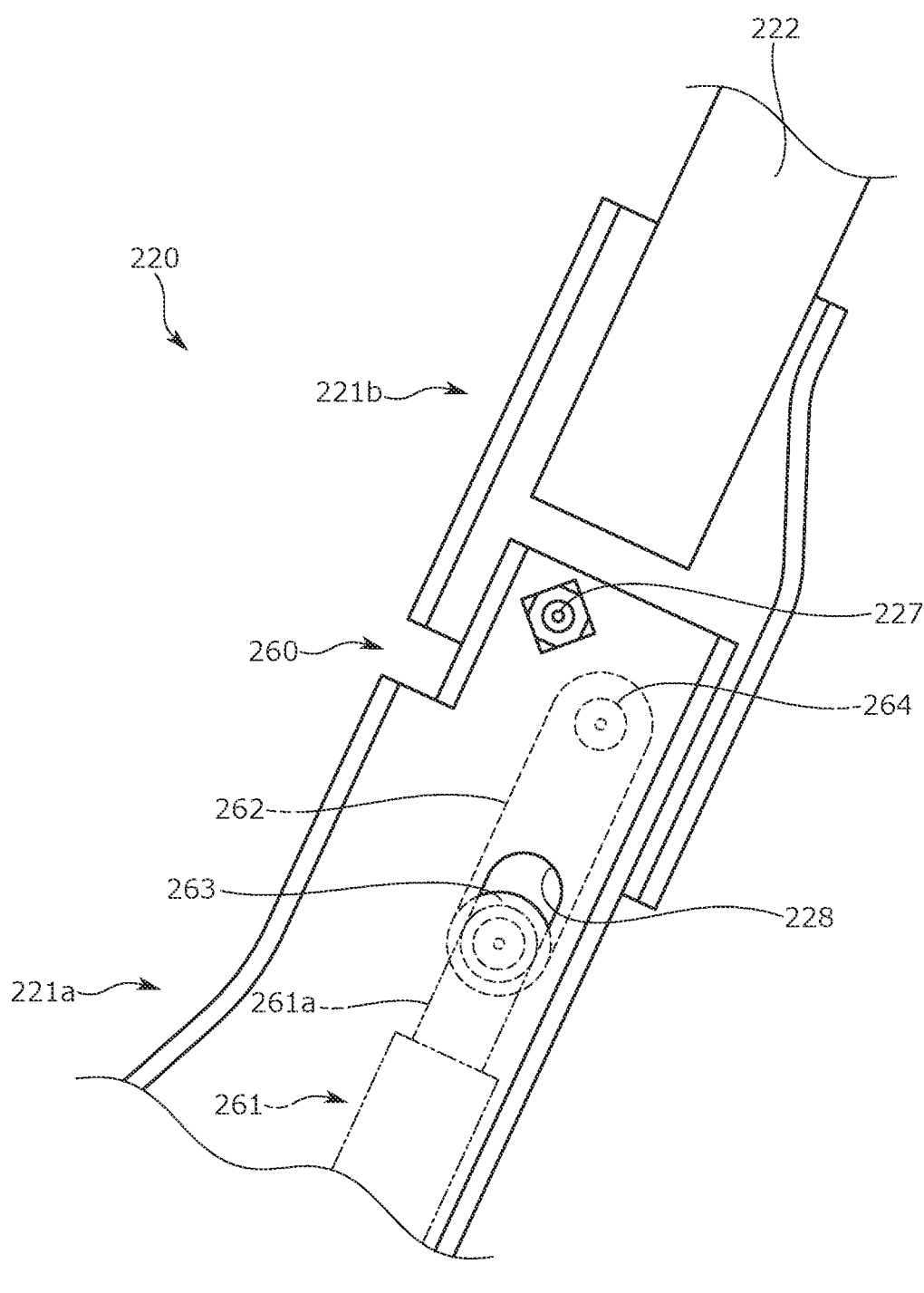
FIG. 13 is a side view of the seat frame, which is an enlarged view of a main part.
Figure 14:
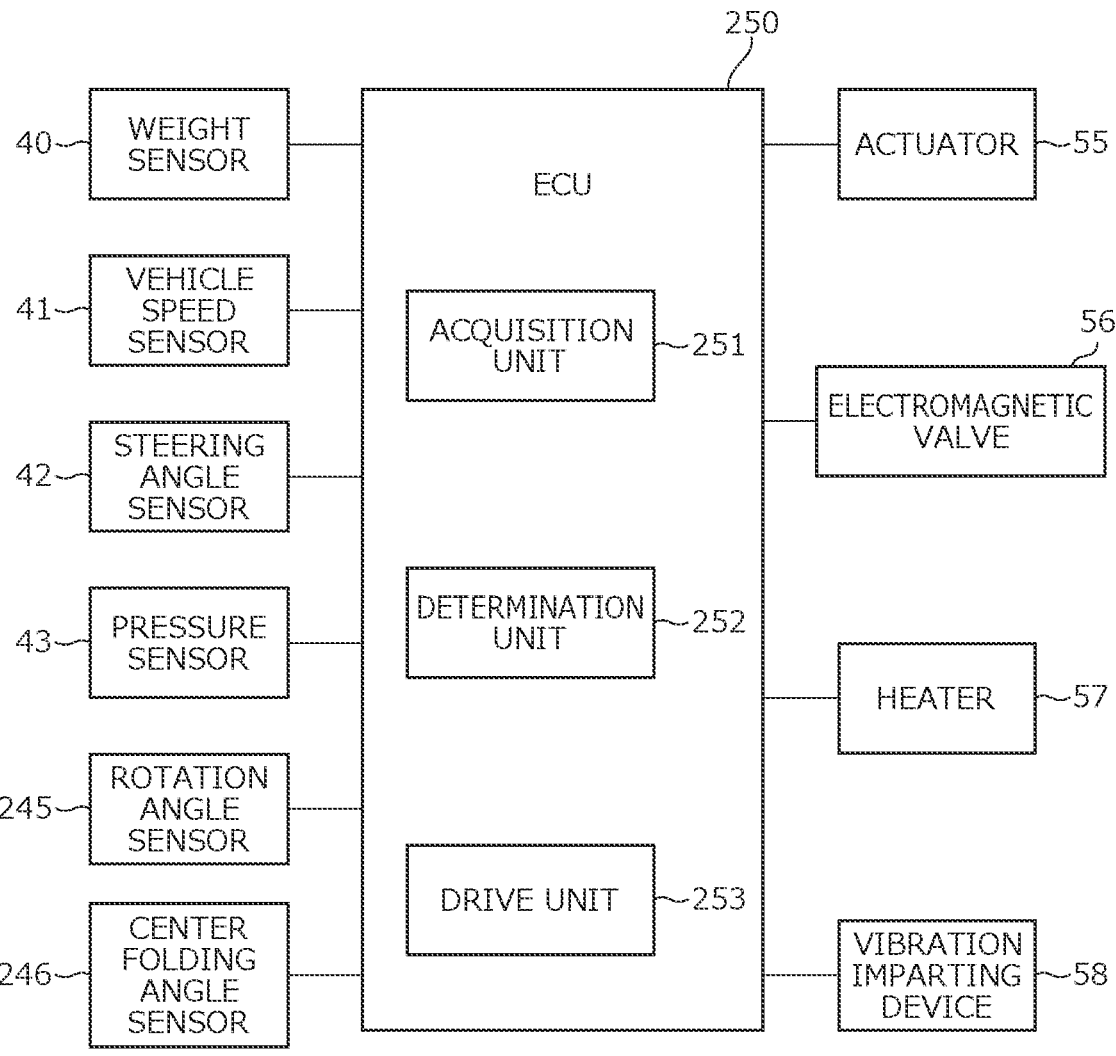
FIG. 14 is a block diagram illustrating the functional configuration of an ECU.

FIG. 13 is a side view of the back side frame 221 and is an enlarged view of the main part of the drive mechanism 260. The drive mechanism 260 has an actuator 261, a link member 262, a first connecting member 263, and a second connecting member 264.

As illustrated in FIG. 13, the actuator 261 is fixed to the lower side frame 221*a* above the lower side frame 221*a*. An ascending and descending rod 261*a* is attached to the tip of the actuator 261. The ascending and descending rod 261*a* is driven by the actuator 261 to move up and down.

The tip of the ascending and descending rod 261*a* is connected to the link member 262 via the first connecting member 263. The first connecting member 263 is guided by a long hole 228 formed in the side surface of the lower side frame 221*a* and moves up and down together with the ascending and descending rod 261*a* and the link member 262.

The link member 262 has an elongated shape and extends upward and downward. The lower side of the link member 262 is connected to be pivotable with respect to the ascending and descending rod 261*a* about the first connecting member 263 as an axis. Further, the upper side of the link member 262 is pivotably connected to the connecting frame 221*b* via the second connecting member 264.

The operation of the drive mechanism 260 configured as above will be described. The actuator 261 is driven by the seated occupant executing a center fold adjustment operation. When the actuator 261 is driven, the ascending and descending rod 261*a* and the first connecting member 263 are guided by the long hole 228 and ascend. At this time, the link member 262 tilts rearward about the first connecting member 263 as an axis and pushes out the second connecting member 264 upward. As a result, the connecting frame 221*b* pivotably connected to the second connecting member 264 pivots about the center folding shaft 227 with respect to the lower side frame 221*a*.

<<Regarding Functional Configuration of ECU 250>>

Next, the ECU 250 will be described. FIG. 14 illustrates the functional configuration of the ECU 250. The ECU 250 has an acquisition unit 251, a determination unit 252, and a drive unit 253.

The acquisition unit 251 acquires detection values from the weight sensor 40, the vehicle speed sensor 41, the steering angle sensor 42, the pressure sensor 43, the inflation pressure sensor 44, the pivoting angle sensor 245, and the center folding angle sensor 246.

The pivoting angle sensor 245 is capable of detecting the pivoting angle of the seat back frame 220 with respect to the seat cushion frame 210. The center folding angle sensor 246 is capable of detecting the center folding angle of the connecting frame 221*b* with respect to the lower side frame 221*a*.

The pivoting angle that is output by the pivoting angle sensor 245 corresponds to a first pivoting angle signal, and the center folding angle that is detected by the center folding angle sensor 246 corresponds to a second pivoting angle signal.

The determination unit 252 determines the state of the seat back frame 220 from the pivoting angles detected by the pivoting angle sensor 245 and the center folding angle sensor 246. More specifically, the determination unit 252 determines whether the seat back frame 220 is in "normal state" or "reclining state".

The normal state is, for example, a state where the seat back frame 220 is substantially upright with respect to the seat cushion frame 210 and the connecting frame 221*b* is not center-folded with respect to the lower side frame 221*a*.

On the other hand, the reclining state is a state where the seat back frame 220 is tilted rearward with respect to the seat cushion frame 210 and the connecting frame 221*b* is pivoted and center-folded with respect to the lower side frame 221*a*.

The determination unit 252 has a determination condition table that defines determination conditions for determining whether the combination of the detection values of the pivoting angle sensor 245 and the center folding angle sensor 246 corresponds to the normal state or the reclining state. Further, the determination unit 252 compares the detection value acquired by the acquisition unit 251 with the determination conditions defined in the determination condition table to determine whether the seat back frame 220 is in "normal state" or "reclining state".

The drive unit 253 controls the shoulder fluid bag 32 and the lumbar fluid bag 37 to inflate or deflate based on the determination result of the determination unit 252. When it is determined that the seat back frame 220 is in the reclining state, the drive unit 253 inflates the shoulder fluid bag 232 and the lumbar fluid bag 237 to receive the load of the seated occupant with the shoulder support 230 and the lumbar support 235. In this manner, with the conveyance seat of the present embodiment, it is possible to further improve the comfort of the seated occupant relaxing in the vehicle seat that is in the reclining state. In addition, by providing the shoulder fluid bag 232 and the lumbar fluid bag 237 on the seat back frame 220 where the connecting frame 221*b* and the vertical portion 222*a* are center-folded, posture support adjustment can be performed more finely.

Third Embodiment

A vehicle seat according to a third embodiment will be described below with reference to FIGS. 15 to 17. The vehicle seat according to the third embodiment has shoulder supports 330 and lumbar supports 335, and the positions of the shoulder supports 330 and lumbar supports 335 in the up to down direction are adjustable. Further, the shoulder support 330 is controlled by an ECU 350 to move up and down in conjunction and accordance with the position of the lumbar support 335. Inflatable and deflatable shoulder fluid bags 332 are attached to the shoulder supports 330.

Configuration of Seat Back Frame

Figure 15:
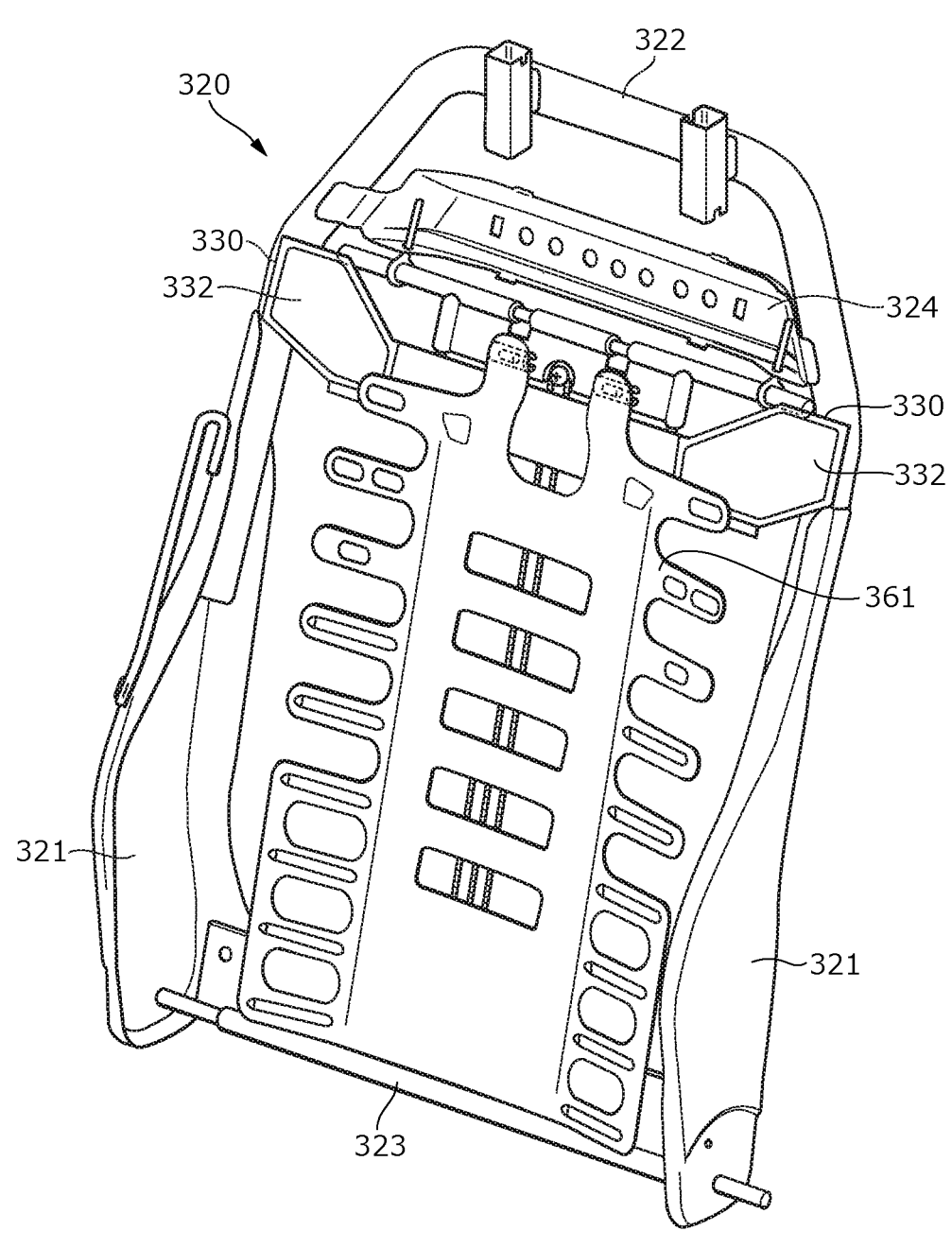
FIG. 15 is a perspective view of a seat back frame according to a third embodiment.

FIG. 15 is a perspective view of a seat back frame 320 of the vehicle seat according to the third embodiment. The seat back frame 320 is a substantially rectangular frame-shaped body and is pivotable with respect to the seat cushion frame.

Figure 16:
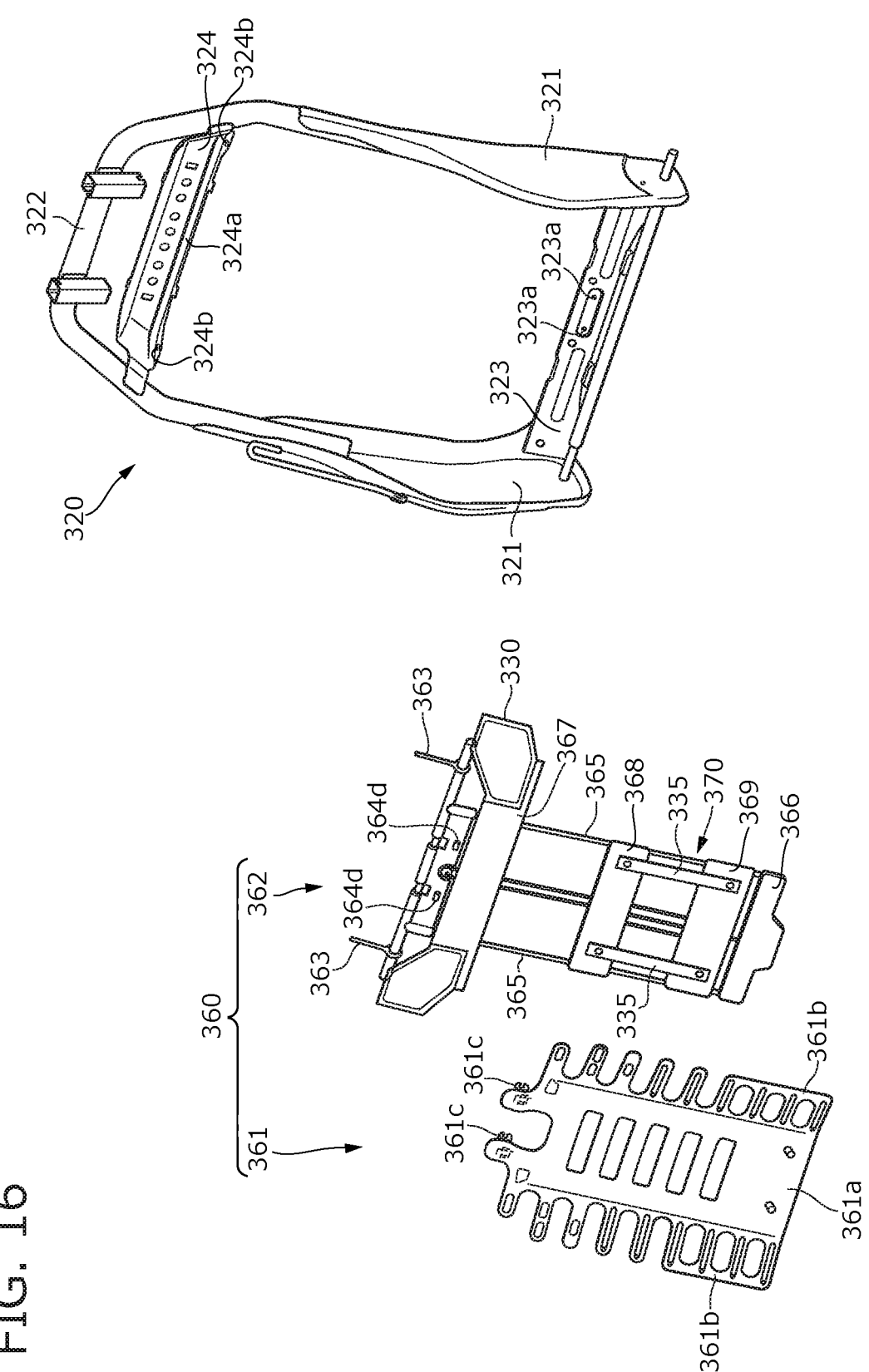
FIG. 16 is a diagram illustrating a state where a support device is removed from the seat back frame.

As illustrated in FIG. 16, the seat back frame 320 is configured mainly from right and left back side frames 321, an upper frame 322, a lower frame 323, and a support device 360 having a lifting and lowering function.

One of the back side frames 321 is disposed on the right of the seat back frame 320, and the other back side frame 321 is disposed on the left of the seat back frame 320. The back side frames 321 extend in the up to down direction.

The upper frame 322 is interposed between the upper end portions of the right and left back side frames 321 to connect the right and left back side frames 321.

The lower frame 323 is bridged at the lower end portions of the right and left back side frames 321 to connect the right and left back side frames 321.

Two attachment holes 323a, which are separated from each other, are formed in the middle of the lower frame 323 in the right to left direction. The attachment hole 323a penetrates the lower frame 323 in the front to back direction. A fastener such as a screw for fixing a lower connecting member (not illustrated) of the support device 360, which will be described later, to the lower frame 323 is inserted through the attachment hole 323a.

The seat back frame 320 further has a horizontal connecting frame 324 connecting the upper parts of the right and left back side frames 321.

The horizontal connecting frame 324 has a lower flange 324a extending forward at the lower edge thereof. Support holes 324b are formed at both end sides of the lower flange 324a in the right to left direction. The support hole 324b penetrates the lower flange 324a in the up to down direction. A support wire 363 of the support device 360, which will be described later, is inserted through the support hole 324b. The support wire 363 is fixed to the horizontal connecting frame 324 in a suspended state.

The support device 360 receives the load that is generated when the seated occupant leans against the seat back. The support device 360 has a lifting and lowering mechanism 370, the shoulder supports 330 and the lumbar supports 335 supporting the seated occupant's shoulders and waist can be lifted and lowered, and it is possible to support an appropriate part in accordance with the seated occupant's body shape.

The support device 360 has a pressure receiving member 361 and a support member 362 as main configurations.

The pressure receiving member 361 is a flexible plate-shaped member made of a resin material. The pressure receiving member 361 extends upward and downward and is capable of receiving the load that is received from the seated occupant's back and waist.

The pressure receiving member 361 has a middle portion 361a positioned in the middle in the right to left direction and side portions 361b extending from the middle portion 361a to both sides in the right to left direction. A plurality of openings are formed in the middle portion 361a and the side portions 361b. Further, the side portion 361b has a plurality of protruding portions. As a result, the pressure receiving member 361 is capable of ensuring the flexibility that is necessary to receive the load from the seated occupant's back and waist. In other words, when the seated occupant is seated, the pressure receiving member 361 is capable of supporting the seated occupant's back and waist so as to wrap around the back and waist while changing in shape in the up to down direction and the right to left direction.

Right and left attachment hooks 361c are formed at the upper end portion of the pressure receiving member 361. The attachment hooks 361c are hooked on locked portions 364d of the support member 362, which will be described later.

The support member 362 supports the pressure receiving member 361 from behind the pressure receiving member 361.

Figure 17:
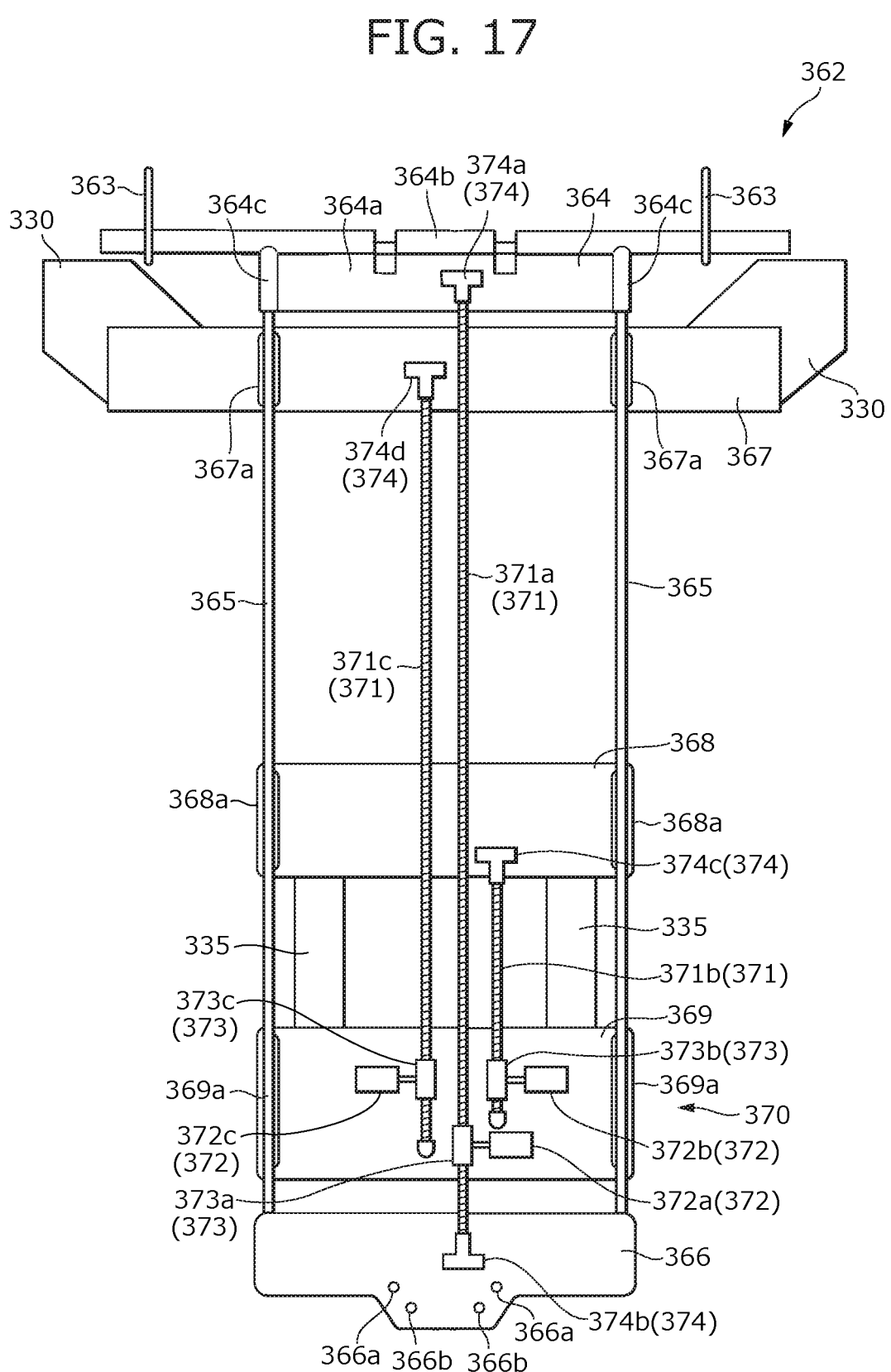
FIG. 17 is a rear view of a support member.

As illustrated in FIG. 17, the support member 362 has the support wires 363, an upper fixing plate 364, guide wires 365, a lower fixing plate 366, a first movable plate 367, a second movable plate 368, a third movable plate 369, and the lifting and lowering mechanism 370 as main configurations. The shoulder supports 330 are attached to the first movable plate 367. The lumbar supports 335 are attached between the second movable plate 368 and the third movable plate 369.

The support wires 363 are a pair of right and left wires that are fixed to the horizontal connecting frame 324 and suspend the support member 362. The support wires 363 are fixed to the horizontal connecting frame 324 by the upper end portions thereof being inserted through right and left support holes 324b formed in the horizontal connecting frame 324 of the seat back frame 320. The lower end portion of the support wire 363 is connected to a horizontal support pipe 364b arranged in the upper portion of the upper fixing plate 364.

The upper fixing plate 364 is positioned at the upper part of the support member 362. The upper fixing plate 364 has an upper fixing plate main body 364a, the horizontal support pipe 364b, and right and left vertical support pipes 364c.

The upper fixing plate main body 364a is a plate-shaped body having an elongated shape extending in the right to left direction. A first upper fixing member 374a of the lifting and lowering mechanism 370, which will be described later, is fixed to the upper fixing plate main body 364a. In addition, the upper fixing plate main body 364a is provided with the pair of locked portions 364d (see FIG. 16) formed to the right and left of the first upper fixing member 374a, and the attachment hooks 361c of the pressure receiving member 361 can be hooked.

The horizontal support pipe 364b extends in the right to left direction along the upper edge of the upper fixing plate main body 364a. The horizontal support pipe 364b is a round pipe-shaped body. The support wires 363 are fixed to both end portions of the horizontal support pipe 364b in the right to left direction.

The right and left vertical support pipes 364c extend in the up to down direction at both right and left end portions of the upper fixing plate main body 365a. The vertical support pipe 364c is a hollow round pipe-shaped body. The upper end portion of the guide wire 365, which will be described later, is inserted and fixed in the vertical support pipe 364c.

The guide wires 365 are wires extending in the up to down direction. The two guide wires 365 are disposed in parallel and separated from each other on the right and left. The guide wire 365 guides the ascending and descending operations of the first movable plate 367, the second movable plate 368, and the third movable plate 369, which will be described later. The lower ends of the guide wires 365 are fixed to the end portions of the lower fixing plate 366 in the right to left direction.

The lower fixing plate 366 is positioned at the lower part of the support member 362. The lower fixing plate 366 is a plate-shaped body having an elongated shape extending in the right to left direction.

On the back side surface of the lower fixing plate 366, projections 366a are provided at separated right and left positions. The projections 366a abut against the front surface of the lower frame 323 when the support member 362 is assembled to the seat back frame 320.

Through holes 366b for attaching the lower connecting member (not illustrated) connecting the support member 362 to the lower frame 323 is formed inside the projections 366a of the lower fixing plate 366 in the right to left direction.

The lower connecting member is fixed to the attachment hole 323a formed in the lower frame 323 using a fastening member such as a screw.

The first movable plate 367, the second movable plate 368, and the third movable plate 369 are plate-shaped bodies that can be moved up and down by the lifting and lowering mechanism 370, which will be described later.

The first movable plate 367 is positioned above the second movable plate 368 and the third movable plate 369. The first movable plate 367 has guided portions 367a, which extend upward and downward and are formed on both sides in the right to left direction. The right and left guided portions 367a have grooves slidable along the right and left guide wires 365 extending in parallel in the up to down direction.

The shoulder supports 330 are fixed to both end portions of the first movable plate 367 in the right to left direction. The shoulder fluid bag 332 (see FIG. 15) is attached to the shoulder support 330 as in the embodiment described above. The shoulder fluid bag 332 can be inflated or deflated by fluid injection into the shoulder fluid bag 332 or fluid discharge out of the shoulder fluid bag 332. As will be described later, the shoulder support 330 moves up and down in conjunction with the lumbar support 335. As a result, both shoulders of the seated occupant can be supported at appropriate positions in accordance with the seated occupant's body shape and seated occupant supportability can be improved.

The second movable plate 368 is positioned below the first movable plate 367 and above the third movable plate 369. The second movable plate 368 has guided portions 368a, which extend upward and downward and are formed at both end portions in the right to left direction. The right and left guided portions 368a have grooves slidable along the right and left guide wires 365 extending in the up to down direction.

The third movable plate 369 is positioned below the first movable plate 367 and the second movable plate 368. The third movable plate 369 has guided portions 369a, which extend upward and downward and are formed at both end portions in the right to left direction. The right and left guided portions 369a have grooves slidable along the right and left guide wires 365 extending in the up to down direction.

The lumbar supports 335 are belt-shaped bodies that are positioned between the second movable plate 368 and the third movable plate 369 and span both the right and left sides. The lumbar supports 335 extend in the up to down direction. The upper end portions of the lumbar supports 335 are fixed to the second movable plate 368. The lower end portions of the lumbar supports 335 are fixed to the third movable plate 369.

The lumbar supports 335 change in shape based on the relative positions of the second movable plate 368 and the third movable plate 369. More specifically, the lumbar supports 335 bend forward and bulge when the second movable plate 368 and the third movable plate 369 are displaced from mutually separated positions to positions close to each other. As a result, the seated occupant's waist can be supported at an appropriate position in accordance with the seated occupant's body shape and seated occupant supportability can be improved.

The lifting and lowering mechanism 370 drives the first movable plate 367, the second movable plate 368, and the third movable plate 369 such that the positions of the plates in the up to down direction change. The lifting and lowering mechanism 370 has a screw shaft 371, a motor 372, a transmission member 373, and a fixing member 374.

The screw shaft 371 is a rod-shaped body having an outer peripheral surface formed with a male thread and extends in the up to down direction. The screw shaft 371 has a first screw shaft 371a, a second screw shaft 371b, and a third screw shaft 371c.

The first screw shaft 371a displaces the third movable plate 369 in the up to down direction by transmitting the drive force of a first motor 372a to the third movable plate 369.

The upper end of the first screw shaft 371a is fixed to the upper fixing plate 364 by the first upper fixing member 374a. The lower end of the first screw shaft 371a is fixed to the lower fixing plate 366 by a first lower fixing member 374b.

The second screw shaft 371b displaces the second movable plate 368 relative to the third movable plate 369 by transmitting the drive force of a second motor 372b to the second movable plate 368.

The upper end of the second screw shaft 371b is fixed to the second movable plate 368 by a second upper fixing member 374c. The lower end of the second screw shaft 371b is not fixed.

The third screw shaft 371c displaces the first movable plate 367 relative to the third movable plate 369 by transmitting the drive force of a third motor 372c to the first movable plate 367.

The upper end of the third screw shaft 371c is fixed to the first movable plate 367 by a third upper fixing member 374d. The lower end of the third screw shaft 371c is not fixed.

The motor 372 is an electric motor that converts electrical energy into rotational energy. The motor 372 has the first motor 372a, the second motor 372b, and the third motor 372c. The first motor 372a, the second motor 372b, and the third motor 372c are fixed to the third movable plate 369.

The transmission member 373 transmits the rotational energy of the motor 372 to the screw shaft 371 by meshing with the output shaft of the motor 372. The transmission member 373 has a first transmission member 373a, a second transmission member 373b, and a third transmission member 373c. The first transmission member 373a, the second transmission member 373b, and the third transmission member 373c are fixed to the third movable plate 369. The transmission member 373 is capable of moving up and down relative to the screw shaft 371.

The first motor 372a and the first transmission member 373a drive the third movable plate 369 so as to displace the third movable plate 369 in the up to down direction. The first motor 372a and the first transmission member 373a are displaced in the up to down direction relative to the support device 360 together with the third movable plate 369.

The second motor 372b and the second transmission member 373b drive the second movable plate 368 so as to displace the second movable plate 368 in the up to down direction. The second movable plate 368 is displaced in the up to down direction relative to the third movable plate 369 together with the second screw shaft 371b.

The third motor 372c and the third transmission member 373c drive the first movable plate 367 so as to displace the first movable plate 367 in the up to down direction. The first movable plate 367 is displaced in the up to down direction relative to the third movable plate 369 together with the third screw shaft 371c.

The operation of the support device 360 configured as above will be described. The first motor 372a is driven by the seated occupant executing the operation of lifting and lowering the shoulder supports 330 and the lumbar supports 335. The drive force of the first motor 372a is transmitted to the first screw shaft 371a via the first transmission member 373a, and the third movable plate 369 ascends and descends in the up to down direction. At this time, the first movable plate 367 and the second movable plate 368 also ascend and descend in the up to down direction in conjunction with the third movable plate 369.

Here, when the second motor 372b is driven, the drive force of the second motor 372b is transmitted to the second screw shaft 371b via the second transmission member 373b, and the second movable plate 368 ascends and descends in the up to down direction relative to the third movable plate 369. As the distance between the second movable plate 368 and the third movable plate 369 decreases, the lumbar supports 335 change in shape and bulge forward. As a result, the seated occupant's waist can be supported appropriately.

The third motor 372c drives the shoulder supports 330 to ascend and descend in conjunction with the positions of the lumbar supports 335 in the up to down direction. The drive force of the third motor 372c is transmitted to the third screw shaft 371c via the third transmission member 373c. As a result, the first movable plate 367 to which the shoulder supports 330 are attached ascends and descends in the up to down direction relative to the third movable plate 369. In this manner, by interlocking the position of the shoulder support 330 in the up to down direction with the position of the lumbar support 335, the shoulder support 330 and the lumbar support 335 can be positioned at appropriate positions in accordance with the seated occupant's body shape. Therefore, the seated occupant's comfort can be improved.

In addition, the ECU 350 according to the third embodiment may control the shoulder fluid bag 332 attached to the shoulder support 330 to inflate or deflate based on a road surface situation, the steering angle of the steering wheel, the driving mode, and the pivoting angle of the seat back. As a result, it is possible to appropriately support the seated occupant in accordance with the seated occupant's body shape and a travel situation.

Although the lumbar support 335 in the above description is a belt-shaped body that is positioned between the second movable plate 368 and the third movable plate 369 and spans both the right and left sides, the present invention is not limited thereto. The lumbar support 335 may be a lumbar fluid bag arranged on either the second movable plate 368 or the third movable plate 369. In this case, control can be performed such that the lumbar support 335 is inflated and deflated by the fluid that is supplied to the lumbar fluid bag.

Fourth Embodiment

A vehicle seat S401 according to a fourth embodiment will be described below with reference to FIGS. 18 to 20. The vehicle seat S401 has shoulder supports 430 and side supports 460 on both sides in the seat width direction. The shoulder support 430 incorporates a plurality of shoulder fluid bags. Likewise, side support 460 incorporates a plurality of side fluid bags 462. The shoulder fluid bags and the side fluid bags 462 are inflated by compressed air injection and deflated by compressed air discharge. The plurality of shoulder fluid bags and the plurality of side fluid bags 462 are mutually different in size, are disposed in mutually different directions, and inflate and protrude in mutually different directions. As a result, the seated occupant's torso can be appropriately and flexibly supported from the sides in accordance with the seated occupant's body shape, seated occupant supportability can be improved, and the sense of security can be increased.

<<Basic Configuration of Vehicle Seat>>

Figure 18:
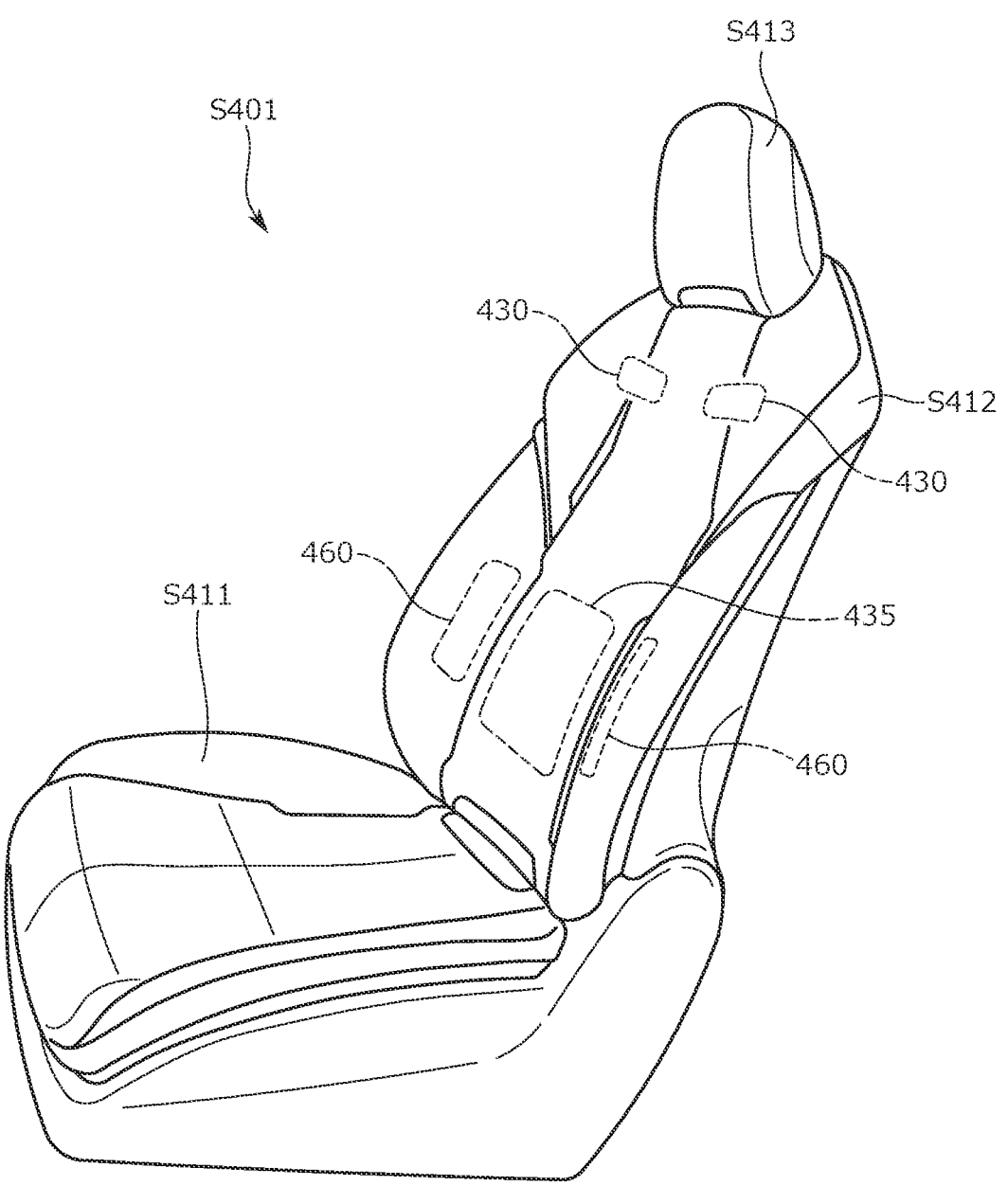
FIG. 18 is an explanatory diagram of the basic configuration of a vehicle seat according to a fourth embodiment.

FIG. 18 is a perspective view illustrating the basic configuration of the vehicle seat S401 according to the fourth embodiment. As illustrated in FIG. 18, the vehicle seat S401 has a seat cushion S411, a seat back S412, and a headrest S413 as main configurations.

The seat back S412 incorporates a seat back frame 420 (see FIG. 19), the right and left shoulder supports 430 respectively disposed inside a skin material S412b (see FIG. 20), a lumbar support 435, and the side supports 460.

Figure 19:
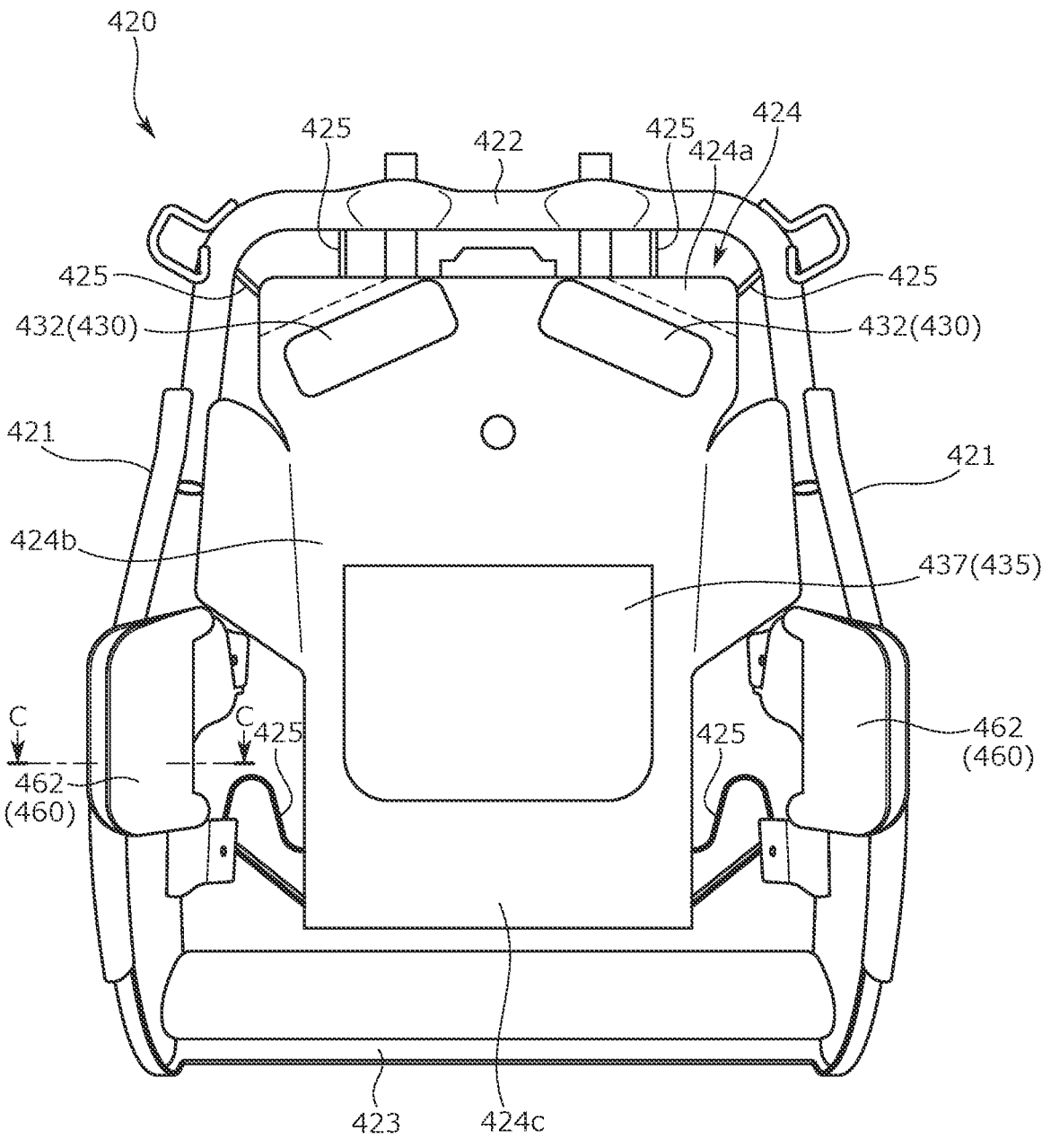
FIG. 19 is a front view of a seat back frame.

FIG. 19 is a front view of the seat back frame 420 forming the skeleton of the vehicle seat S401. As illustrated in FIG. 19, the seat back frame 420 is a substantially rectangular frame-shaped body.

The seat back frame 420 is configured mainly from right and left back side frames 421, an upper frame 422, and a lower frame 423. In addition, a pressure receiving member 424 is arranged between the seat back frame 420 and a seat back pad (not illustrated). The pressure receiving member 424 is a plate-shaped body made of resin and receives the pressure that is applied from the seated occupant's back and waist.

The pressure receiving member 424 has an uppermost upper portion 424a, a middle portion 424b wider than the upper portion 424a, and a lower portion 424c extending downward. The upper portion 424a, the middle portion 424b, and the lower portion 424c are integrally molded to constitute one pressure receiving member 424.

Shoulder fluid bags 432 constituting the shoulder supports 430 are fixed on the front side of the upper portion 424a and both sides in the right to left direction. By using the pressure receiving member 424 as a member for fixing the shoulder fluid bags 432 in this manner, the number of components can be reduced as compared with a case where a support member is provided separately, and the configuration of the seat back frame 420 can be simplified.

The middle portion 424b is disposed at a position sandwiched between the back side frames 421. The middle portion 424b is bent and protrudes such that the parts thereof positioned on both end sides in the seat width direction are directed slightly forward with respect to the part positioned in the middle in the seat width direction.

The lower portion 424c is somewhat narrower than the upper portion 424a, and the lower end of the lower portion 424c extends downward up to the vicinity of the lower frame 423.

A lumbar fluid bag 437 constituting the lumbar support 435 is attached at a position straddling the middle portion 424b and the lower portion 424c. By using the pressure receiving member 424 as a member for fixing the lumbar fluid bag 437 in this manner, the number of components can be reduced as compared with a case where a support member is provided separately, and the configuration of the seat back frame 420 can be simplified.

The pressure receiving member 424 configured as described above is attached to the seat back frame 420 by elastic support wires 425. The pressure receiving member 424 fixed to the seat back frame 420 by the support wires 425 is flexible and capable of receiving the load from the seated occupant's back and waist.

Further, the side fluid bags 462 constituting the side supports 460 are attached to the back side frames 421 positioned outside the lower portion 424c of the pressure receiving member 424 described above in the right to left direction.

Figure 20:
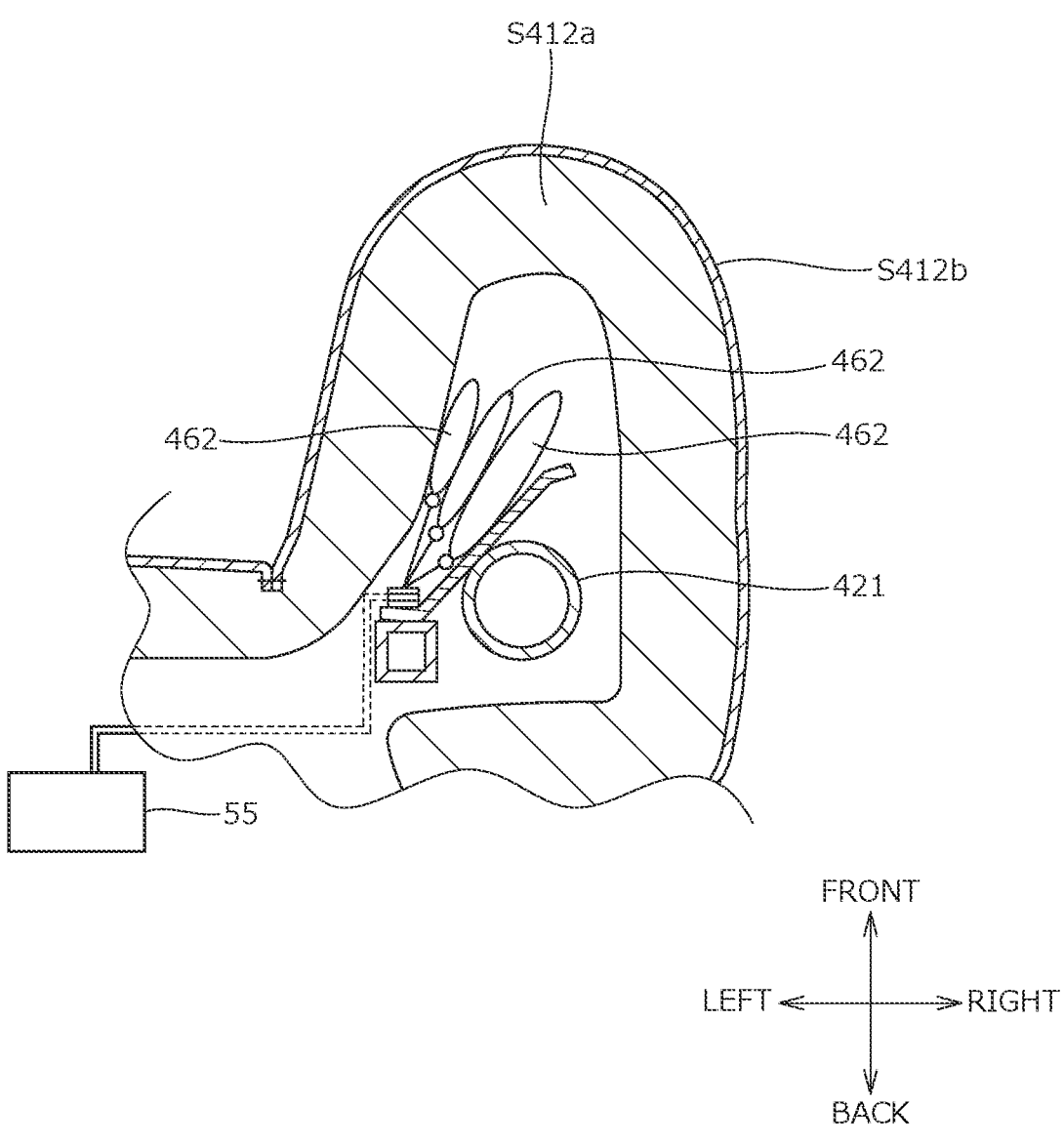
FIG. 20 is a cross-sectional view taken along line C-C of FIG. 19 and illustrates a state where a side fluid bag is inflated.

FIG. 20 is a cross-sectional view taken along line C-C of FIG. 19. As illustrated in FIG. 20, the three side fluid bags 462 that are stacked are attached to the side support 460. Each side fluid bag 462 is inflated by compressed air injection and deflated by compressed air discharge. Each side fluid bag 462 is stacked when deflated.

Each side fluid bag 462 has a different size. Further, the side fluid bags 462 are disposed in mutually different directions and inflate and protrude in mutually different directions by compressed air injection. As a result, the side supports 460 can be changed into an appropriate and flexible shape in accordance with the seated occupant's body shape and are capable of supporting the seated occupant's torso from the sides. Therefore, seated occupant supportability can be improved and the sense of security can be increased.

The side fluid bag 462 corresponds to a movable body and a third movable body.

In addition, an ECU 450 according to the fourth embodiment may control the shoulder fluid bag 432, the lumbar fluid bag 37, and the side fluid bag 462 to inflate or deflate based on a road surface situation, the steering angle of the steering wheel, the driving mode, and the pivoting angle of the back seat. As a result, it is possible to appropriately support the seated occupant in accordance with the seated occupant's body shape and the state of travel of the vehicle.

Fifth Embodiment

A vehicle seat according to a fifth embodiment will be described below with reference to FIGS. 21 and 22. In the embodiment described above, the seat back frame is provided with the shoulder fluid bag 32 and the lumbar fluid bag 37. On the other hand, in the vehicle seat according to the fifth embodiment, a seat cushion frame 510 is provided with thigh fluid bags 540. An ECU of the vehicle seat according to the fifth embodiment controls the thigh fluid bags 540 to inflate or deflate. As a result, the seated occupant maintains the same posture for a long time without his or her pedal operation being hindered and thrombosis (economy class syndrome) attributable to blood flow deterioration is suppressed.

<<Basic Configuration of Seat Cushion Frame>>

Figure 21:
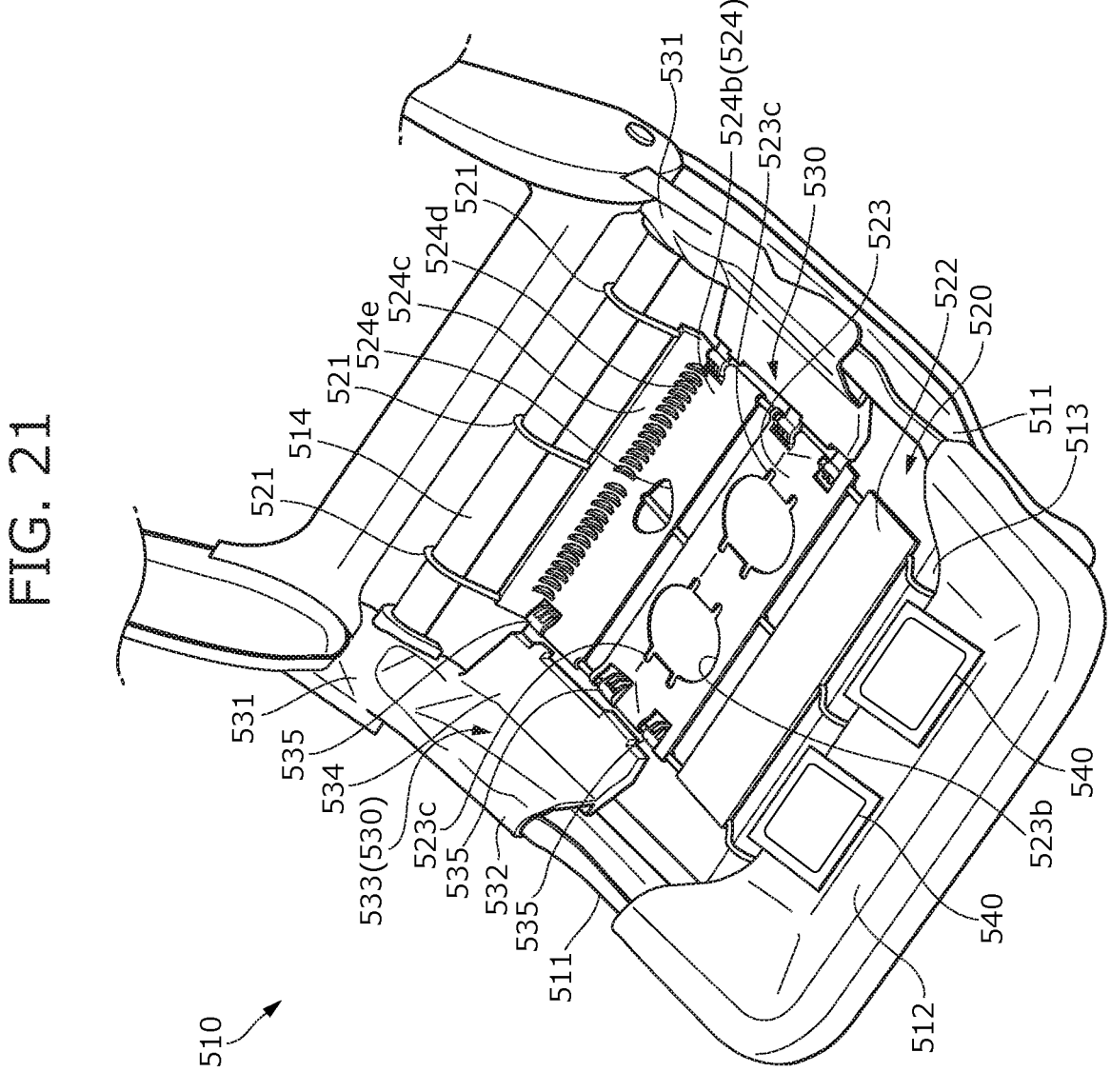
FIG. 21 is a perspective view of a seat cushion frame according to a fifth embodiment.

FIG. 21 is a perspective view of the seat cushion frame 510 according to the fifth embodiment. The seat cushion frame 510 serves as the skeleton of a seat cushion (not illustrated). The seat cushion frame 510 is covered with a seat cushion pad (not illustrated) and a skin material (not illustrated).

Figure 22:
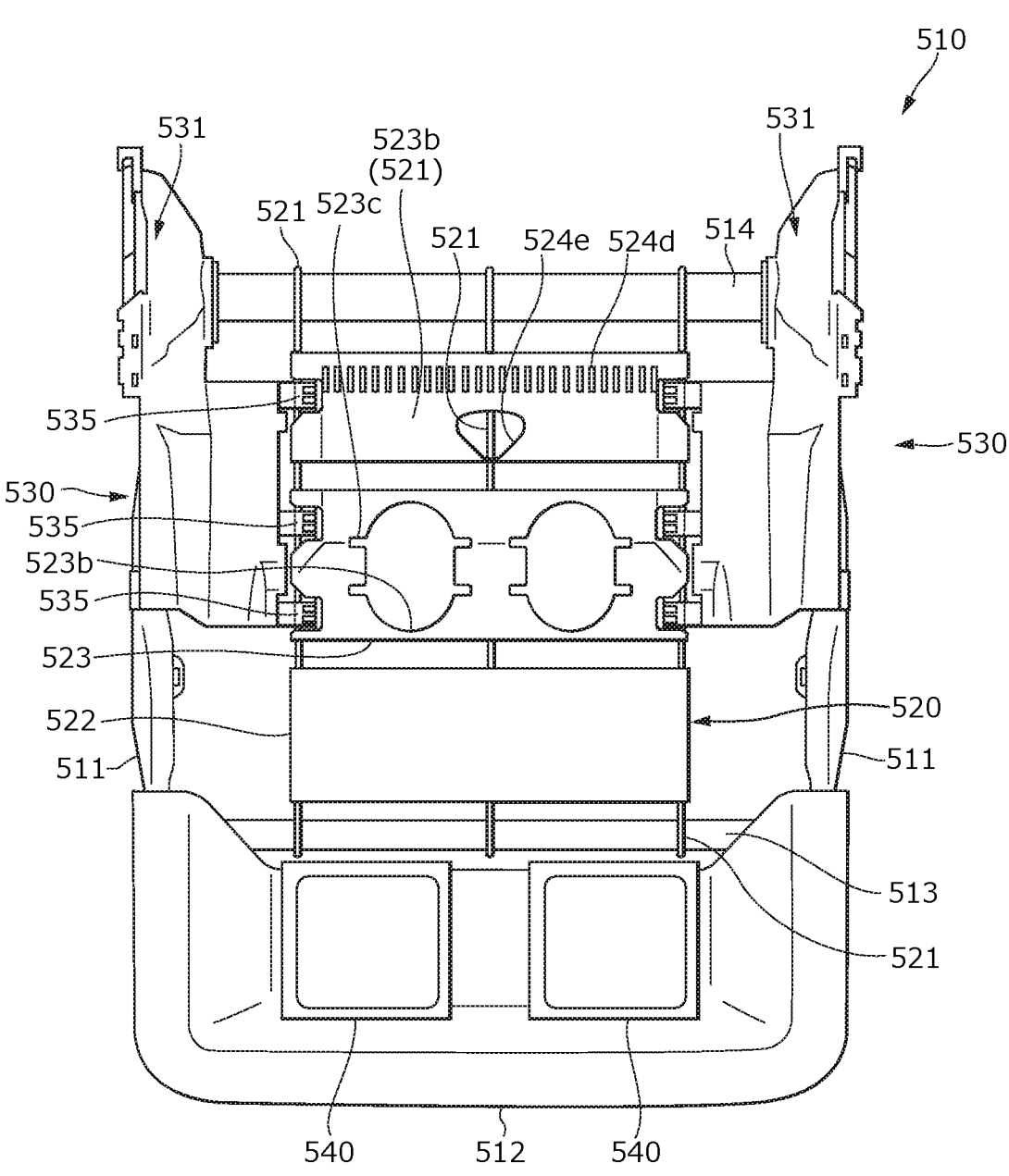
FIG. 22 is a top view of the seat cushion frame.

As illustrated in FIGS. 21 and 22, the seat cushion frame 510 has cushion side frames 511 as side frames, a pan frame 512, a front pipe 513, and a rear pipe 514 as main configurations.

One of the cushion side frames 511 is disposed on the right of the seat cushion frame 510, and the other cushion side frame 511 is disposed on the left of the seat cushion frame 510. The cushion side frame 511 is a plate-shaped body extending in the front to back direction.

The pan frame 512 is interposed on the front end sides of the right and left cushion side frames 511 and connects the right and left cushion side frames 511. The pan frame 512 is a plate-shaped body extending in the right to left direction.

The right and left thigh fluid bags 540 are attached to the upper surface of the pan frame 512. The thigh fluid bag 540 is inflated and deflated by controlling the supply of compressed air. Therefore, it is possible to suppress blood flow deterioration in the seated occupant's lower limbs by stimulating the back sides of his or her thighs.

The front pipe 513 is positioned behind the pan frame 512 and connects the right and left cushion side frames 511.

The rear pipe 514 is interposed on the rear end sides of the right and left cushion side frames 511 and connects the right and left cushion side frames 511.

The seat cushion frame 510 has a pressure receiving member 520 and right and left support members 530.

The pressure receiving member 520 is a member that receives the load of the seated occupant via a pad S2b. The pressure receiving member 520 is disposed between the right and left cushion side frames 511. The pressure receiving member 520 has three wires 521 spanning the front pipe 513 and the rear pipe 514 and a front pressure receiving plate 522, a middle pressure receiving plate 523, and a rear pressure receiving plate 524 to which the wires 521 are connected. Although the front pressure receiving plate 522, the middle pressure receiving plate 523, and the rear pressure receiving plate 524 are flexible members made of resin, the present invention is not limited thereto. The front pressure receiving plate 522, the middle pressure receiving plate 523, and the rear pressure receiving plate 524 may be elastic members made of rubber or the like.

The wires 521 span both ends and the middle in the right to left direction between the front pipe 513 and the rear pipe 514. The wires 521 support the front pressure receiving plate 522, the middle pressure receiving plate 523, and the rear pressure receiving plate 524.

The front pressure receiving plate 522 is positioned in front of the middle pressure receiving plate 523 and the rear pressure receiving plate 524. The front pressure receiving plate 522 is supported by the wires 521 via supported portions (not illustrated) formed on the lower surface. The supported portions are formed at both ends and in the middle in the right to left direction.

The front pressure receiving plate 522 is a plate-shaped body that supports the seated occupant's thighs. The front pressure receiving plate 522 is flexible and changes in shape when the load of the thighs is received.

The middle pressure receiving plate 523 is positioned behind the front pressure receiving plate 522 with a predetermined interval and is positioned in front of the rear pressure receiving plate 524. The middle pressure receiving plate 523 is supported by the wires 521 via supported portions formed on the lower surface. The supported portions are formed at both ends and in the middle in the right to left direction. The middle pressure receiving plate 523 is disposed substantially parallel to a horizontal plane.

The middle pressure receiving plate 523 is a plate-shaped body that supports the seated occupant's thighs and buttocks. The middle pressure receiving plate 523 is flexible and changes in shape when the load of the thighs and buttocks is received.

In the middle pressure receiving plate 523, a through hole 523b is formed at a position corresponding to the seated occupant's ischium. The right and left through holes 523b are arranged with an interval in the right to left direction. The through hole 523b suppresses the concentration of the load from the seated occupant's ischium. In other words, by forming the through hole 523b below the seated occupant's ischium, the load from the ischium can be dispersed around the through hole 523b. As a result, it is possible to improve the comfort of the seated occupant who is seated for a long time.

Four slits 523c extending to the right and left are formed at the edge portion of the through hole 523b. By forming the slits 523c at the edge portion of the through hole 523b, the middle pressure receiving plate 523 can be changed in shape while following the shape of the seated occupant's buttocks and while ensuring the strength that is necessary to receive the load from the seated occupant's thighs. Therefore, seated occupant supportability can be improved.

The rear pressure receiving plate 524 is positioned behind the front pressure receiving plate 522 and the middle pressure receiving plate 523 at predetermined intervals. The rear pressure receiving plate 524 is supported by the wires 521 via supported portions (not illustrated) formed on the lower surface. The supported portions are formed at both ends and in the middle in the right to left direction.

The rear pressure receiving plate 524 is a plate-shaped body that supports the seated occupant's buttocks. The rear pressure receiving plate 524 is flexible and changes in shape when the load of the buttocks is received.

The rear pressure receiving plate 524 has a plate-shaped main body portion 524b, an inclined portion 524c extending from the rear end of the main body portion 524b, and a plurality of ribs 524d arranged side by side in the right to left direction between the main body portion 524b and the inclined portion 524c.

In the main body portion 524b, a through hole 524e is formed at the position that corresponds to the seated occupant's coccyx. The through hole 524e is formed in the middle of the main body portion 524b in the right to left direction. The through hole 524e has a substantially triangular shape and has dimensions and a shape corresponding to the direction and shape of the coccyx with the seated occupant seated. The through hole 524e prevents the concentration of the load from the seated occupant's coccyx. In other words, by forming the through hole 524e below the seated occupant's coccyx, the load from the coccyx can be dispersed around the through hole 524e. As a result, it is possible to improve the comfort of the seated occupant who is seated for a long time.

The inclined portion 524c extends obliquely upward from the rear end of the main body portion 524b. The inclined portion 524c is formed over the entire length of the rear pressure receiving plate 254 in the right to left direction. With the inclined portion 524c, the seated occupant's buttocks can be supported more effectively.

The ribs 524d are a plurality of plate-shaped bodies protruding upward from between the main body portion 524b and the inclined portion 524c. The upper surface of the rib 524d has a curved surface connecting the front surface of the inclined portion 524c and the upper surface of the main body portion 524b so as to be continuous smoothly.

As described above, the front pressure receiving plate 522, the middle pressure receiving plate 523, and the rear pressure receiving plate 524 are disposed at predetermined mutual intervals in the front to back direction. As a result, even in a case where a large load is applied during seating, the load of the seated occupant can be received by the pressure receiving member 520 changing in shape with sufficient flexibility. In addition, even in a case where a large load is applied during seating, mutual interference between the front pressure receiving plate 522, the middle pressure receiving plate 523, and the rear pressure receiving plate 524 is suppressed.

The support members 530 arranged on both sides in the seat width direction are members that support the seated occupant from both the right and left sides. The support member 530 has a first part 531, a second part 532, a third part 533, a fourth part 534, and a connecting portion 535. It should be noted that the first part 531, the second part 532, the third part 533, and the fourth part 534 are formed integrally.

The first part 531 covers the inside of the rear end portion of the cushion side frame 511. The first part 531 has an abutting portion abutting against the rear pipe 514, which connects the rear ends of the right and left cushion side frames 511.

The second part 532 is connected to the front side of the first part 531. The second part 532 covers the upper portion of the flange that is formed at the upper edge of the cushion side frame 511. The second part 532 has a plate shape. The second part 532 is connected to the cushion side frame 511 by a bolt, a resin claw, a clip, or the like.

The third part 533 is connected to the front side of the first part 531. In addition, the third part 533 is connected to the inside of the second part 532. The third part 533 is a plate-shaped body extending obliquely downward from the inside of the second part 532 and forming a side wall. The third parts 533 support both side portions of the seated occupant's buttocks to thighs.

The fourth part 534 is connected to the lower end side of the third part 533. The fourth part 534 is a plate-shaped body extending obliquely inward and downward in the right to left direction from the lower end of the third part 533 and forming an inclined wall. The fourth parts 534 support both side portions of the seated occupant's buttocks to thighs together with the third parts 533.

The connecting portions 535 are connecting members that are arranged at three points in the front to back direction and can be engaged with the wire 521. The two front connecting portions 535 support the middle pressure receiving plate 523 via the wire 521. One rear connecting portion 535, which is positioned behind, supports the rear pressure receiving plate 524 via the wire 521. The connecting portion 535 is attached to the lower end of the fourth part 534. The connecting portion 535 supports the wire 521 outward and upward in the right to left direction by engaging with the wire 521.

Next, the right and left thigh fluid bags 540 will be described. The right and left thigh fluid bags 540 are arranged on the front side of the seat cushion frame 510, on the upper surface of the pan frame 512 to be specific. The thigh fluid bag 540 is arranged at the position that corresponds to the back of the seated occupant's knee or the back side of his or her thigh when the seated occupant is seated.

An ECU 550 according to the fifth embodiment performs control such that fluid supply and discharge are performed with respect to the right and left thigh fluid bags 540. As a result, the right and left thigh fluid bags 540 are inflated and deflated, and the seated occupant's thighs can be stimulated. Therefore, it is possible to improve the blood flow of the seated occupant who maintains the same posture for a long time and suppress the occurrence of the economy class syndrome. In addition, the ECU 550 may determine that the seated occupant maintains the same posture for a long time based on the detection value of the weight sensor 40 described above and control the thigh fluid bag 540 to inflate or deflate based on the determination result. As a result, the occurrence of the economy class syndrome can be suppressed more effectively.

In addition, the ECU 550 may control the right and left thigh fluid bags 540 to alternately inflate and deflate at predetermined time intervals. As a result, it is possible to promote the seated occupant's "thigh raising motion", namely, raising the thigh when the thigh fluid bag 540 is inflated and lowering the thigh when the thigh fluid bag 540 is deflated. Therefore, the occurrence of the economy class syndrome can be suppressed more effectively.

In addition, the ECU 550 may limit the capacity of the fluid that is injected into the thigh fluid bag 540 based on the detection values of the pressure sensor 43 and the inflation pressure sensor 44 described above. As a result, it is possible to suppress the occurrence of a situation in which an excessive inflation of the thigh fluid bag 540 hinders the seated occupant's driving pedal (for example, accelerator and brake) operation.

In addition, the ECU 550 may control the capacity of the fluid that is injected into the thigh fluid bag 540 based on the detection values of the vehicle speed sensor 41, the steering angle sensor 42, and the pivoting angle sensor 45 described above. As a result, it is possible to perform appropriate inflation and deflation control in accordance with the driving state of the vehicle, support the seated occupant's long-time driving, and reduce his or her fatigue.

In addition, the ECU 550 may control the capacity of the fluid that is injected into the thigh fluid bag 540 based on the driving mode of the vehicle. For example, in an autonomous driving mode in which the seated occupant does not have to operate the driving pedals, the seated occupant's fatigue is reduced by controlling the thigh fluid bag 540 to inflate. Then, in a case where the autonomous driving mode is canceled, it is possible to suppress the occurrence of a situation that hinders the seated occupant's pedal operation by controlling the thigh fluid bag 540 to deflate.

Sixth Embodiment

A vehicle seat according to a sixth embodiment will be described below with reference to FIG. 23. In the fifth embodiment described above, the thigh fluid bag 540 is arranged on the front side of the seat cushion frame 510 (upper surface of the pan frame 512). On the other hand, in the vehicle seat according to the sixth embodiment, thigh fluid bags 640 are arranged on both sides in the right to left direction and behind the middle of a seat cushion frame 610 in the front to back direction. As a result, it is possible to appropriately support the seated occupant's buttocks and thighs from the sides in accordance with the seated occupant's body shape.

Figure 23:
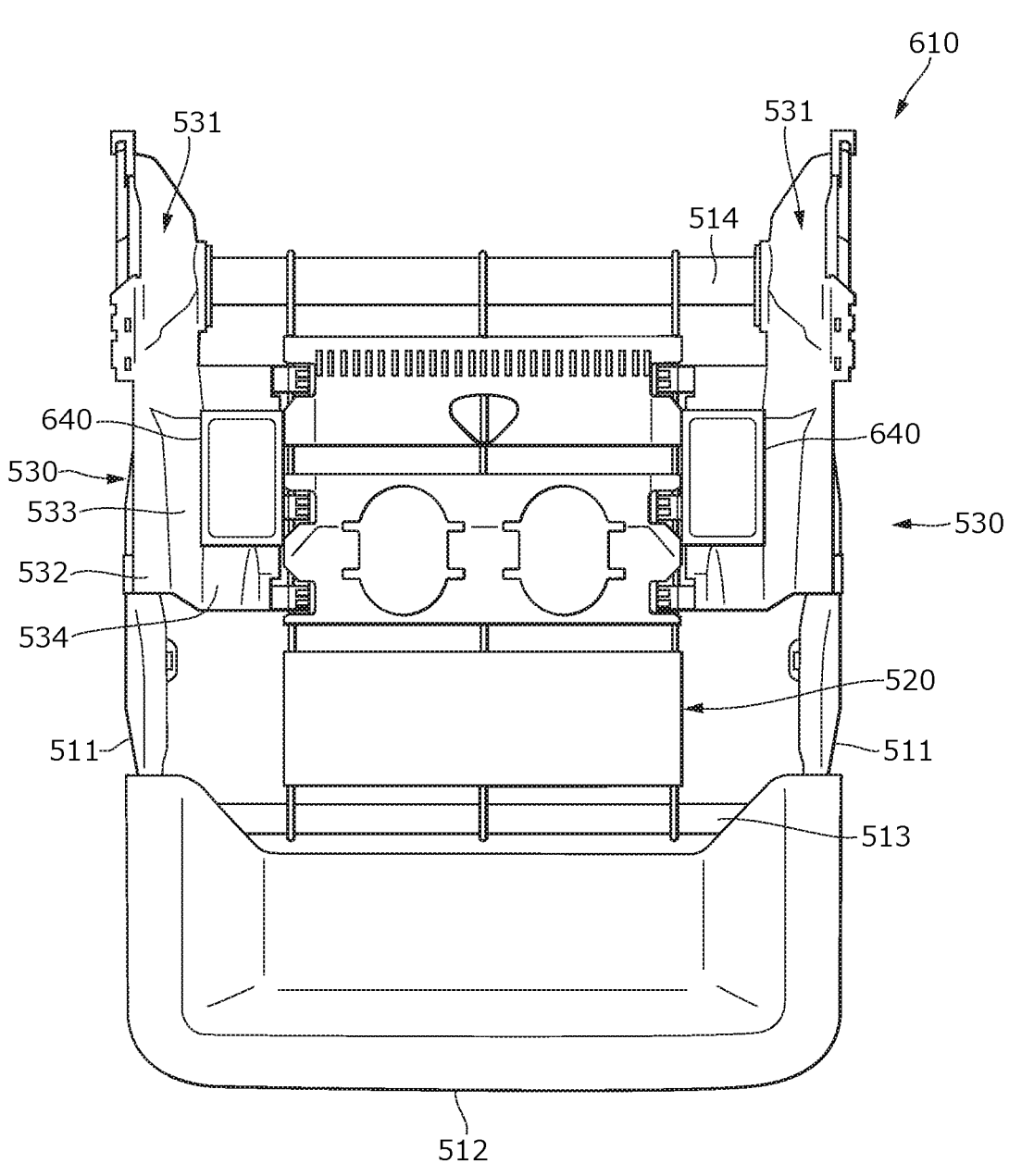
FIG. 23 is a top view of a seat cushion frame according to a sixth embodiment.

FIG. 23 is a top view of the seat cushion frame 610. The seat cushion frame 610 serves as the skeleton of a seat cushion (not illustrated). The seat cushion frame 610 is covered with a seat cushion pad (not illustrated) and a skin material (not illustrated).

The seat cushion frame 610 has the cushion side frames 511 as side frames, the pan frame 512, the front pipe 513, and the rear pipe 514. In addition, the seat cushion frame 610 has the pressure receiving member 520 and the support members 530 between the right and left cushion side frames 511.

The basic configuration of the seat cushion frame 610 is the same as the basic configuration of the seat cushion frame 510 of the fifth embodiment described above, and thus detailed description thereof will be omitted.

As illustrated in FIG. 23, in the vehicle seat according to the sixth embodiment, the thigh fluid bags 640 are arranged at positions different from those of the fifth embodiment. Specifically, the thigh fluid bags 640 are arranged on both sides in the right to left direction and behind the middle of the seat cushion frame 610 in the front to back direction. The thigh fluid bags 640 are attached to the upper surfaces of the fourth parts 534 inside the third parts 533 of the support members 530 arranged on the right and left.

An ECU 650 performs control such that fluid supply or discharge is performed with respect to the right and left thigh fluid bags 640. As a result, the right and left thigh fluid bags 640 are inflated or deflated, and the seated occupant's buttocks and thighs can be supported from below and the sides. In other words, by controlling the amount of compressed air supply to the thigh fluid bag 640, the supporting force of the side portion of the pressure receiving member 520 can be adjusted. Therefore, the buttocks and thighs of seated occupants with different body shapes can be effectively supported from below and the sides, and seated occupant supportability can be improved.

In addition, the ECU 650 may control the capacity of the fluid that is injected into the thigh fluid bag 640 based on the detection values of the vehicle speed sensor 41, the steering angle sensor 42, and the pivoting angle sensor 45 described above. As a result, it is possible to perform appropriate inflation and deflation control in accordance with the seated occupant's body shape and the driving state of the vehicle, support the seated occupant's long-time driving, and reduce his or her fatigue.

Seventh Embodiment

A vehicle seat according to a seventh embodiment will be described below with reference to FIG. 24. In the sixth embodiment described above, the thigh fluid bags 640 are attached to the upper surfaces of the support members 530 arranged on the right and left of the seat cushion frame 610. On the other hand, in the vehicle seat according to the seventh embodiment, biasing members 740 biasing the support members 530 upward are arranged below the support members 530. In this case as well, the supporting force of the side portion of the pressure receiving member 520 can be adjusted by the biasing member 740. In addition, the seated occupant's buttocks and thighs can be appropriately supported from the sides in accordance with the seated occupant's body shape.

Figure 24:
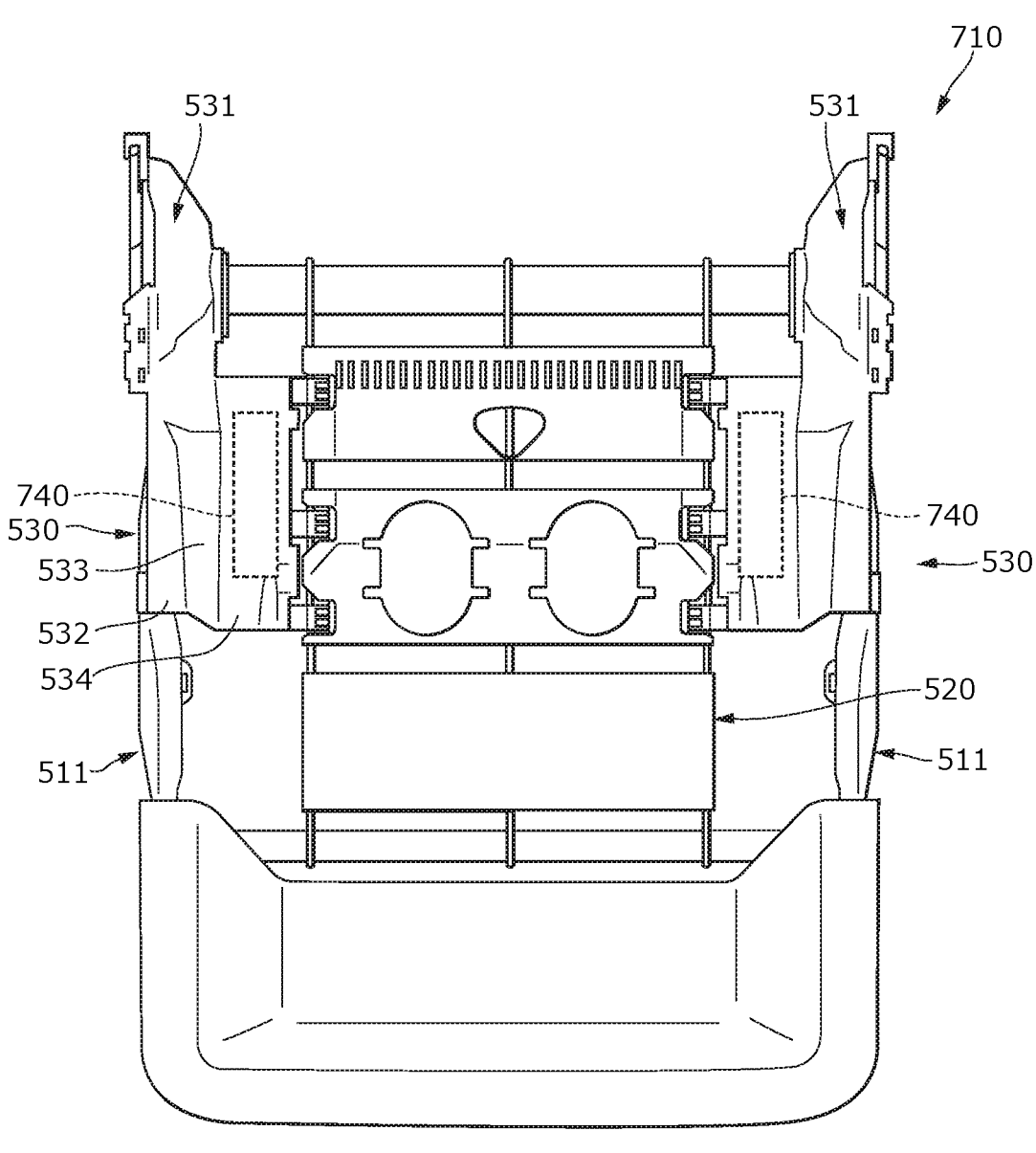
FIG. 24 is a top view of a seat cushion frame according to a seventh embodiment.

FIG. 24 is a top view of a seat cushion frame 710 according to the seventh embodiment. As illustrated in FIG. 24, the biasing members 740 are arranged on both sides in the right to left direction and behind the middle of the seat cushion frame 710 in the front to back direction. The biasing members 740 are arranged below the fourth parts 534 of the support members 530 arranged on the right and left. More specifically, the vehicle seat according to the seventh embodiment includes the pair of right and left cushion side frames 511 and the pressure receiving member 520 disposed between the cushion side frames 511. Further, the vehicle seat further includes the support members 530 provided on both the right and left sides of the pressure receiving member 520 and the biasing members 740 biasing the support members 530 upward.

The support member 530 is a member made of resin. The support member 530 is flexible and can be changed in shape by the biasing member 740 positioned below the support member 530. The biasing member 740 is an elastic member such as a spring. The support member 530, a seat cushion pad (not illustrated), and a skin material (not illustrated) are arranged above the biasing member 740.

Figure 25:
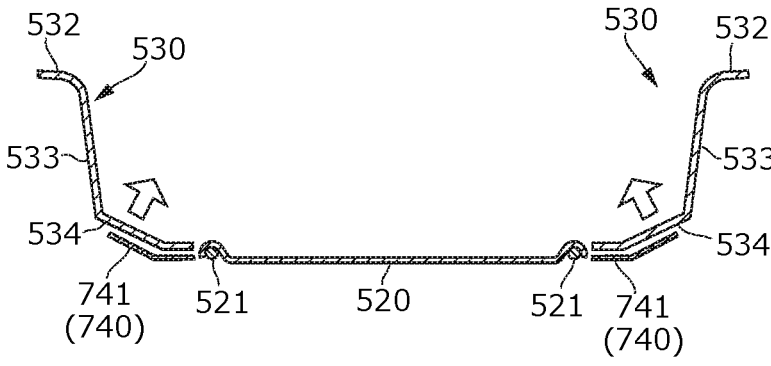
FIG. 25 is a diagram schematically illustrating a state where a torsion spring biases a support member upward.

FIG. 25 is a diagram schematically illustrating a state where the biasing members 740 bias the support members 530 upward. As illustrated in FIG. 25, the biasing members

740 are elastic members including torsion springs 741 arranged below the support members 530. The torsion springs 741 bias the fourth parts 534 of the support members 530 upward. As a result, the seated occupant's buttocks and thighs can be appropriately supported from the sides in accordance with the seated occupant's body shape.

Figure 26:
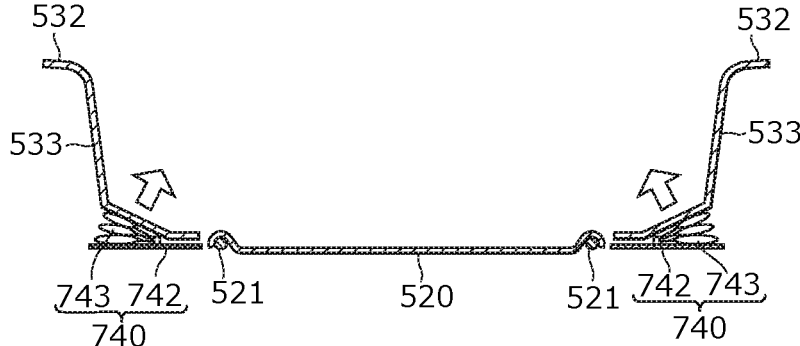
FIG. 26 is a diagram schematically illustrating a state where a thigh fluid bag biases the support member upward.

In addition, as illustrated in FIG. 26, the biasing member 740 may have a support plate 742 fixed below the support member 730 and a thigh fluid bag 743 attached to the upper surface of the support plate 742. An ECU 750 according to the seventh embodiment supplies fluid to the right and left thigh fluid bags 743 and controls the thigh fluid bags 743 to inflate. As a result, the thigh fluid bag 743 is capable of functioning as the biasing member 740. In other words, by supplying a predetermined amount of fluid to the thigh fluid bag 743, the fourth part 534 of the support member 530 is biased upward. As a result, the seated occupant's buttocks and thighs can be appropriately supported from the sides in accordance with the seated occupant's body shape.

Figure 27:
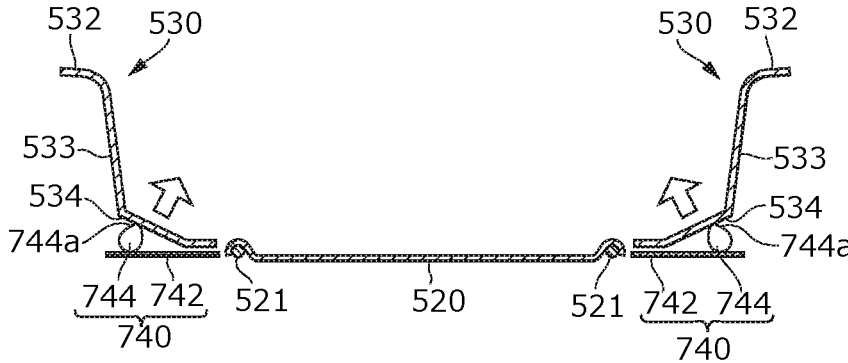
FIG. 27 is a diagram schematically illustrating a state where a cam-shaped elastic rotating body biases the support member upward.

In addition, as illustrated in FIG. 27, the biasing members 740 have the support plates 742 fixed so as to extend in the right to left direction and right and left elastic rotating bodies 744 having a cam shape and attached to the upper surfaces of the support plates 542. The elastic rotating body 744 is an elastic member made of a rubber material.

By the ECU 750 according to the seventh embodiment rotating the right and left elastic rotating bodies 744 with a motor (not illustrated), the elastic rotating body 744 is capable of functioning as the biasing member 740. In other words, by rotating the elastic rotating body 744, the support member 530 can be biased upward by a protruding portion 744a of the elastic rotating body 744. As a result, the seated occupant's buttocks and thighs can be appropriately supported from the sides in accordance with the seated occupant's body shape.

Modification Example

Although the wires 521 supporting the pressure receiving member 520 are three in number in the fifth to seventh embodiments described above, the present invention is not limited thereto. For example, the wires 521 may be two or four or more in number.

In addition, although the front ends of the wires 521 span the front pipe 513 in the above description, the present invention is not limited thereto. The wires 521 may span the pan frame 512.

Eighth Embodiment

A vehicle seat according to an eighth embodiment will be described below with reference to FIGS. 28 to 30. In the fifth to seventh embodiments described above, the pressure receiving member 520 is attached at a predetermined position determined in advance. On the other hand, a seat cushion frame 810 according to the eighth embodiment has a length adjustment mechanism 820 capable of length adjustment in the front to back direction, and the pressure receiving member 520 is configured to be movable in the front to back direction in conjunction with the length adjustment mechanism 820. As a result, the pressure receiving member 520 can be arranged at an appropriate position in accordance with the seated occupant's physique. Therefore, the load of the seated occupant can be appropriately supported in accordance with the seated occupant's physique. <<Basic Configuration of Seat Cushion Frame>>

Figure 28:
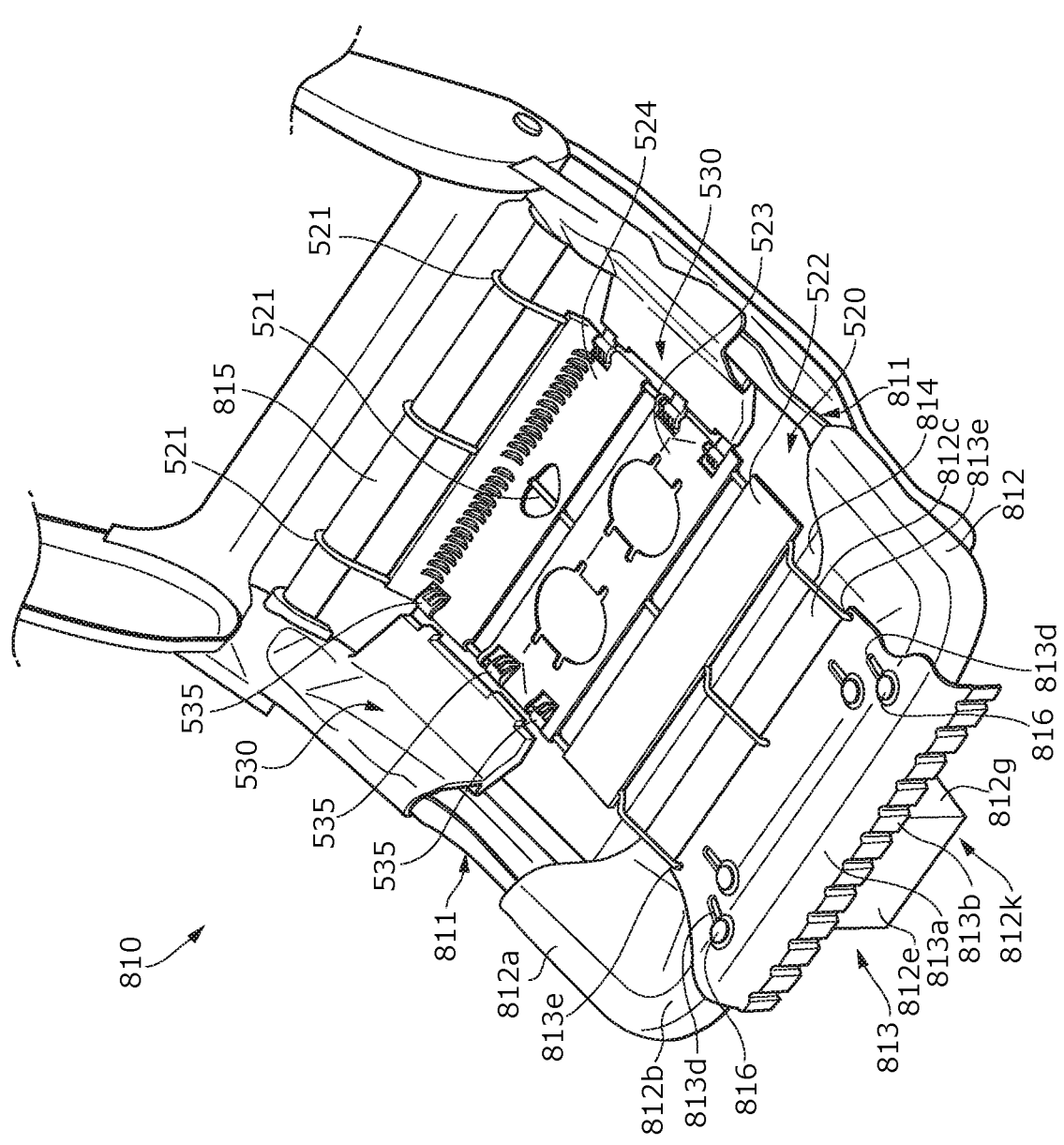
FIG. 28 is a perspective view of a seat cushion frame according to an eighth embodiment.

FIG. 28 is a perspective view of the seat cushion frame 810 according to the eighth embodiment. The seat cushion frame 810 serves as the skeleton of a seat cushion (not illustrated). The seat cushion frame 810 is covered with a seat cushion pad (not illustrated) and a skin material (not illustrated).

The seat cushion frame 810 is configured mainly from cushion side frames 811 as side frames, a fixed pan frame 812, a movable pan frame 813 movable in the front to back direction, a front pipe 814, and a rear pipe 815. In addition, the seat cushion frame 810 has the pressure receiving member 520 and the support members 530 between the right and left cushion side frames 811.

The fixed pan frame 812 has right and left side members 812a extending forward and backward and a front member 812b connecting the front end portions of the side members 812a. The right and left side members 812a and the front member 812b are formed by bending a metal plate. The front member 812b has a plate-shaped portion 812c in the middle in the right to left direction. The plate-shaped portion 812c has a predetermined width forward and backward. Through holes (not illustrated) through which fastening members 816, which will be described later, can be inserted are formed in the plate-shaped portion 812c.

The movable pan frame 813 is arranged so as to be slidable in the front to back direction with respect to the plate-shaped portion 812c of the front member 812b. The movable pan frame 813 has an upper plate 813a placed on the plate-shaped portion 812c and a front plate 813b extending downward from the front of the upper plate 813a and disposed in front of the front member 812b.

The upper plate 813a is formed with a plurality of long holes 813d penetrating the upper plate 813a in the thickness direction and extending forward and backward. Two long holes 813d are provided on the right and left each. The fastening members 816 described above are inserted between the long holes 813d and the through holes that are formed in the plate-shaped portion 812c. The fastening members 816 are fixed with respect to the through holes. The movable pan frame 813 is guided by the long holes 813d and is capable of sliding in the front to back direction with respect to the fixed pan frame 812.

A fixing portion 813e to which the front end of the wire 521 of the pressure receiving member 520 is fixed is formed behind the upper plate 813a. As will be described later, when the movable pan frame 813 is slid in the front to back direction by the length adjustment mechanism 820, the wire 521 moves in the front to back direction in conjunction with the movable pan frame 813. Accordingly, the front pressure receiving plate 522, the middle pressure receiving plate 523, and the rear pressure receiving plate 524 of the pressure receiving member 520 interlock in the front to back direction. Interlocking between the length adjustment mechanism 820 and the pressure receiving member 520 will be described later.

Figure 29:
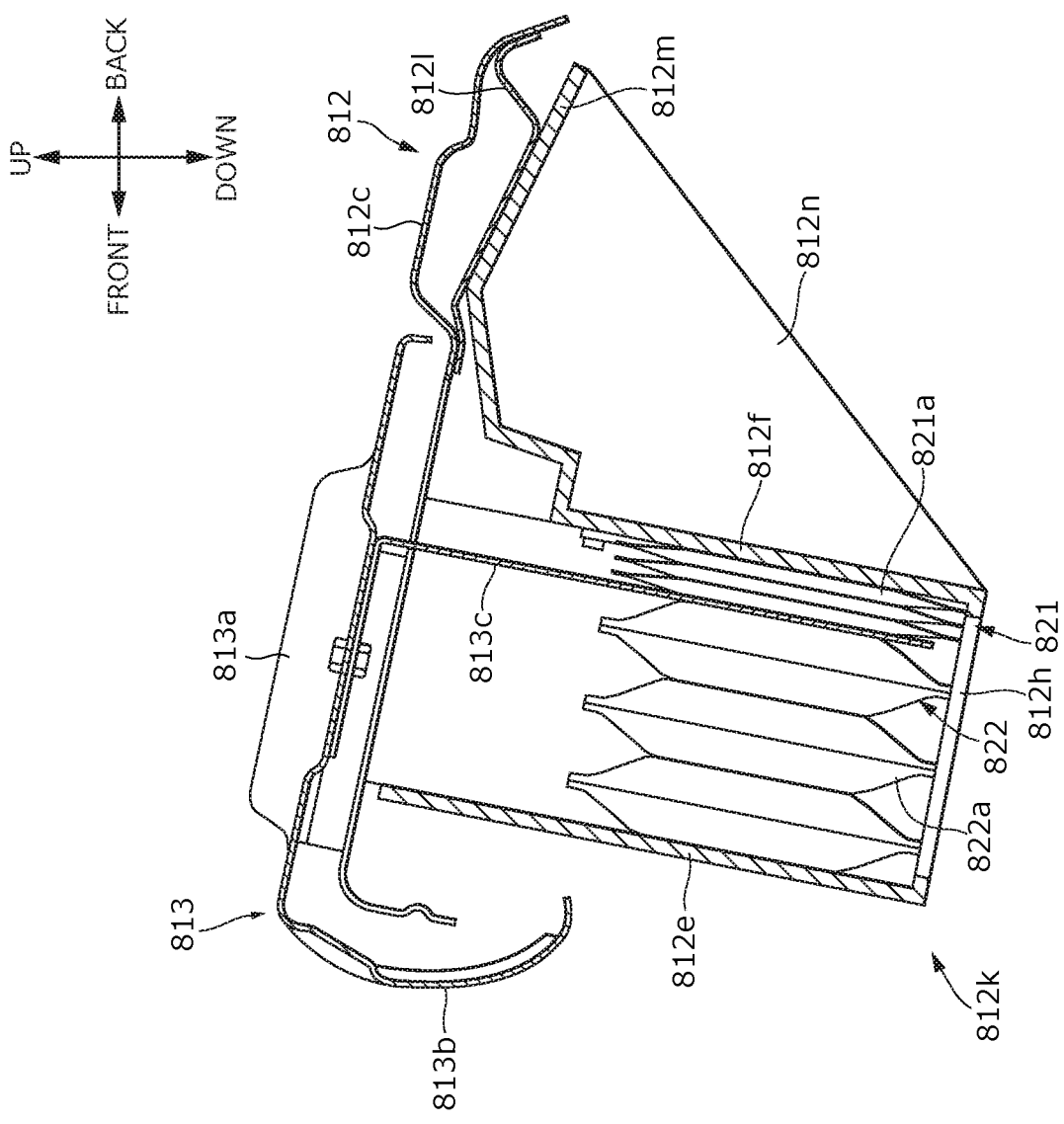
FIG. 29 is a lateral cross-sectional view of FIG. 28 and is an explanatory diagram of a length adjustment mechanism.
Figure 30:
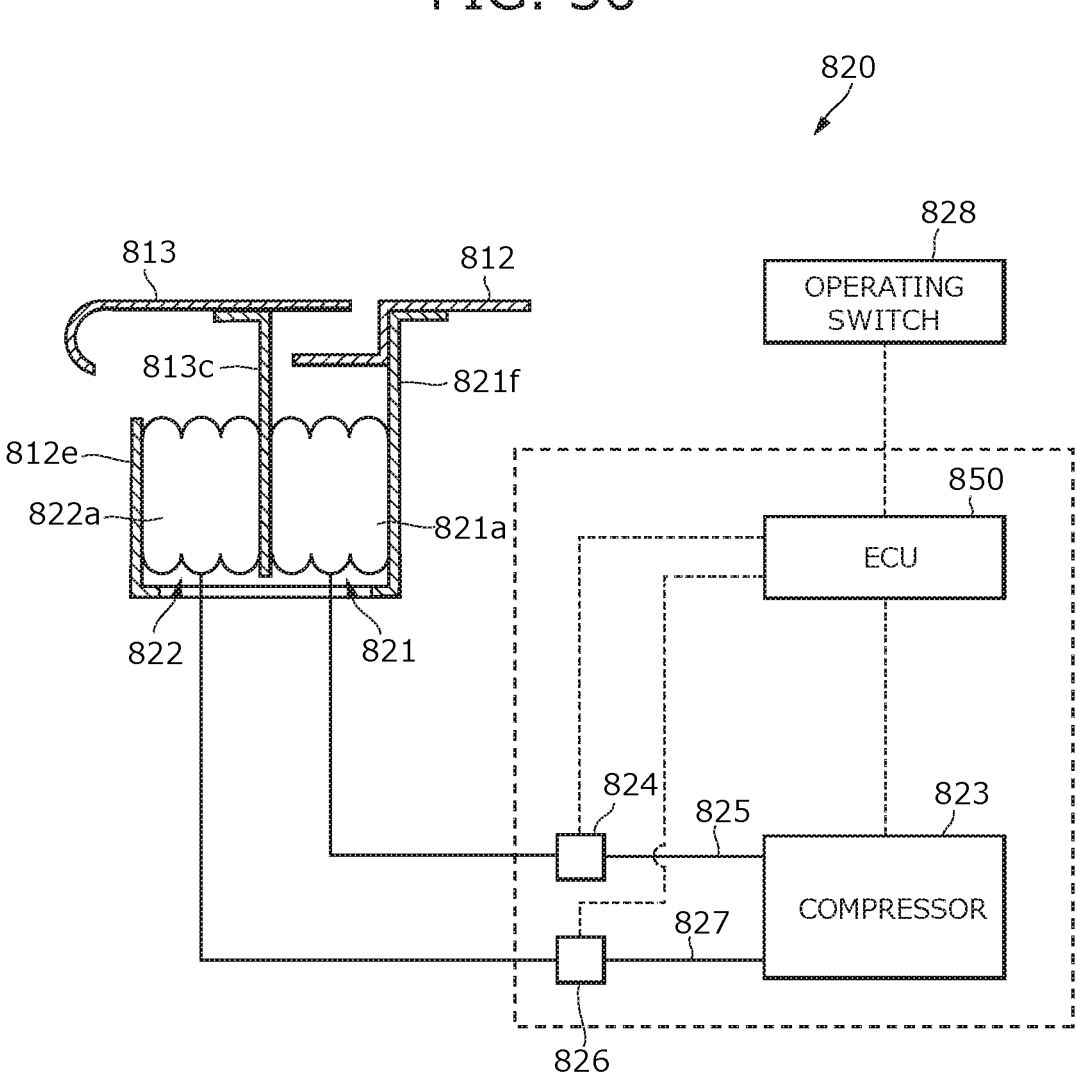
FIG. 30 is a configuration diagram of the seat cushion length adjustment mechanism.

As illustrated in FIG. 29, the fixed pan frame 812 has a box body 812k. The box body 812k has a front wall 812e extending substantially in the up to down direction on the front side, a rear wall 812f facing the front wall 812e behind the front wall 812e, side walls 812g connecting the front wall 812e and the rear wall 812f, and a bottom wall 812h.

In the rear thereof, the box body 812k has a rear flange 812m fixed to a reinforcement portion 8121 formed below the plate-shaped portion 812c and a plurality of reinforcement ribs 812n connecting the rear wall 812f and the rear flange 812m.

A pressure receiving plate 813c fixed to the movable pan frame 813 is positioned between the front wall 812e and the rear wall 812f. A first actuator 821 driving the movable pan frame 813 forward with respect to the fixed pan frame 812 is arranged behind the pressure receiving plate 813c. A second actuator 822 driving the movable pan frame 813 rearward with respect to the fixed pan frame 812 is arranged in front of the pressure receiving plate 813c.

The first actuator 821 biases the movable pan frame 813 forward. The first actuator 821 has a plurality of first fluid bags 821a, which are inflated by compressed air injection and deflated by compressed air discharge.

The second actuator 822 biases the movable pan frame 813 rearward. the second actuator 822 has a plurality of second fluid bag 822a, which are inflated by compressed air injection and deflated by compressed air discharge.

<<Length Adjustment Mechanism>>

Next, the length adjustment mechanism 820 adjusting the length of the seat cushion according to the eighth embodiment in the front to back direction will be described with reference to FIG. 30. FIG. 30 is a configuration block diagram of the length adjustment mechanism 820. As illustrated in FIG. 30, the length adjustment mechanism 820 has the first actuator 821, the second actuator 822, a compressor 823, and an ECU 850 as main configurations.

The ECU 850 controls the length adjustment mechanism 820 as a whole. Specifically, the ECU 850 controls the biasing forces generated by the first fluid bag 821a and the second fluid bag 822a by injecting and discharging compressed air. The compressed air is generated by the compressor 823. The first fluid bag 821a and the compressor 823 are connected to a first connecting pipe 825 via a first control valve 824. The second fluid bag 822a and the compressor 823 are connected by a second connecting pipe 827 via a second control valve 826. The ECU 850 controls the opening and closing of the first control valve 824 and the second control valve 826 in order to inject or discharge the compressed air generated by the compressor 823 with respect to the first fluid bag 821a and the second fluid bag 822a. An operating switch 828 has extension and retraction buttons and outputs an output signal to the ECU 850 in accordance with the operation of the extension and retraction buttons.

The ECU 850 controls the inflation and deflation of the first fluid bag 821a and the second fluid bag 822a based on the output signal of the operating switch 828 to move the movable pan frame 813 in the front to back direction. As a result, the seat cushion can be extended and retracted to an appropriate length in accordance with the seated occupant's body shape. In addition, as the movable pan frame 813 moves, the front pressure receiving plate 522, the middle pressure receiving plate 523, and the rear pressure receiving plate 524 of the pressure receiving member 520 move in the front to back direction. Therefore, the front pressure receiving plate 522, the middle pressure receiving plate 523, and the rear pressure receiving plate 524 can be disposed at appropriate positions in accordance with the seated occupant's physique.

At this time, a stretchable elastic member may be interposed between the connecting portion 535 and the fourth part 534 described above. As a result, even in a case where the pressure receiving member 520 is moved in the front to back direction by the length adjustment mechanism 820, the pressure receiving member 520 can be appropriately supported by the support member 530. In addition, the connecting portion 535 itself may be formed by a stretchable elastic member.

Modification Example

Although the pressure receiving member 520 in the eighth embodiment described above is supported by the wires 521 that span the movable pan frame 813 and the rear pipe 514, the present invention is not limited thereto. The pressure receiving member 520 may be supported by a stretchable and elongated elastic member. The stretchable elastic member may span the movable pan frame 813 and the rear pipe 514 to support the pressure receiving member 520 and be connected to the rear pipe 514. As a result, the pressure receiving performance of the pressure receiving member 520 can be adjusted in conjunction with the movable pan frame 813 being moved forward by the length adjustment mechanism 820.

Ninth Embodiment

A vehicle seat S901 according to a ninth embodiment will be described below with reference to FIGS. 31 and 32.

A vehicle seat known in the related art is provided with a ventilation path and a blower in the seat, and the air sent out by the blower can be guided to the seating surface and blown to the seated occupant.

Patent Literature (JP 2020-110702) discloses a vehicle seat in which a ventilation path is formed in a pad.

Further improvements have been desired with respect to the vehicle seat in which the ventilation path is formed in the pad. In other words, there has been a demand for a vehicle seat capable of comfort enhancement and fatigue reduction for the seated occupant by blowing air of an appropriate temperature from the seating surface to the seated occupant.

As for the vehicle seat S901, a seat cushion S911 and a seat back S912 are formed with ventilation paths 941 blowing air-conditioning wind blown from a blower to the seating surface of the vehicle seat S901. Further, in the vehicle seat S901, fluid bags 960 that can be inflated and deflated by compressed air are arranged between pads and skin materials. Further, the ventilation paths 941 and the fluid bags 960 are disposed at positions that do not overlap when viewed from the seating surface. As a result, it is possible to suppress the ventilation path 941 and the fluid bag 960 interfering with or affecting each other.

<<Basic Configuration of Vehicle Seat>>

Figure 31:
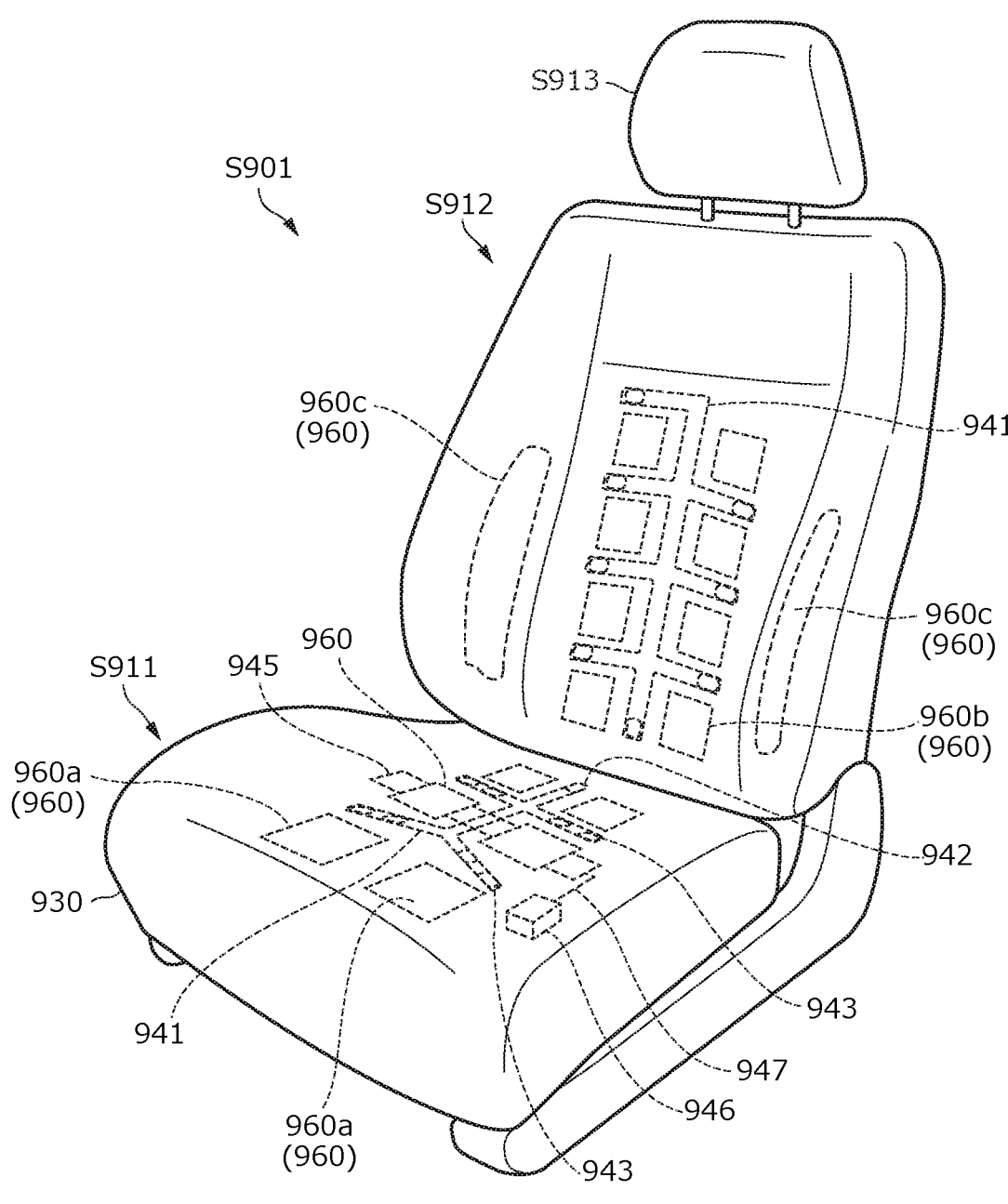
FIG. 31 is an explanatory diagram of the basic configuration of a vehicle seat according to a ninth embodiment.

FIG. 31 is a perspective view illustrating the basic configuration of the vehicle seat S901. As illustrated in FIG. 31, the vehicle seat S901 has the seat cushion S911, the seat back S912, and a headrest S913 as main configurations.

The seat cushion S911 is configured mainly by a seat cushion frame (not illustrated) constituting the skeleton of the seat cushion S911 and a pad 911 and a skin material 930 covering the seat cushion frame.

The seat back S912 is configured mainly by a seat back frame (not illustrated) constituting the skeleton of the seat back S912 and a pad (not illustrated) and a skin material (not illustrated) covering the seat back frame.

The pad 911 of the seat cushion S911 has the ventilation path 941 through which air-conditioning wind output by an air-conditioning device (not illustrated) passes. The ventilation path 941 is formed with an inlet 942 into which the air-conditioning wind output by the air-conditioning device flows and a plurality of outlets 943 through which the air-conditioning wind is blown out from below to the seated occupant. The inlet 942 is formed on the rear side and in the middle of the seat cushion S91 in the right to left direction. Four outlets 943 are formed on the right and left each in front of the inlet 942. The disposition of the ventilation path 941, the inlet 942, and the outlets 943 is not limited to the disposition illustrated in FIG. 31. It is sufficient if the seated occupant's comfort can be enhanced by blowing the air-conditioning wind output by the air-conditioning device to the seated occupant.

A seating sensor 945 is incorporated between the pad 911 and the skin material 930 of the seat cushion S911 in order to sense that the seated occupant is seated in the vehicle seat S901. The seating sensor 945, which is a weight sensor or the like, is capable of sensing that the seated occupant is seated.

In addition, a control circuit 946 is arranged in the seat cushion S911 to control electrical components (various sensors and actuators) arranged at the vehicle seat S901. The seating sensor 945 and the control circuit 946 are electrically connected by a harness 947. In other words, the detection signal of the seating sensor 945 is output to the control circuit 946 via the harness 947.

In addition, the plurality of fluid bags 960 inflated by compressed air injection and deflated by compressed air discharge are arranged between the pad 911 and the skin material 930. The fluid bags 960 are configured mainly from thigh fluid bags 960*a*, lumbar fluid bags 960*b*, and side fluid bags 960*c*. The thigh fluid bags 960*a* are incorporated in the seat cushion S911 and mainly support the seated occupant's thighs. The lumbar fluid bags 960*b* are incorporated in the seat back S912 and mainly support the seated occupant's waist. The side fluid bags 960*c* are incorporated in the seat back S92 and mainly support the seated occupant's torso from the sides.

As illustrated in FIG. 31, the fluid bag 960 is arranged at a position that does not overlap the ventilation path 941 when viewed from the seating surface. As a result, it is possible to suppress obstruction of the flow of the air-conditioning wind that passes through the ventilation path 941 when the fluid bag 960 is inflated. In addition, when the fluid bag 960 is inflated, it protrudes upward without descending downward and the seated occupant can be stimulated effectively.

Further, the fluid bag 960 is arranged at a position that overlaps the seating sensor 945 when viewed from the seating surface. As a result, the seating sensor 945 detects the pressure that is generated when the fluid bag 960 is inflated in addition to the load of the seated occupant. Therefore, it is possible to suppress the seating sensor 945 failing to detect the seated occupant.

In addition, the fluid bag 960 is arranged at a position that does not overlap the harness 947, which electrically connects the seating sensor 945 and the control circuit 946, when viewed from the seating surface. As a result, it is possible to suppress damage to the harness 947 attributable to the load received when the seated occupant is seated and the pressure generated when the fluid bag 960 is inflated.

Figure 32:
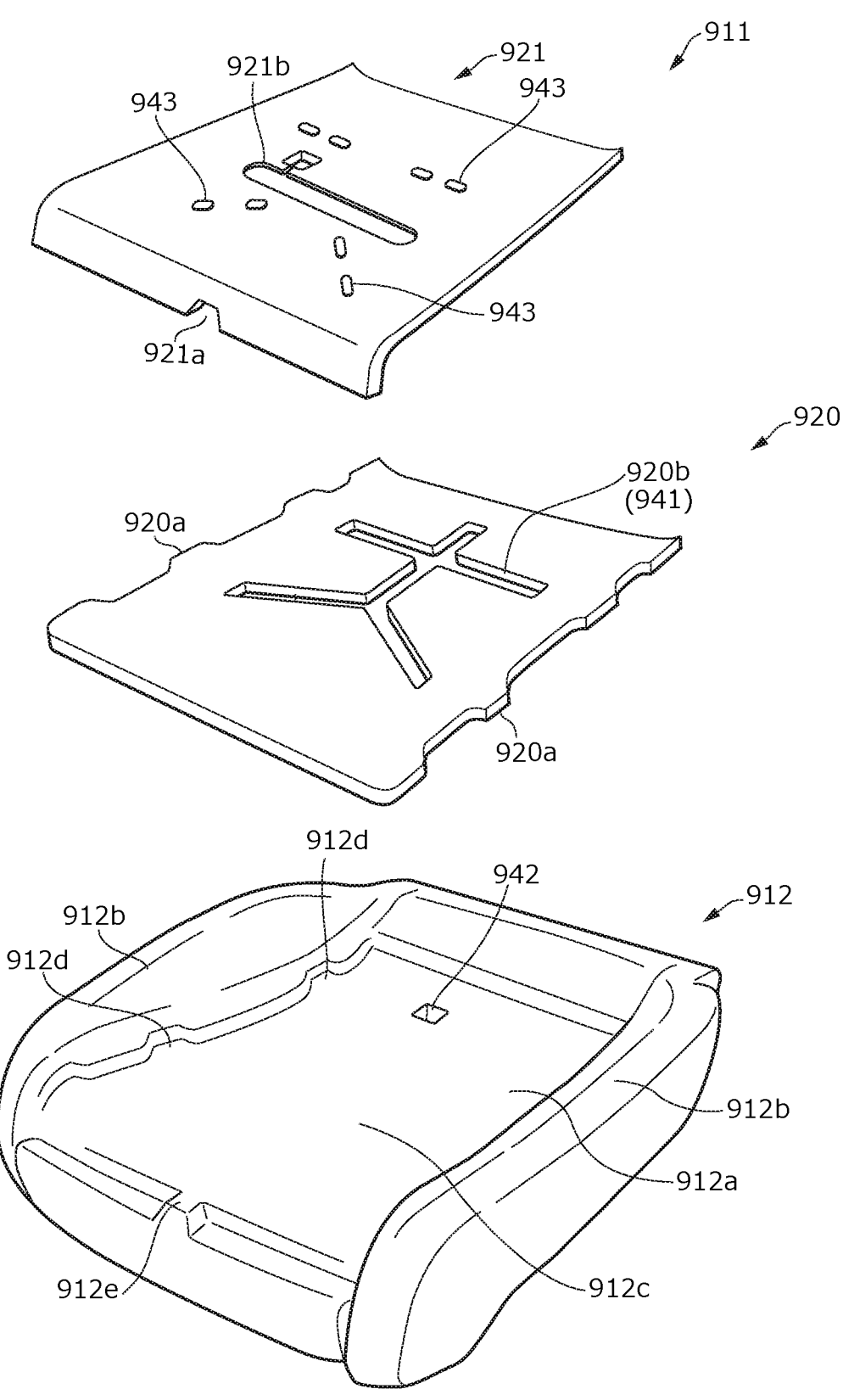
FIG. 32 is a perspective view of a pad main body, a first cover member, and a second cover member of a seat cushion.

FIG. 32 is an exploded perspective view of the pad 911 of the seat cushion S911. As illustrated in FIG. 32, the pad 911 has a pad main body 912, a first cover member 920, and a second cover member 921 as main configuration. The pad main body 912, the first cover member 920, and the second cover member 921 are made of urethane foam. The pad 911 is used in a state where the first cover member 920 and the second cover member 921 are placed on the pad main body 912 and overlapped.

The pad main body 912 has a middle portion 912*a*, and side portions 912*b* are integrally formed on both the right and left sides of the middle portion 912*a*. The middle portion 912*a* is formed with a cover attachment portion 912*c* where the first cover member 920 and the second cover member 921 are placed and the inlet 942 where air-conditioning wind flows in.

First engaging portions 912*d* are formed on the right and left side surfaces of the cover attachment portion 912*c*. The first engaging portions 912*d* engage with engaged portions 920*a* formed on the first cover member 920, which will be described later. In addition, a second engaging portion 912*e* is formed in front of the cover attachment portion 912*c* and engages with an engaged portion 921*a* formed on the second cover member 921, which will be described later.

The first cover member 920 and the second cover member 921 are members that form the ventilation path 941 with the pad main body 912 by being placed on the upper surface of the cover attachment portion 912*c* of the pad main body 912.

The first cover member 920 is a plate-shaped member. A ventilation hole 920*b* is formed in the first cover member 920. The ventilation hole 920*b* forms the ventilation path 941 between the upper surface of the pad main body 912 and the second cover member 921. Specifically, the air-conditioning wind that has flowed in from the inlet 942 formed in the pad main body 912 passes through the ventilation hole 920*b* and is blown out of the outlet 943 formed in the second cover member 921, which will be described later. As described above, the ventilation hole 920*b* is formed at a position that does not overlap the fluid bag 960 when viewed from the seating surface. As a result, the fluid bag 960 arranged on the pad 911 can be inflated and deflated without being affected by the ventilation path 941.

The engaged portions 920*a* engaging with the first engaging portions 912*d* of the pad main body 912 are formed on the right and left side surfaces of the first cover member 920.

The second cover member 921 is a plate-shaped member. The second cover member 921 is formed with four outlets 943 on the right and left each. The outlet 943 is formed at a position that does not overlap the fluid bag 960 when viewed from the seating surface. Specifically, as illustrated in FIG. 31, the outlet 943 is formed so as to be positioned between the plurality of fluid bags 960. In addition, the outlet 943 is formed so as to be positioned in front of the fluid bag 960. As a result, it is possible to suppress the fluid bag 960 arranged on the pad 911 obstructing the flow of the air-conditioning wind blown out of the outlet 943.

A seating sensor attachment portion 921*b* for attaching the seating sensor 945 is formed in the rear of the second cover member 921. The seating sensor attachment portion 921*b* is formed at a position that overlaps the fluid bag 960 when viewed from the seating surface. As a result, the seating sensor 945 is capable of reliably sensing the load that is applied when the seated occupant is seated.

The engaged portion 921*a* engaging with the second engaging portion 912*e* of the pad main body 912 is formed in the front of the second cover member 921.

In assembling the pad 911 configured as above, first, an adhesive is applied to the upper surface of the pad main body 912 that is the upper surface of the cover attachment portion 912*c*. Then, the first cover member 920 is overlapped with respect to the cover attachment portion 912*c* while the first engaging portion 912*d* of the pad main body 912 and the engaged portion 920*a* of the first cover member 920 are engaged with each other. The first cover member 920 is fixed to the pad main body 912 by the adhesive.

Subsequently, an adhesive is applied to the upper surface of the first cover member 920. Then, the second cover member 921 is overlapped with respect to the first cover member 920 while the second engaging portion 912*e* of the pad main body 912 and the engaged portion 921*a* of the second cover member 921 are engaged with each other. The second cover member 921 is fixed to the first cover member 920 and the pad main body 912 by the adhesive.

The assembly of the pad 911 is completed as a result of the above. Then, it is possible to guide air-conditioning wind to the seating surface without incorporating a ventilation pipe for passing air-conditioning wind in the pad 911. Therefore, when the seated occupant is seated, the seated occupant can comfortably sit without feeling uncomfortable due to the presence of the ventilation pipe.

Although the pad 911 of the seat cushion S911 has been described above, the present invention is not limited thereto. For example, the present invention can be applied to the pad 911 of the seat back S912. In this case, the first cover member 920 and the second cover member 921 are disposed to overlap the front surface of the main body of the pad 912 (surface on the seated occupant side).

Tenth Embodiment

A vehicle seat S1001 according to a tenth embodiment will be described below with reference to FIGS. 33 to 39.

A vehicle seat known in the related art is provided with an airbag device. By activating the airbag device in the event of vehicle collision detection, the seated occupant's safety can be improved.

Patent Literature (JP 2020-050269) discloses a vehicle seat. As for this vehicle seat, in the event of vehicle collision detection, the part of an airbag main body that is positioned below the back of the seated occupant's knee is inflated first. As a result, forward movement of the seated occupant's waist (submarine phenomenon) can be suppressed.

However, regarding airbag device-equipped vehicle seats, further improvements have been desired in order to ensure the safety of the occupant in the event of collision detection. Specifically, there has been a demand for a vehicle seat that is capable of suppressing the submarine phenomenon by inflating a fluid bag arranged in the vehicle seat before a collision is detected, that is, when a collision is expected.

The vehicle seat S1001 has a collision prediction unit 1052a for vehicle collision prediction and a collision determination unit 1052b for vehicle collision determination. In addition, the vehicle seat S1001 includes fluid bags 1060 inflated or deflated by fluid injection or discharge and an airbag device 1070. Further, an ECU 1050 of the vehicle seat S1001 controls the fluid bag 1060 to inflate or deflate based on the prediction result of the collision prediction unit 1052a and activates the airbag device 1070 based on the determination result of the collision determination unit 1052b. As a result, the collision prediction unit 1052a is capable of predicting a collision before the airbag device 1070 is activated, the seated occupant can be protected appropriately, and the safety of the seated occupant can be improved.

<<Basic Configuration of Vehicle Seat>>

Figure 33:
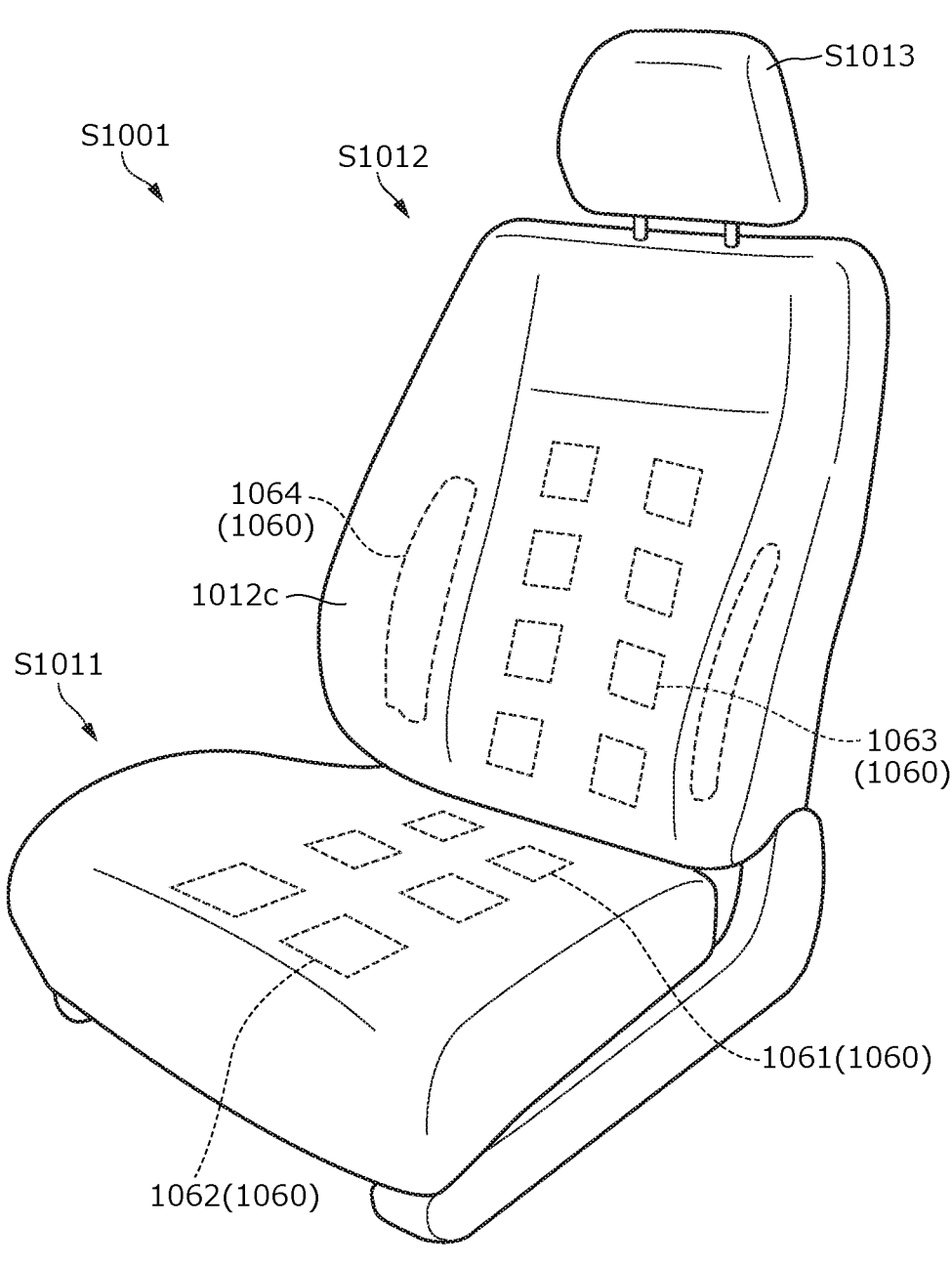
FIG. 33 is an explanatory diagram of the basic configuration of a vehicle seat according to a tenth embodiment.

FIG. 33 is a perspective view illustrating the basic configuration of the vehicle seat S1001. As illustrated in FIG. 33, the vehicle seat S1001 has a seat cushion S1011, a seat back S1012, and a headrest S1013 as main configurations.

The seat cushion S1011 is configured mainly by a seat cushion frame 1010 constituting the skeleton of the seat cushion S1011 and a seat cushion pad S1011a and a skin material S1011b covering the seat cushion frame 1010.

The seat back S1012 is configured mainly by a seat back frame (not illustrated) forming the skeleton of the seat back S1012 and a seat back pad (not illustrated) and a skin material (not illustrated) covering the seat back frame.

The vehicle seat S1001 incorporates the plurality of fluid bags 1060. The fluid bags 1060 are inflated by fluid injection and deflated by fluid discharge.

The fluid bags 1060 are configured mainly from buttock fluid bags 1061 mainly supporting the seated occupant's buttocks, thigh fluid bags 1062 mainly supporting the seated occupant's thighs, lumbar fluid bags 1063 mainly supporting the seated occupant's waist, and side fluid bags 1064 supporting the torso from the sides.

Figure 34:
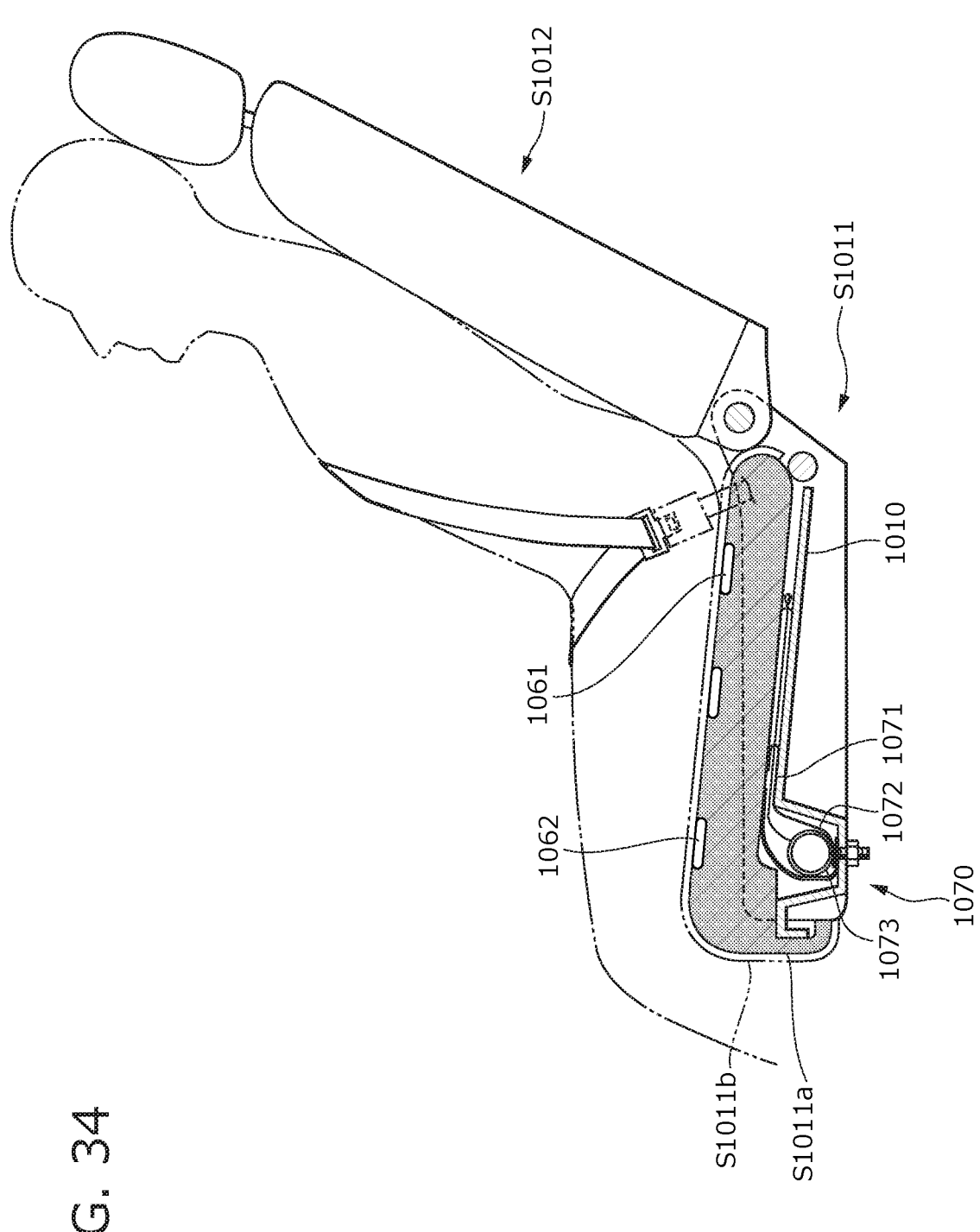
FIG. 34 is a partial cross-sectional view of the vehicle seat viewed from one side.

FIG. 34 is a partial cross-sectional view of the vehicle seat S1001. As illustrated in FIG. 34, the seat cushion S1011 incorporates the airbag device 1070. The airbag device 1070 inflates for seated occupant protection in the event of an impact from the front attributable to a frontal vehicle collision or the like. The airbag device 1070 has an airbag main body 1071, an inner bag 1072 accommodated in the airbag main body 1071, and a gas generating device 1073 accommodated in the inner bag 1072 and supplying inflation gas. The operation of the airbag device 1070 will be described later.

<<Functional Configuration of ECU>>

Figure 35:
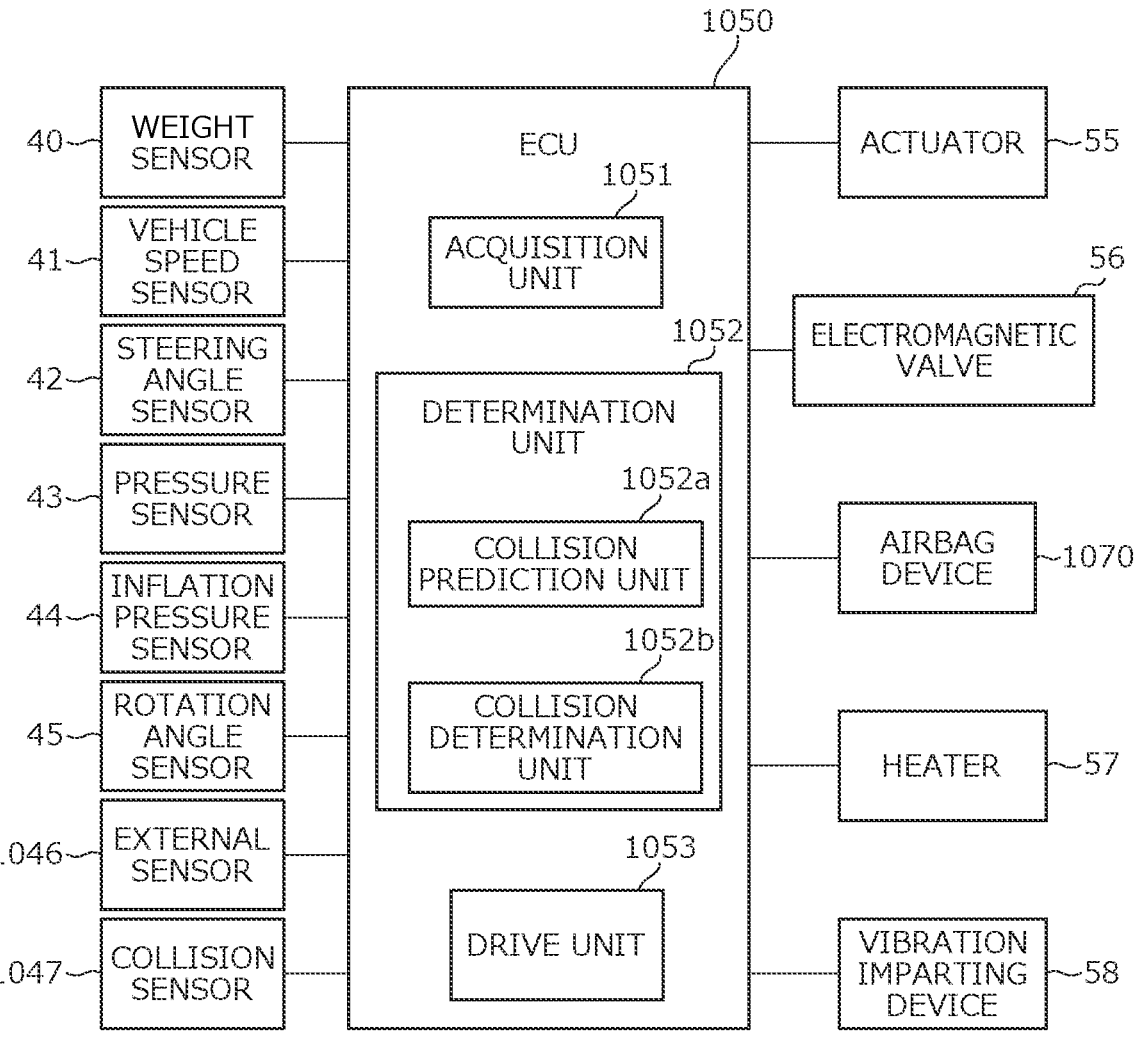
FIG. 35 is a block diagram illustrating the functional configuration of an ECU.

FIG. 35 is a block diagram illustrating the functional configuration of the ECU 1050. The ECU 1050 acquires detection values from various sensors installed in the vehicle by communicating with the various sensors through an in-vehicle network. The various sensors include the weight sensor 40, the vehicle speed sensor 41, the steering angle sensor 42, the pressure sensor 43, the inflation pressure sensor 44, and the pivoting angle sensor 45 described above. Further, the ECU 1050 in the present embodiment is capable of acquiring detection values from an external sensor 1046 and collision sensors 1047.

The external sensor 1046 is a sensor that detects an external situation that is information about the surroundings of the vehicle. Specifically, the external sensor 1046 can be configured by LiDAR, by which scattered light is measured with respect to irradiation light in every direction of the vehicle and the distance from the vehicle to a surrounding obstacle is measured. In addition, the external sensor 1046 can be configured by a radar that detects, for example, another vehicle and an obstacle around the vehicle by electromagnetic wave irradiation and reflected wave detection. Further, the external sensor 1046 can be configured by an optical sensor that takes images of the surroundings of the vehicle.

The collision sensor 1047 is a vehicle collision detection sensor. Specifically, the collision sensors 1047 are acceleration sensors attached to the front, rear, and sides of the vehicle.

The ECU 1050 has an acquisition unit 1051, a determination unit 1052, and a drive unit 1053. The acquisition unit 1051 acquires detection values from various sensors as described above.

The determination unit 1052 has the collision prediction unit 1052a and the collision determination unit 1052b.

The collision prediction unit 1052a detects an object around the vehicle based on the detection value of the external sensor 1046. Then, the collision prediction unit 1052a determines the type of the object (for example, a pedestrian or another vehicle) from the characteristics of the detected object. Subsequently, the collision prediction unit 1052a calculates the probability of collision between the detected object and the vehicle. The collision probability is calculated by taking into consideration the speed at which the object approaches the vehicle. The collision prediction unit 1052a may determine the form of collision between the vehicle and the object (frontal collision, rear-end collision, side collision) and calculate the collision probability in the case of a specific collision (for example, frontal collision).

The collision prediction unit 1052a outputs a collision prediction result to the drive unit 1053 by comparing the calculated collision probability with a predetermined threshold determined in advance. The collision prediction result includes information with which the form of collision can be identified.

The collision determination unit 1052b acquires acceleration signals, which are the detection values of the collision sensors 1047 attached to the front, rear, and sides of the vehicle. The collision determination unit 1052b outputs a collision determination result to the drive unit 1053 by comparing the acceleration signals with a predetermined threshold determined in advance. The collision determination result includes information with which the form of collision can be identified.

The drive unit 1053 inflates and deflates the fluid bag 1060 by controlling the degree of opening and closing of electromagnetic valve 56 when the collision prediction result is input from the collision prediction unit 1052a.

Figure 36:
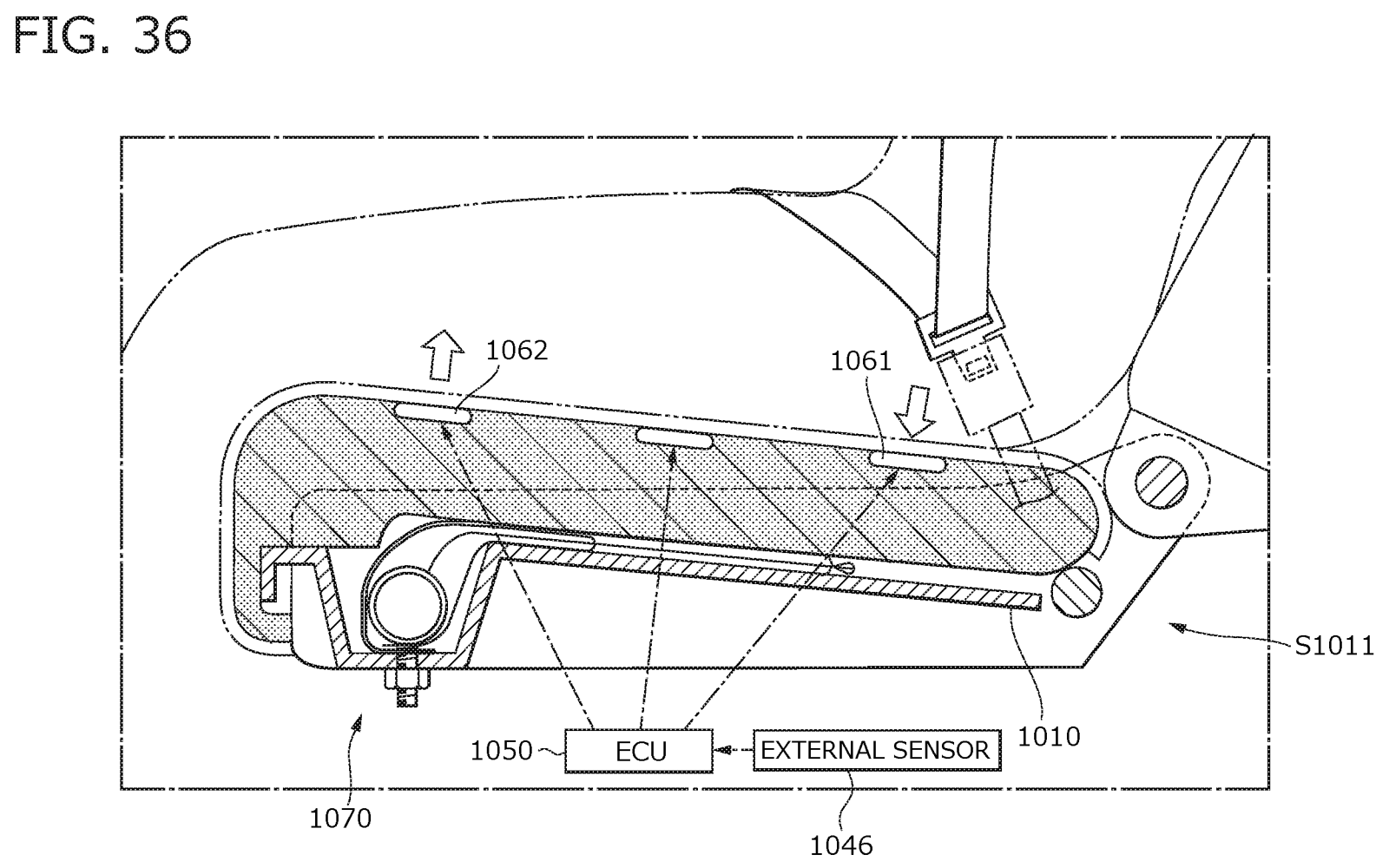

When a collision prediction result indicating a frontal collision is input from the collision prediction unit 1052a, the drive unit 1053 deflates the buttock fluid bag 1061 incorporated in the seat cushion S1011 and inflates the thigh fluid bag 1062 as illustrated in FIG. 36. As a result, the front of the seat cushion S101 protrudes upward and becomes relatively higher than the rear. Therefore, it is possible to suppress the phenomenon (submarine phenomenon) in which the seated occupant moves forward in a state of floating from the seat cushion S1011.

It should be noted that although the drive unit 1053 in the above description deflates the buttock fluid bag 1061 and inflates the thigh fluid bag 1062, the present invention is not limited thereto. In other words, one of the buttock fluid bag 1061 deflation control and the thigh fluid bag 1062 inflation control may be performed without the other being performed.

The drive unit 1053 inflates the lumbar fluid bag 1063 incorporated in the seat back S1102 when a collision prediction result indicating a rear-end collision is input from the collision prediction unit 1052a. As a result, the lumbar fluid bag 1063 is inflated prior to the occurrence of a rear-end collision, and thus safety can be enhanced against a rear-end collision impact.

When a collision prediction result indicating a side collision is input from the collision prediction unit 1052a, the drive unit 1053 does not inflate the side fluid bag 1064 incorporated in the seat back S102. As a result, the seated occupant can be protected from impact by the airbag device (not illustrated) that is arranged beside the seated occupant without being interfered by the side fluid bag 1064.

In addition, in a case where a side collision is predicted, the support plate that is incorporated in a side support portion S1012a of the seat back S1012 may be displaced to a retracted position.

In a normal state, the support plate biases the seat back pad forward from the back surface of the seat back pad. Then, when a side collision prediction signal is input, the drive unit 1053 performs control such that the support plate is retracted to a rear position by an actuator (not illustrated). As a result, the seated occupant can be protected from impact by the airbag device (not illustrated) that is arranged beside the seated occupant without being interfered by the support plate.

When a collision determination result indicating a frontal collision is input from the collision determination unit

Figure 37:
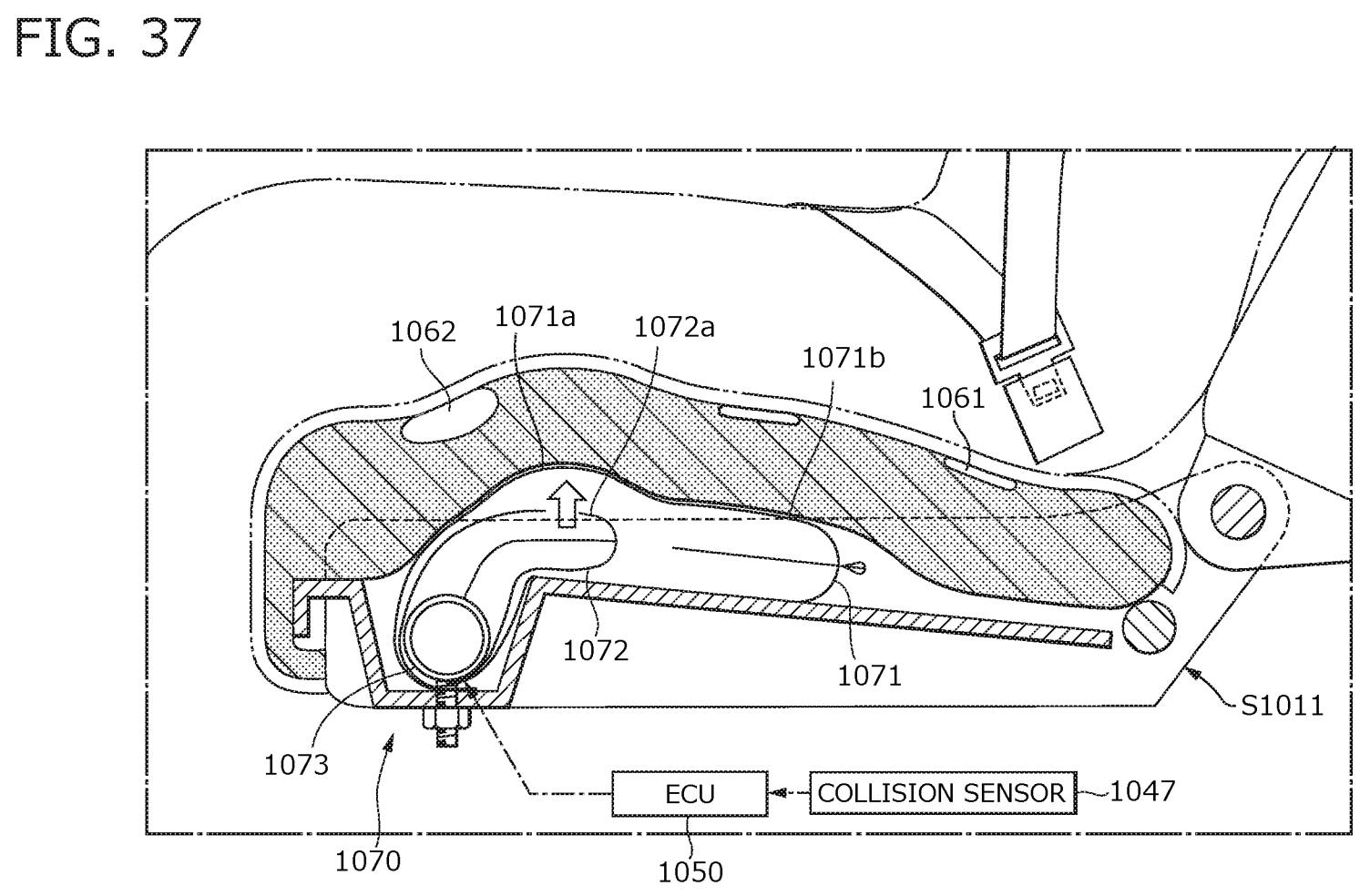

1052b, the drive unit 1053 activates the airbag device 1070 incorporated in the seat cushion S1011 as illustrated in FIG. 37.

Figure 38:
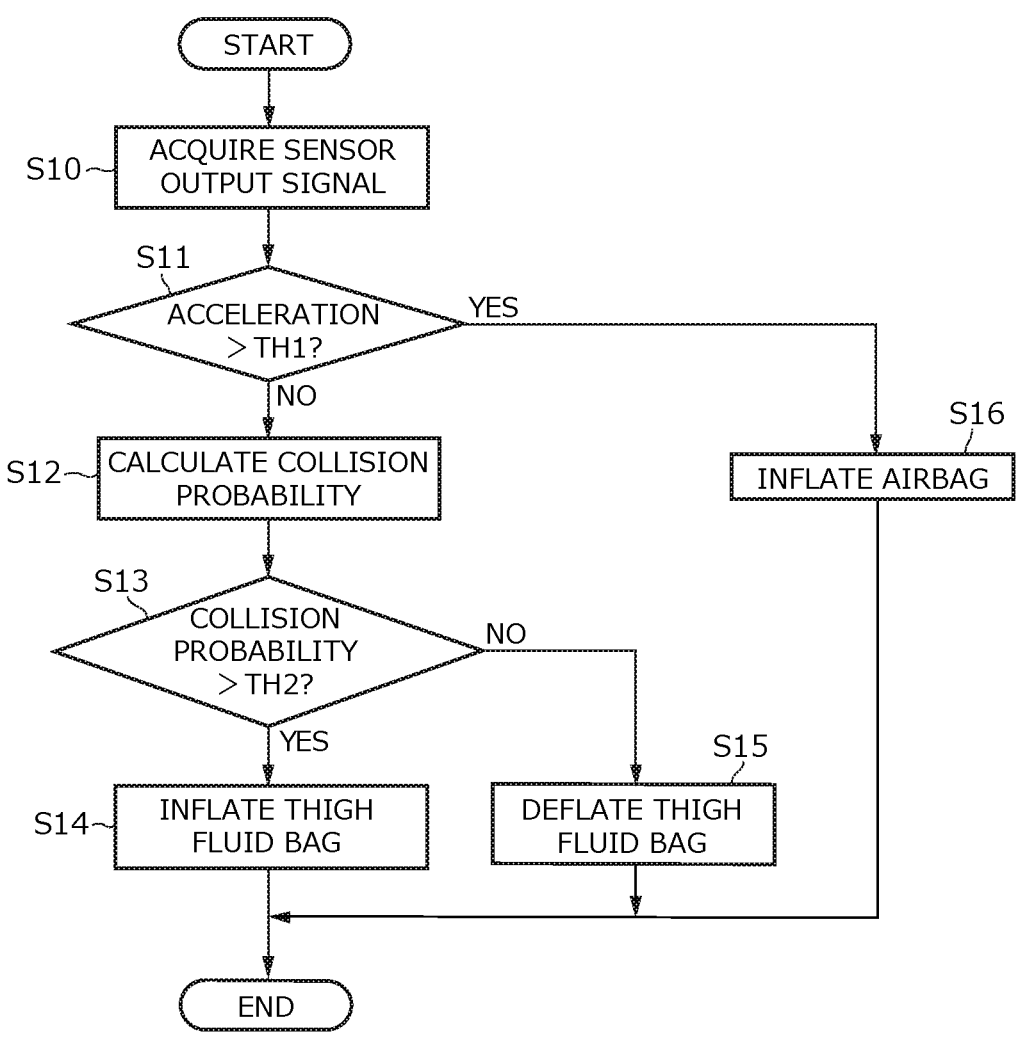
FIG. 38 is a diagram illustrating the flow of processing executed by the ECU.

Here, the operation during the inflation of the airbag device 1070 will be described in more detail. As illustrated in FIG. 38, the inner bag 1072 and the gas generating device 1073 in the inner bag 1072 are accommodated in the airbag main body 1071 of the airbag device 1070.

When a frontal vehicle collision occurs and the drive unit 1053 activates the airbag device 1070, the gas generating device 1073 generates high-pressure inflation gas. Therefore, the inner bag 1072 accommodating the gas generating device 1073 inflates. The inner bag 1072 is formed with a discharge hole 1072a through which the high-pressure gas can be discharged. Therefore, a front portion 1071a of the airbag main body 1071 is inflated by the high-pressure gas discharged from the discharge hole 1072a of the inner bag 1072. On the other hand, a rear portion 1071b of the airbag main body 1071 remains deflated by the load of the seated occupant. The discharge hole 1072a is positioned around the back of the seated occupant's knee from the front of his or her thigh. Therefore, it is possible to suppress the occurrence of the phenomenon (submarine phenomenon) in which the seated occupant moves forward in a state of floating from the seat cushion S1011 in the event of a frontal vehicle collision.

It should be noted that the operation of the drive unit 1053 in the event of collision prediction result and collision determination result input is not limited to the operation described above. For example, the drive unit 1053 may retract the support plate that is incorporated in the side support portion S1012a when a side collision result is input from the collision determination unit 1052b.

<<Processing Flow of ECU 1050>>

Next, the operation of the ECU 1050 will be described.

FIG. 38 is a flowchart illustrating an example of the processing that ECU 1050 executes in accordance with a prestored program. This flowchart is regularly repeated at predetermined time intervals.

First, the ECU 1050 acquires output signals from various sensors installed in the vehicle (step S10).

Next, the ECU 1050 determines whether the acceleration signal detected by the collision sensor 1047 is greater than a predetermined threshold TH1 determined in advance (step S11). Here, although the ECU 1050 in the above description compares the acquired acceleration signal with the frontal collision threshold TH1, the same applies to rear-end and side collisions.

In a case where it is determined that the acceleration signal is not greater than the threshold TH1 (step S11: No), the ECU 1050 calculates the probability of collision based on the external signal detected by the external sensor 1046 (step S12). The ECU 1050 performs frontal collision probability calculation based on the acquired external signal.

Subsequently, the ECU 1050 determines whether the collision probability is greater than a predetermined threshold TH2 determined in advance (step S13). The ECU 1050 performs comparison with the frontal collision threshold TH2.

In a case where it is determined that the collision probability is greater than the threshold TH2 (step S13: Yes), the ECU 1050 controls the thigh fluid bag 1062 to inflate (step S14). At this time, the ECU 1050 may control the buttock fluid bag 1061 to deflate. As a result, the front of the seat cushion S101 protrudes upward and becomes relatively higher than the rear.

On the other hand, in a case where it is not determined that the collision probability is greater than the threshold TH2

(step S13: No), the ECU 1050 controls the thigh fluid bag 1062 to deflate (step S15) and ends the processing.

In addition, in a case where it is determined that the acceleration signal is greater than the threshold TH1 (step S11: Yes), the ECU 1050 activates the airbag device 1070 incorporated in the seat cushion S101 (step S16) and ends the processing.

In this manner, the ECU 1050 performs control such that the thigh fluid bag 1062 inflates and the front of the seat cushion S101 protrudes upward at a collision prediction timing preceding an actual vehicle collision. As a result, the occurrence of the submarine phenomenon can be suppressed more effectively.

Eleventh Embodiment

A vehicle seat S1101 according to an eleventh embodiment will be described below with reference to FIGS. 39 and 40.

In the related art, quilting is performed on vehicle seat skin materials for the purpose of vehicle seat design improvement.

Patent Literature (JP 2015-143067) discloses a vehicle seat configured by a fabric containing a heat-shrinkable material and enhanced in terms of design by quilting.

However, there has been a demand for further improvements regarding quilted vehicle seats. Specifically, there has been a demand for a vehicle seat capable of further design improvement by arranging a fluid bag inflatable and deflatable by fluid supply between a skin material and a pad to highlight an uneven shape formed by quilting.

The vehicle seat S1101 has a skin material 1130 formed with a quilting pattern 1131, which has an uneven shape. In addition, inside the skin material 1130, an inflatable and deflatable fluid bag 1140 is arranged at a position that does not overlap a recess 1133 of the quilting pattern 1131 when viewed from the seating surface. As a result, it is possible to highlight a protrusion 1132 of the quilting pattern 1131 while maintaining the regularity of the uneven shape of the quilting pattern 1131 when the fluid bag 1140 is inflated. Further, it is possible to suppress a decline in the decorativeness of the quilting pattern 1131 attributable to the inflation of the fluid bag 1040.

<<Basic Configuration of Vehicle Seat>>

Figure 39:
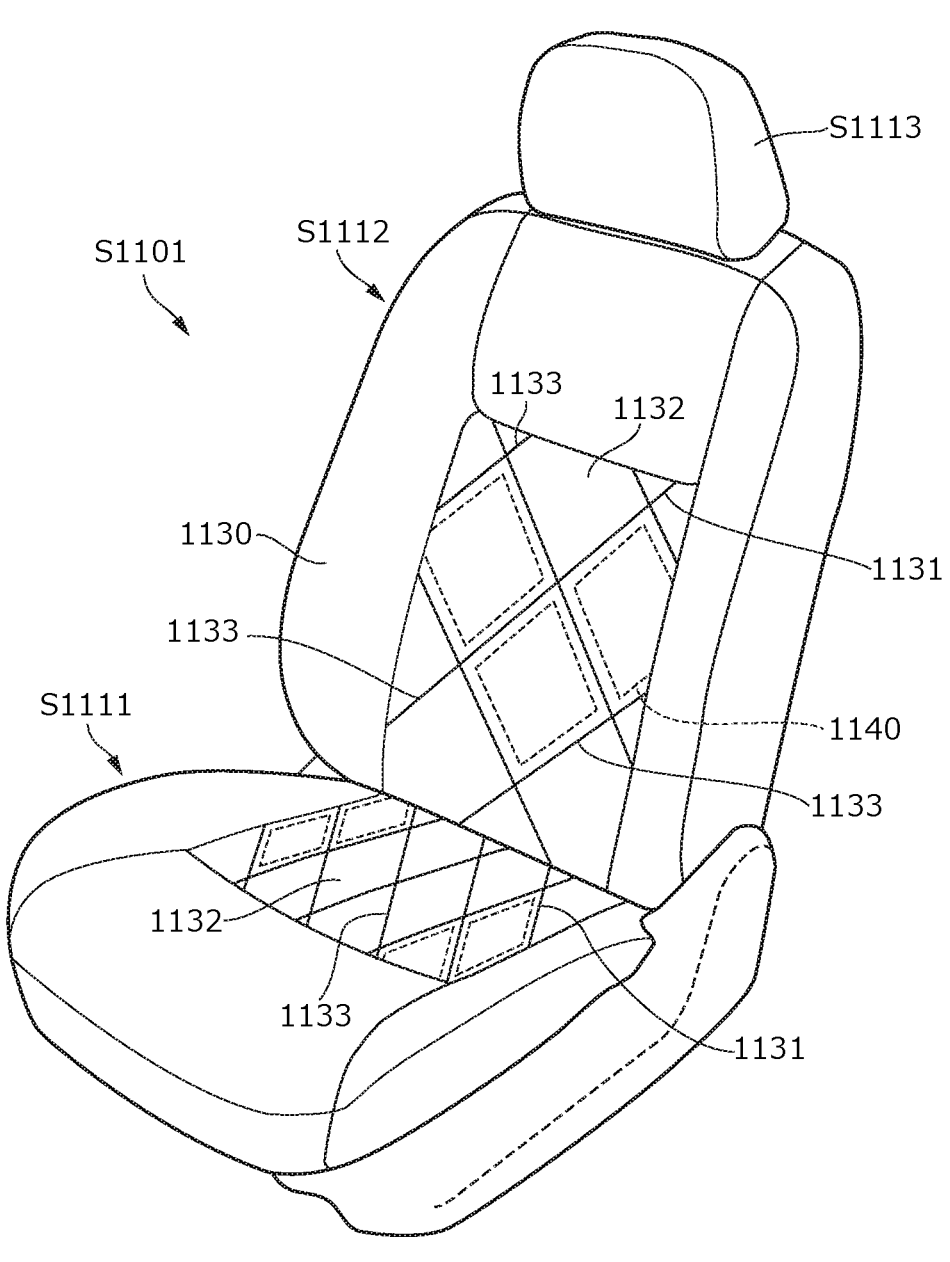
FIG. 39 is an explanatory diagram of the basic configuration of a vehicle seat according to an eleventh embodiment.

FIG. 39 is a perspective view illustrating the basic configuration of the vehicle seat S1101. As illustrated in FIG. 39, the vehicle seat S1101 has a seat cushion S1111, a seat back S1112, and a headrest S1113 as main configurations.

The seat cushion S1111 is configured mainly by a seat cushion frame (not illustrated) constituting the skeleton of the seat cushion S1111 and a pad (not illustrated) and a skin material (not illustrated) covering the seat cushion frame.

The seat back S1112 is configured mainly by a seat back frame (not illustrated) constituting the skeleton of the seat back S1112 and a pad 1120 (see FIG. 40) and the skin material 1130 covering the seat back frame.

The quilting pattern 1131 is formed on the skin material 1130 of the seat cushion S1111 and the seat back S1112. The quilting pattern 1131 has the protrusion 1132 and the recess 1133. The protrusions 1132 and the recesses 1133 are regularly arranged in a grid shape. The quilting pattern 1131 can be formed by known quilting that includes the process of stitching the skin material 1130 including a laminate. By quilting the skin material 1130, the cushioning property and decorativeness of the vehicle seat S1101 can be enhanced.

The plurality of fluid bags 1140 inflated by fluid injection and deflated by fluid discharge are arranged between the pad

1120 and the skin material 1130. Although the fluid in the present embodiment is compressed air, the present invention is not limited thereto. The fluid may be liquid. In other words, the plurality of fluid bags 1140 may be either compressed air bags inflated by compressed air or liquid bags inflated by liquid. In addition, the fluid bag 1140 may be a compressed air bag-liquid bag combination. By combining the compressed air bag and the liquid bag less elastic than the compressed air, the elasticity or rigidity of the fluid bag 1140 can be adjusted appropriately.

As illustrated in FIG. 39, the fluid bag 1140 is arranged at a position that does not overlap the recess 1133 of the quilting pattern 1131 when viewed from the seating surface. In other words, the fluid bag 1140 is arranged at a position that overlaps the protrusion 1132 of the quilting pattern 1131. As a result, the inflation of the fluid bag 1140 resulting in a change in the shape of the skin material 1130 and distortion of the regular uneven shape of the quilting pattern 1131 can be suppressed. Therefore, it is possible to maintain the decorativeness of the quilting pattern 1131 formed on the skin material 1130 of the vehicle seat S1101.

Figure 40:
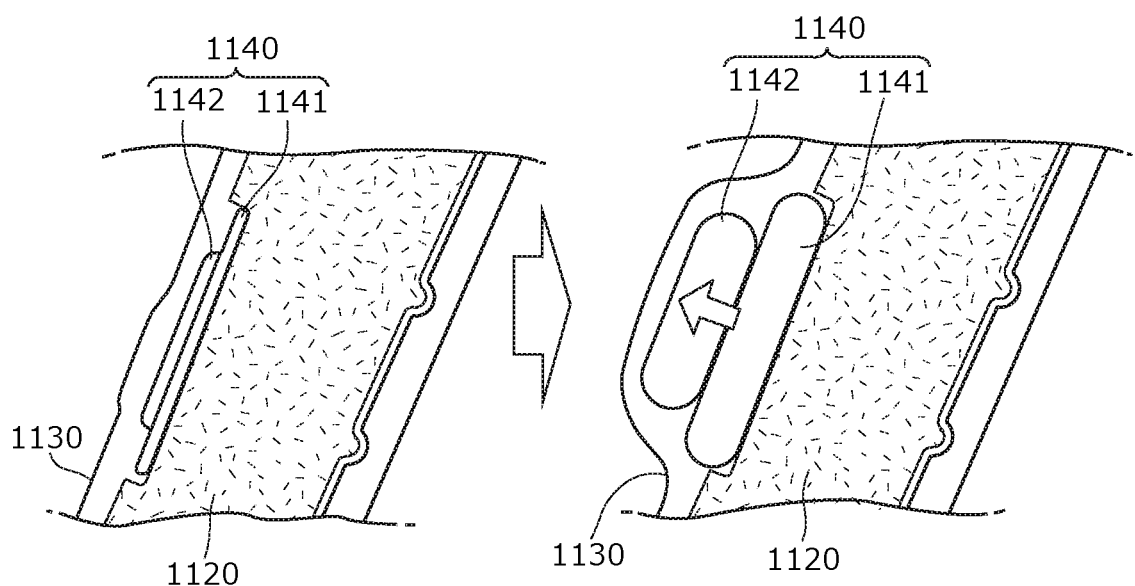
FIG. 40 is a diagram illustrating states where a fluid bag is deflated and protrudes.

FIG. 40 is a partial cross-sectional view of the seat back S1112. As illustrated in FIG. 40, the fluid bag 1140 positioned between the pad 1120 and the skin material 1130 has at least a first fluid bag 1141 arranged on the rear side (pad 1120 side) and a second fluid bag 1142 arranged on the front side (skin material 1130 side). The first fluid bag 1141 and the second fluid bag 1142 are laminated.

The first fluid bag 1141 is larger in capacity than the second fluid bag 1142. Further, the area of the first fluid bag 1141 abutting against the pad 1120 is wider than the area of the second fluid bag 1142 abutting against the skin material 1030. In addition, the rigidity of the first fluid bag 1141 is higher than the rigidity of the second fluid bag 1142. As a result of the above, displacement of the first fluid bag 1141 and the second fluid bag 1142 to the pad 1120 side can be suppressed and the first fluid bag 1141 is capable of serving as a base material supporting the second fluid bag 1142 when the first fluid bag 1141 and the second fluid bag 1142 are inflated. Therefore, the seated occupant can be effectively stimulated by the second fluid bag 1142 protruding.

The first fluid bag 1141 and the second fluid bag 1142 can be fixed in a state of being laminated by mutual welding. As a result, the first fluid bag 1141 is capable of supporting the second fluid bag 1142 more firmly. It should be noted that the first fluid bag 1141 and the second fluid bag 1142 may be fixed by bonding the first fluid bag 1141 and the second fluid bag 1142 using an adhesive.

Twelfth Embodiment

A vehicle seat S1201 according to a twelfth embodiment will be described below with reference to FIGS. 41 to 46.

A vehicle seat that has a seating portion provided with a sensor member is known as a technique for detecting a state where an occupant is seated in the vehicle seat S1201 and detecting biological information from the seated occupant.

Patent Literature (JP 2013-095373) discloses a technique for routing the conducting portion (harness) of a seating sensor through a through hole penetrating a pad member and disposing a connector portion (coupler) on the back surface of the pad member.

When the connector portion (coupler) is disposed on the back surface of the pad member in this manner in a case where the pad member is thin, seating comfort may deteriorate when the connector portion is disposed below the seating part. In addition, depending on how the conducting portion is routed, seating comfort may deteriorate due to loosening of the conducting portion.

In this regard, the vehicle seat S1201 is to appropriately dispose a conducting portion such as a harness and a connector such as a coupler and improve seating comfort in a case where a sensor member is provided.

Figure 41:
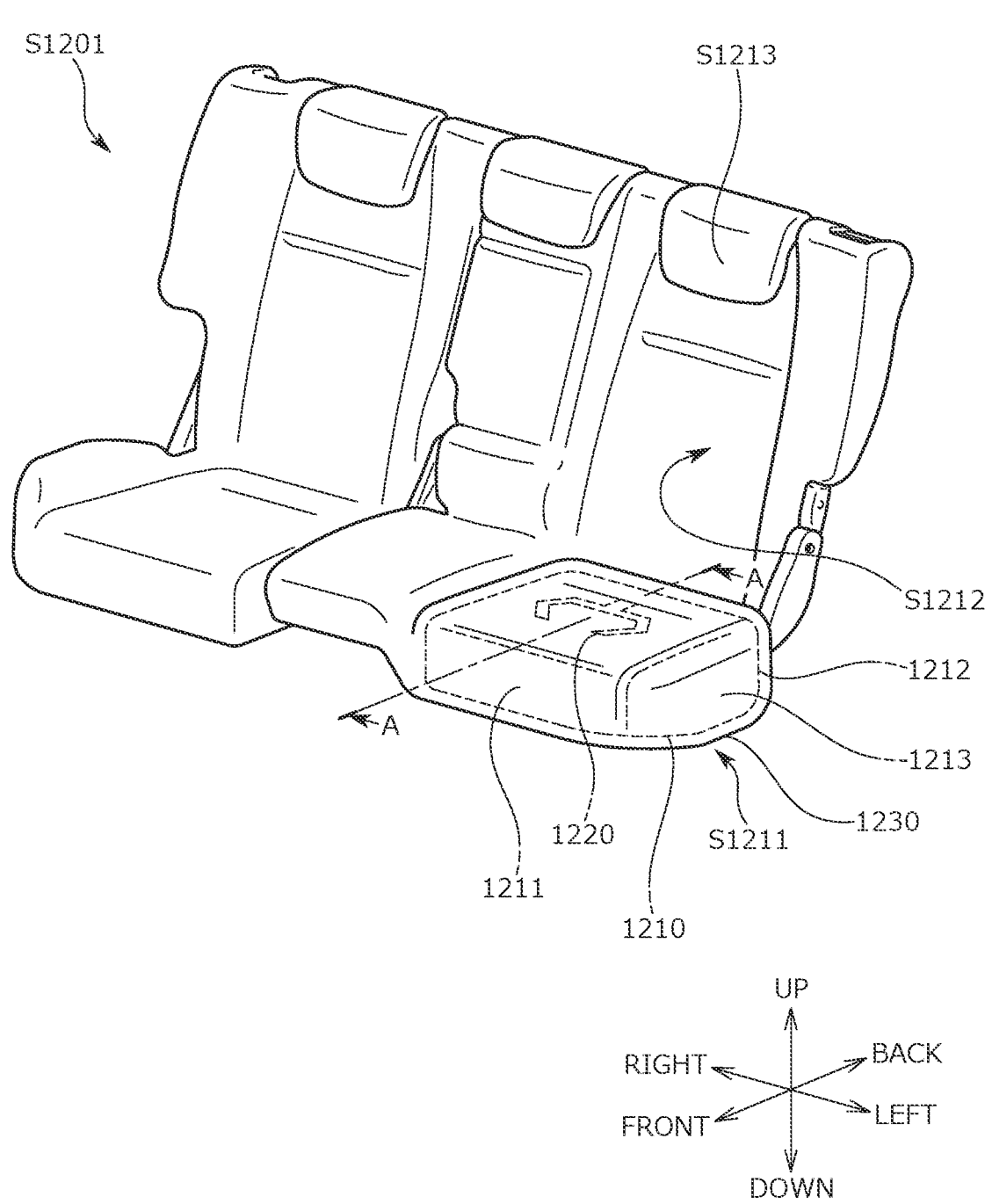
FIG. 41 is an explanatory diagram of the basic configuration of a vehicle seat according to a twelfth embodiment.

The vehicle seat S1201 has the appearance that is illustrated in FIG. 41. The vehicle seat S1201 has, as main components, a seat cushion S1211 that is a buttock support portion (seating portion) supporting the seated occupant's buttocks, a seat back S1212 that is a backrest portion (seating portion) supporting the seated occupant's back, and a headrest S1213 that is arranged on the seat back S1212 and supports the seated occupant's head.

The seat cushion S1211 (seating portion) of the present embodiment has a seat cushion pad 1210 (pad member), a sensor member 1220, and a trim cover 1230 (skin material).

The seat cushion S1211 is configured by placing the seat cushion pad 1210 in a vehicle body (support portion), which is not illustrated, and further covering the seat cushion pad 1210 with the trim cover 1230. The seat back S122 is configured by placing a seat back pad (not illustrated) on a seat back frame (not illustrated) and covering the seat back pad with the trim cover 1230. The headrest S123 is formed by arranging a pad member (not illustrated) on a core material and covering the pad member with the trim cover 1230.

The seat cushion pad 1210 of the seat cushion S121 and the seat back pad of the seat back S122 are urethane base materials molded by foam molding using a urethane foam material.

Seat Cushion of Present Embodiment

Figure 42:
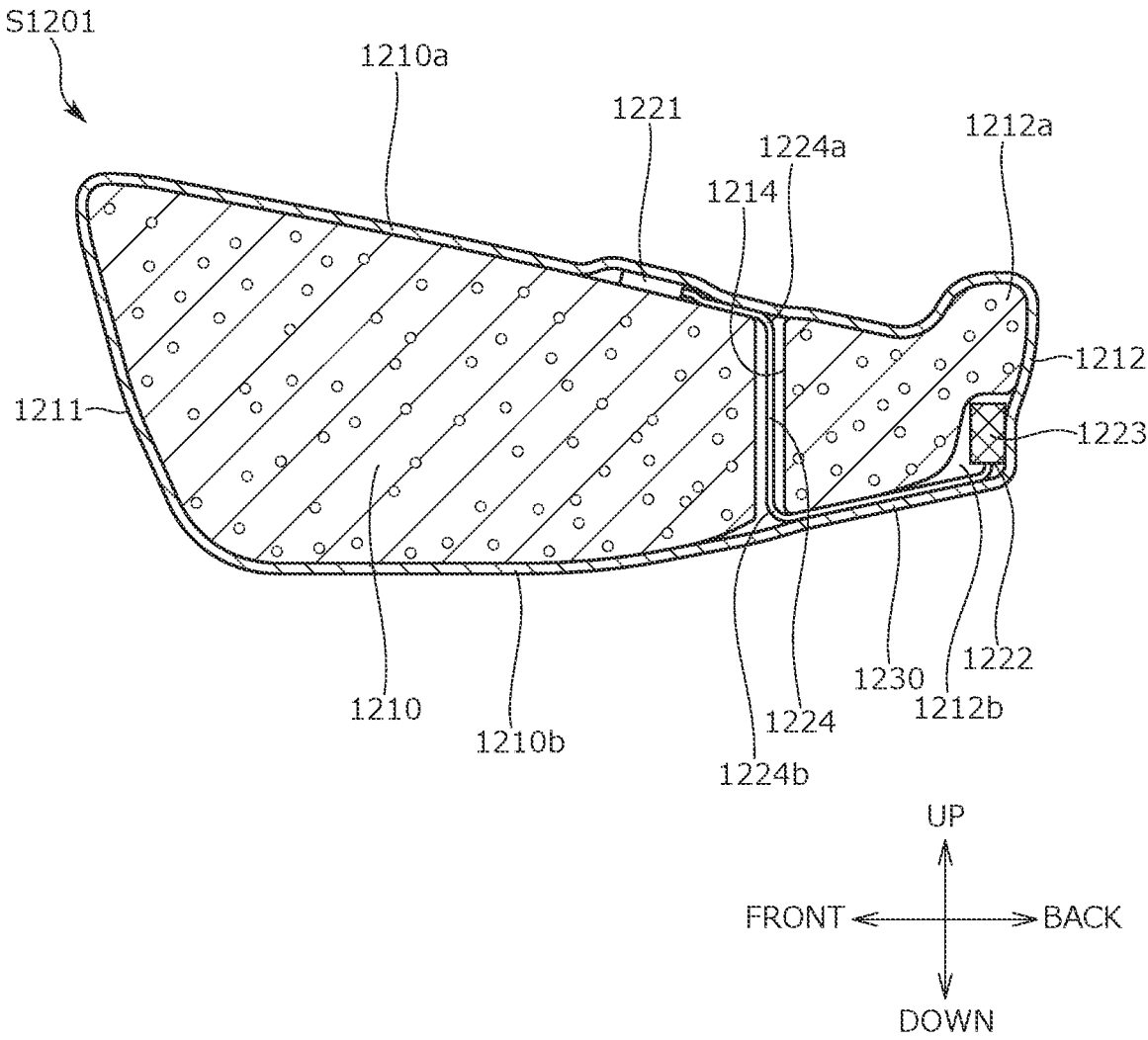
FIG. 42 is a cross-sectional view taken along line A-A of FIG. 41.
Figure 43:
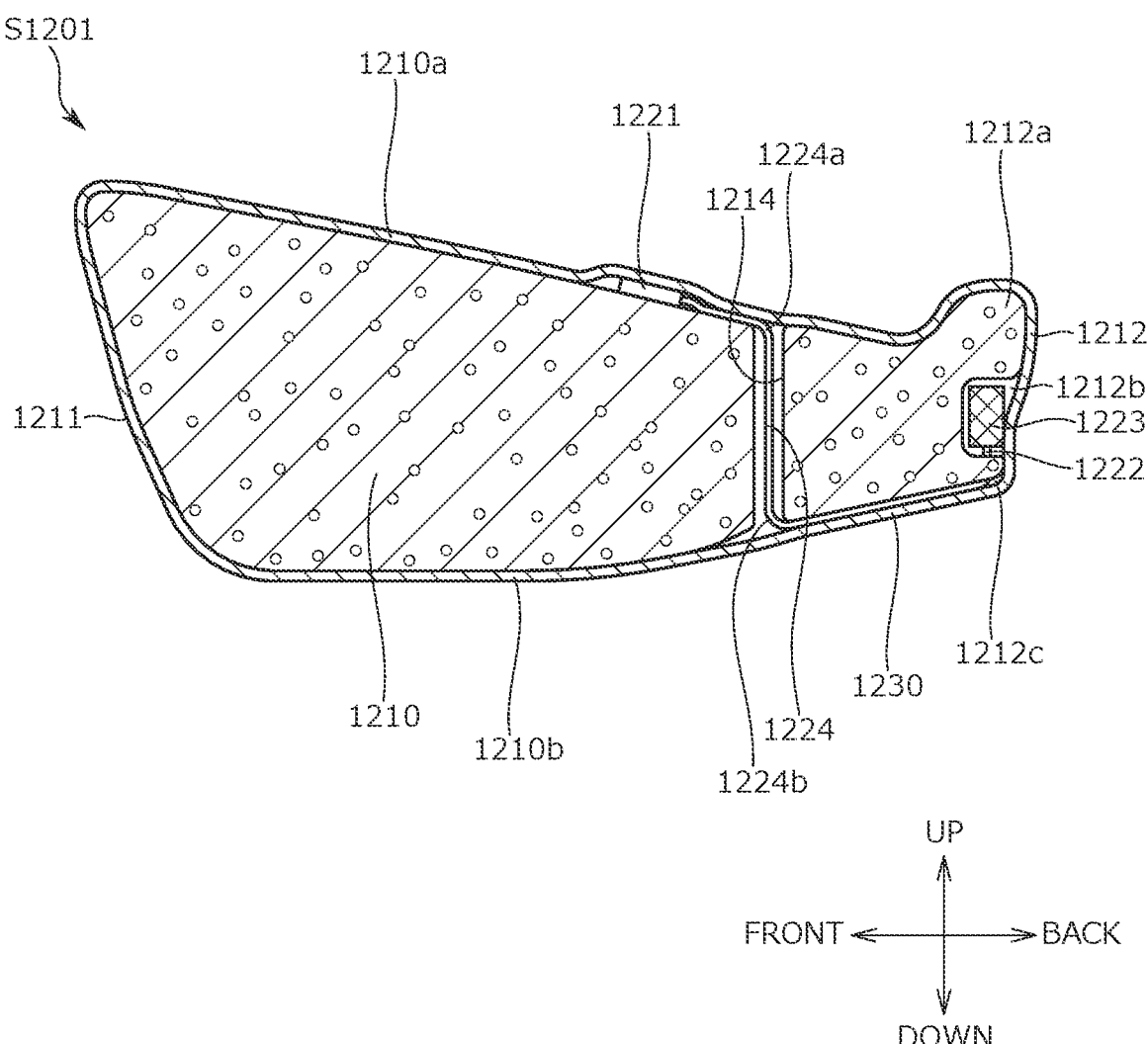
FIG. 43 is a cross-sectional view taken along line A-A of FIG. 41 and illustrates an example in which a recess of a seat cushion pad is provided with a protrusion.
Figure 44:
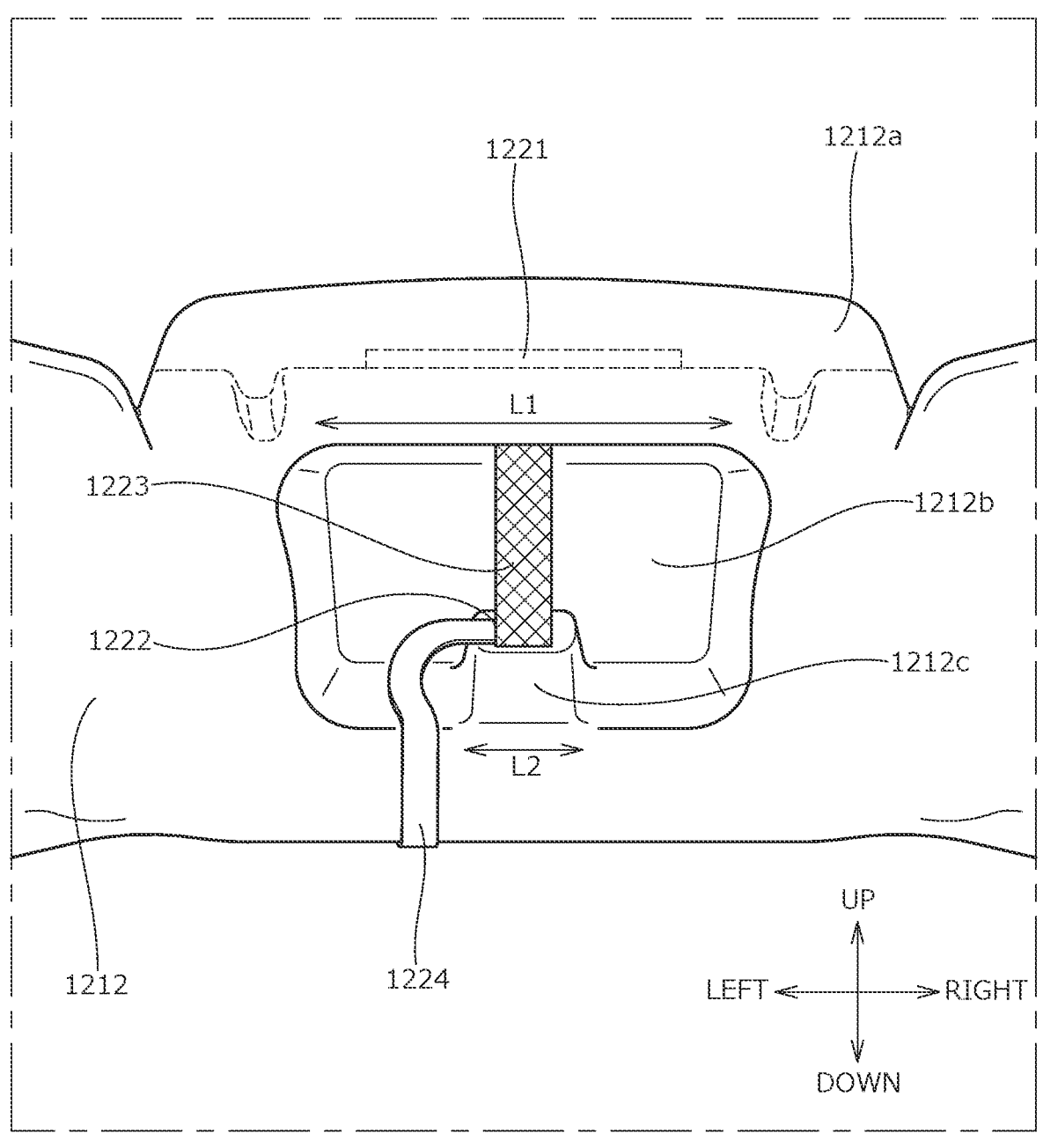
FIG. 44 is a diagram illustrating a connector accommodated in the recess of the seat cushion pad.

The configuration of the seat cushion S1211 of the vehicle seat S1201 will be described with reference to FIGS. 42 to 44. FIG. 42 is a cross-sectional view taken along line A-A of FIG. 41. FIG. 43 is a cross-sectional view taken along line A-A of FIG. 41 and illustrates an example in which a recess 1212*b* of the seat cushion pad 1210 is provided with a protrusion 1212*c*. FIG. 44 is a diagram illustrating a connector 1223 accommodated in the recess 1212*b* of the seat cushion pad 1210. It should be noted that the trim cover 1230 is not illustrated in FIG. 44.

<<<Seat Cushion Pad 1210>>>

As illustrated in FIGS. 41 and 42, the seat cushion pad 1210 includes a front surface 1210*a* disposed on the seating surface side (upper side) in the up to down direction and a back surface 1210*b* disposed on the back surface side (lower side) in the up to down direction. In addition, the seat cushion pad 1210 includes a front end portion 1211 (first end portion) disposed on the front side in the front to back direction and a rear end portion 1212 (second end portion) disposed on the rear side in the front to back direction. Further, the seat cushion pad 1210 includes side end portions 1213 disposed at both side portions in the seat width direction.

As illustrated in FIG. 42, the seat cushion pad 1210 includes a through hole 1214 formed to penetrate the seat cushion pad 1210 from the front surface 1210*a* (seating surface side) to the back surface 1210*b* (back surface side) and the recess 1212*b* formed at the rear end portion 1212 (end portion). The rear end portion 1212 (end portion) of the seat cushion pad 1210 is formed with a bulging portion 1212*a* (pillow portion) raised upward (to the seating surface side), and the bulging portion 1212*a* is provided with the recess 1212*b*. The recess 1212*b* is formed to be recessed forward from the rear end portion 1212 (end portion) below the bulging portion 1212*a*.

<<<Sensor Member 1220>>>

The sensor member 1220 includes a detection unit 1221 detecting the seated occupant's state, an external output unit 1222 outputting a signal detected by the detection unit 1221, the connector 1223 (coupler) connected to the external output unit 1222, and a conducting portion 1224 (harness) as a wiring member for conduction between the detection unit 1221 and the external output unit 1222 (FIG. 42).

The type of the sensor member 1220 is not particularly limited insofar as the seated occupant's state can be detected. Examples of the sensor member 1220 include a pressure-sensitive sensor such as a membrane switch, an electrode-type sensor for impedance fluctuation measurement, a pressure sensor including a piezoelectric element, an air tube-type sensor for air pressure measurement, a capacitive sensor measuring changes in capacitance, an optical sensor using hemoglobin concentration-attributable absorbance fluctuation, and a radio wave-type sensor.

In addition, the seated occupant's state detected by the sensor member 1220 is not particularly limited, and examples thereof include whether the seated occupant is seated, the seated occupant's seating, heartbeat, and respiratory states, and biological information values such as blood flow and hemoglobin concentration values. In other words, the sensor member 1220 is appropriately selected in accordance with the seated occupant's state that is to be detected.

In a case where the sensor member 1220 is a seating sensor, a membrane switch can be used as the detection unit 1221. Various sensors known in the related art can be used as the sensor member 1220, examples of which include a pressure-sensitive film sensor that has a plurality of pressure-sensitive points and detects whether an occupant is seated from the output distribution thereof.

The detection unit 1221 and the external output unit 1222 are electrically interconnected by the conducting portion 1224. The external output unit 1222 outputs a signal detected by the detection unit 1221 and is formed with an output electrode. The connector 1223 is connected to the external output unit 1222, and the connector is connected to an electronic control unit (ECU) provided with an electrical circuit (not illustrated) for seated occupant state measurement.

<<<Regarding Disposition of Sensor Member 1220>>>

As illustrated in FIG. 42, the detection unit 1221 is disposed on the front surface 1210*a* side (seating surface side) of the seat cushion pad 1210. The conducting portion 1224 extending rearward from the detection unit 1221 is inserted through the through hole 1214 of the seat cushion pad 1210 and bent downward at a first bent portion 1224*a*. The conducting portion 1224 inserted through the through hole 1214 and reaching the back surface 1210*b* of the seat cushion pad 1210 bends and extends rearward at a second bent portion 1224*b*.

In addition, the connector 1223 is accommodated in the recess 1212*b* on the back surface 1210*b* side of the seat cushion pad 1210. Further, the trim cover 1230 covers the front surface 1210*a* side (seating surface side) of the seat cushion pad 1210 and the recess 1212*b*.

In other words, the connector 1223 is sandwiched and supported by the recess 1212*b* of the seat cushion pad 1210 and the trim cover 1230. The connector 1223 is simply sandwiched between the recess 1212*b* and the trim cover 1230 without being stopped using an attachment bracket, and it is possible to appropriately fix the connector 1223 with a simple configuration.

The conducting portion 1224 (harness) of the sensor member 1220 is also covered with the trim cover 1230 on the front surface 1210a and the back surface 1210b of the seat cushion pad 1210, and fixing to the seat cushion pad 1210 is stabilized. In particular, the part of the conducting portion 1224 that is bent at the second bent portion 1224b and extends rearward from the through hole 1214 is sandwiched between the back surface 1210b of the seat cushion pad 1210 and the trim cover 1230, and loosening of the conducting portion 1224 is suppressed.

In the vehicle seat S1201 of the present embodiment, the through hole 1214 and the connector 1223 are provided behind the part (hip point) of the seat cushion S1211 where a seating load acts.

Specifically, in the vehicle seat S1201, the recess 1212b (connector accommodating portion) accommodating the connector 1223 is provided at the rear end portion 1212, which is the rear end portion of the seat cushion S1211 (seating portion) avoiding the position where the load from the seated occupant is applied, the recess 1212b is covered with the trim cover 1230, and thus a decline in seating comfort attributable to the connector 1223 is suppressed and detachment of the connector 1223 is suppressed.

In addition, the rear end portion 1212, which is the rear end portion of the seat cushion pad 1210, is formed with the bulging portion 1212a raised to the seating surface side, and the bulging portion 1212a is provided with the recess 1212b. Such a configuration is preferable because the connector 1223 is stably accommodated in the recess 1212b.

In addition, in the above example, the seating portion is the seat cushion S121 that is the buttock support portion (seating portion) supporting the seated occupant's buttocks, the bulging portion 1212a is formed at the rear end portion 1212 of the seat cushion pad 1210, and the recess 1212b is provided at the rear end of the bulging portion 1212a. In such a configuration, the connector 1223 is accommodated in the recess 1212b of the bulging portion 1212a formed at the rear end portion of the seat cushion S121 (buttock support portion), and thus a decline in seating comfort attributable to the connector can be suppressed appropriately.

<<<Regarding Case where Recess 1212b is Provided with Protrusion 1212c>>>

As illustrated in FIGS. 43 and 44, the recess 1212b of the seat cushion pad 1210 may be provided with the protrusion 1212c. Specifically, it is preferable that the protrusion 1212c protruding rearward is formed below the recess 1212b. In such a configuration, the connector 1223 accommodated in the recess 1212b is supported from below by the protrusion 1212c, and thus the connector 1223 is accommodated in the recess 1212b in a more stable manner.

In addition, as illustrated in FIG. 44, it is preferable that a width L2 of the protrusion 1212c is smaller than a width L1 of the recess 1212b in the width direction of the seat cushion S121 (seating portion). In such a configuration, since the width L2 of the protrusion 1212c is small, affecting the routing of the conducting portion 1224 (harness) can be suppressed and the conducting portion 1224 can be appropriately disposed in the recess 1212b.

Modification Example

The present invention is not limited to the embodiment described above. For example, although the sensor member 1220 in the embodiment described above is provided in the seat cushion S121, the sensor member 1220 may be provided in the seat back S122. Specifically, the detection unit 1221 may be disposed on the seating surface side of the seat back S122 and a recess accommodating the connector 1223 may be formed at the lower end portion (end portion) of the seat back pad (not illustrated).

In addition, in the embodiment described above, the rear end portion 1212 of the seat cushion pad 1210 is provided with the recess 1212b. A connector-accommodating recess can be provided at an end portion other than the rear end portion 1212, that is, the front end portion 1211 or the side end portion 1213 of the seat cushion pad 1210 insofar as the end portion avoids the position where the load from the seated occupant is applied in the seat cushion S121 as a seating portion.

Figure 45:
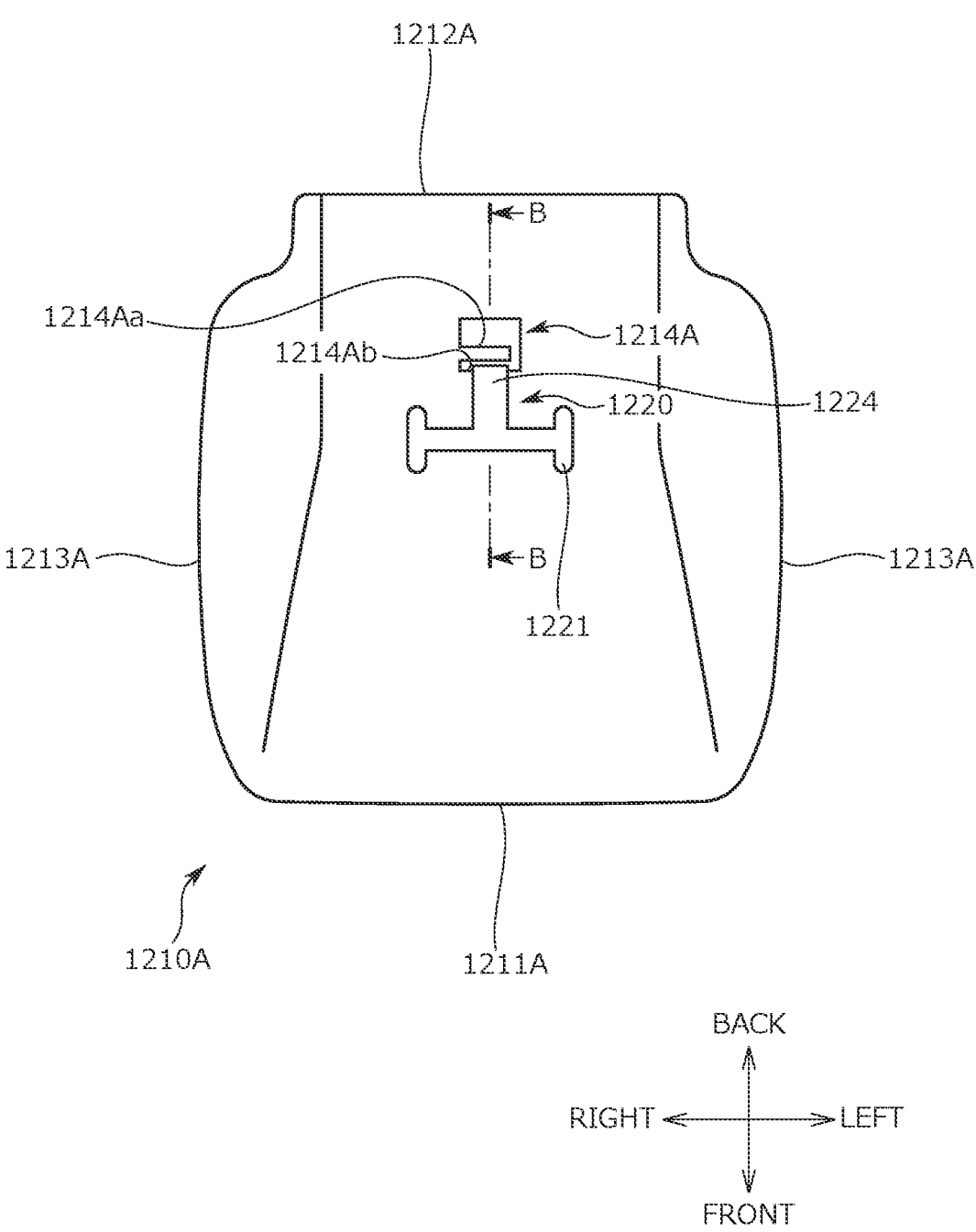
FIG. 45 is a top view illustrating a seat cushion pad according to a modification example.
Figure 46:
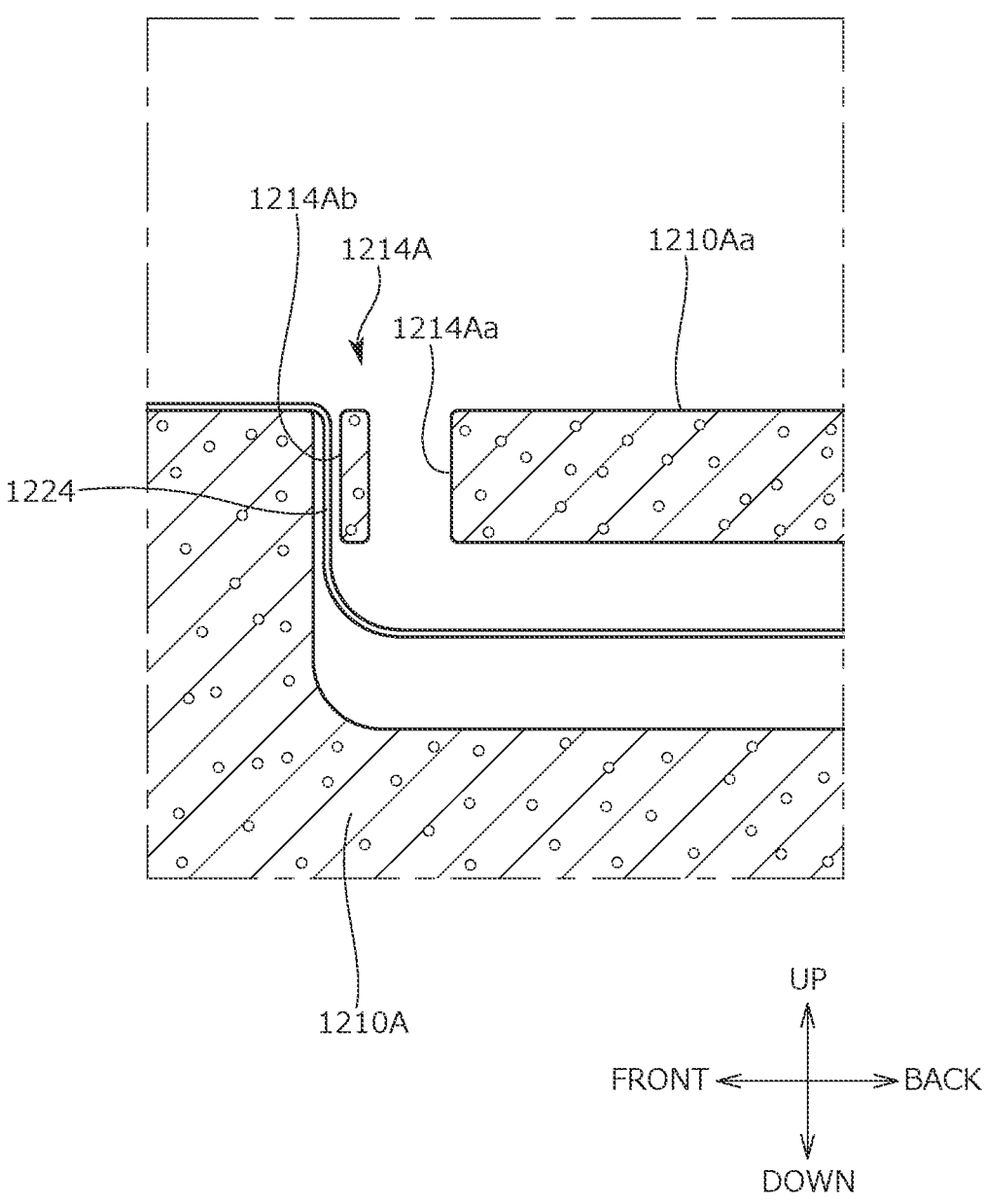
FIG. 46 is a cross-sectional view taken along line B-B of FIG. 45.

A seat cushion pad 1210A according to a modification example will be described below with reference to FIGS. 45 and 46. FIG. 45 is a top view illustrating the seat cushion pad 1210A according to the modification example, and FIG. 46 is a cross-sectional view taken along line B-B of FIG. 45. In the following description, only parts different from those of the embodiment described above will be described.

A through hole 1214A of the seat cushion pad 1210A according to the modification example is provided with a connector insertion portion 1214Aa for passing the connector 1223 in the rear and a slit 1214Ab in the front. The connector insertion portion 1214Aa is for inserting the connector 1223 and the conducting portion 1224 downward from above the seat cushion pad 1210A in disposing the sensor member 1220 during assembly and is configured to have a size at which the connector 1223 can be inserted.

As illustrated in FIG. 46, the conducting portion 1224 of the sensor member 1220 is inserted through the slit 1214Ab. Specifically, the conducting portion 1224 extending rearward from the detection unit 1221 is inserted through the slit 1214Ab formed in the through hole 1214A of the seat cushion pad 1210A and is bent downward.

Although the conducting portion 1224 of the sensor member 1220 may bend in a Z shape depending on the position of the through hole 1214A in the seat cushion pad 1210A (pad member), the fixability of the conducting portion 1224 in the through hole 1214A is improved by disposing the conducting portion 1224 in the slit 1214Ab of the through hole 1214A.

At this time, the slit 1214Ab extends in the width direction of the seat cushion S121 (seating portion), and it is easy to dispose the conducting portion 1224 of the sensor member 1220 in the slit 1214Ab.

In addition, the seat cushion S121 (seating portion) is a buttock support portion supporting the seated occupant's buttocks, the through hole 1214A is disposed on the side that is close to a rear end portion 1212A of the seat cushion pad 1210A, and the slit 1214Ab is disposed on the front side of the through hole 1214A. In such a configuration, the conducting portion 1224 extending from the detection unit 1221 disposed at the seating part can be disposed in the slit 1214Ab and guided rearward.

In addition, it is preferable that the slit 1214Ab is formed narrower than the through hole 1214A in the front to back direction of the seat cushion S121 (seating portion). In such a configuration, the seat cushion pad 1210A sandwiches the conducting portion 1224 of the sensor member 1220 from the front to back direction in the slit 1214Ab, and thus the sensor member 1220 can be fixed appropriately.

It should be noted that the position of the slit 1214Ab in the through hole 1214A is not limited to the above example, and the slit 1214Ab can be disposed at the side or rear portion of the through hole 1214A. In addition, a plurality of the slits 1214Ab may be formed in the through hole 1214A in accordance with the number of conducting portions 1224.

A chair according to the present embodiment has been described above by taking a vehicle seat (conveyance seat) as an example. Although the chair according to the present embodiment is not particularly limited insofar as the seating portion has a sensor member, a pad member, and a skin material, it is preferable that the chair is a conveyance seat mounted in a conveyance. Using the chair according to the present embodiment, a sensor member can be appropriately disposed even in the case of a conveyance seat mounted in a space-limited conveyance.

The use of the chair according to the present embodiment is not particularly limited insofar as the seating portion has a sensor member, a pad member, and a skin material. For example, the chair of the present invention can also be used as an office chair for indoor and non-conveyance use.

According to the chair of the present invention, a recess accommodating a connector is provided at an end portion of the seating portion avoiding the position where the load from the seated occupant is applied, the recess is covered with a skin member, and thus a decline in seating comfort attributable to the connector is suppressed and detachment of the connector is suppressed.

In addition, according to the chair of the present invention, a bulging portion raised to the seating surface side is provided with the recess, and thus the connector is stably accommodated in the recess.

In addition, according to the chair of the present invention, the connector is accommodated in the recess of the bulging portion formed at the rear end portion of a buttock support portion, and thus a decline in seating comfort attributable to the connector is suppressed.

In addition, according to the chair of the present invention, the connector accommodated in the recess is supported from below by a protrusion, and thus the connector is accommodated in the recess in a more stable manner.

In addition, according to the chair of the present invention, the width of the protrusion is small, and thus affecting the routing of a conducting portion can be suppressed and the conducting portion can be disposed appropriately.

In addition, according to the chair of the present invention, although the conducting portion of the sensor member may bend in a Z shape depending on the position of a through hole of the pad member, the fixability of the conducting portion in the through hole is improved by disposing the conducting portion in the slit of the through hole.

In addition, according to the chair of the present invention, it is easy to dispose the conducting portion of the sensor member in the slit.

In addition, according to the chair of the present invention, the conducting portion extending from a detection unit disposed at the seating part can be disposed in the slit and guided rearward.

In addition, according to the chair of the present invention, the pad member sandwiches the conducting portion of the sensor member from the front to back direction in the slit, and thus the sensor member can be fixed appropriately.

In addition, according to the chair of the present invention, the sensor member can be appropriately disposed even in the case of a conveyance seat mounted in a space-limited conveyance.

REFERENCE SIGNS LIST

1: Seat frame
2: Pivot shaft

3: Slide mechanism
4: Height adjustment mechanism
10: Seat cushion frame
11: Cushion side frame
12: Pan frame
13: Rear pipe
14: Elastic spring
20, 20B: Seat back frame
21: Back side frame
22: Upper frame
23: Lower frame
24: Horizontal connecting frame
25: Vertical connecting frame
26: Wire member
27: Pillar attachment member
30, 30A: Shoulder support
31: Shoulder support plate
32: Shoulder fluid bag (first movable body)
32A: Inside shoulder fluid bag
32B: Outside shoulder fluid bag
32*a*: First shoulder fluid bag
32*b*: Second shoulder fluid bag
32*c*: Third shoulder fluid bag
33: Attachment member
34: Biasing member
34*a*: Plate
34*b*: Pivot shaft
34*c*: Fluid bag
35: Lumbar support
36: Lumbar support plate
37: Lumbar fluid bag (second movable body)
40: Weight sensor
41: Vehicle speed sensor
42: Steering angle sensor
43: Pressure sensor
44: Inflation pressure sensor
45: Pivoting angle sensor
50: ECU (control device)
51: Acquisition unit
52: Determination unit
53: Drive unit
55: Actuator
56: Electromagnetic valve
57: Heater
58: Vibration imparting device
S1: Vehicle seat (conveyance seat)
S11: Seat cushion
S11*a*: Seat cushion pad
S11*b*: Skin material
S12: Seat back
S12*a*: Seat back pad
S12*b*: Skin material
S13: Headrest
S13*a*: Headrest pad
S13*b*: Skin material
S13*c*: Pillar
201: Seat frame
202: Pivot shaft
210: Seat cushion frame
220: Seat back frame
221: Back side frame
221*a*: Lower side frame
221*b*: Connecting frame (upper side frame)
222: Upper frame
222*a*: Vertical portion (upper side frame)
222*b*: Horizontal portion (upper frame)
223: Lower frame

224: Horizontal connecting frame
225: Vertical connecting frame
226: Wire member
227: Center folding shaft
228: Long hole
230: Shoulder support (shoulder support portion)
235: Lumbar support (lumbar support portion)
245: Pivoting angle sensor
246: Center folding angle sensor
250: ECU
251: Acquisition unit
252: Determination unit
253: Drive unit
260: Drive mechanism
261: Actuator
261*a*: Ascending and descending rod
262: Link member
263: First connecting member
264: Second connecting member
320: Seat back frame
321: Back side frame
322: Upper frame
323: Lower frame
323*a*: Attachment hole
324: Horizontal connecting frame
324*a*: Lower flange
324*b*: Support hole
330: Shoulder support
332: Shoulder fluid bag
335: Lumbar support
350: ECU
360: Support device
361: Pressure receiving member
361*a*: Middle portion
361*b*: Side portion
361*c*: Attachment hook
362: Support member
363: Support wire
364: Upper fixing plate
364*a*: Upper fixing plate main body
364*b*: Horizontal support pipe
364*c*: Vertical support pipe
365: Guide wire
366: Lower fixing plate
366*a*: Projection
366*b*: Through hole
367: First movable plate
367*a*: Guided portion
368: Second movable plate
368*a*: Guided portion
369: Third movable plate
369*a*: Guided portion
370: Lifting and lowering mechanism
371: Screw shaft
371*a*: First screw shaft
371*b*: Second screw shaft
371*c*: Third screw shaft
372: Motor
372*a*: First motor
372*b*: Second motor
372*c*: Third motor
373: Transmission member
373*a*: First transmission member
373*b*: Second transmission member
373*c*: Third transmission member
374: Fixing member
374*a*: First upper fixing member

374*b*: First lower fixing member
374*c*: Second upper fixing member
374*d*: Third upper fixing member
420: Seat back frame
421: Back side frame
422: Upper frame
423: Lower frame
424: Pressure receiving member
424*a*: Upper portion
424*b*: Middle portion
424*c*: Lower portion
425: Support wire
430: Shoulder support
435: Lumbar support
460: Side support
462: Side fluid bag (third movable body)
S401: Vehicle seat (conveyance seat)
S411: Seat cushion
S412: Seat back
S412*b*: Skin material
S413: Headrest
510: Seat cushion frame
511: Cushion side frame
512: Pan frame
513: Front pipe
514: Rear pipe
520: Pressure receiving member
521: Wire
522: Front pressure receiving plate
523: Middle pressure receiving plate
523*b*: Through hole
523*c*: Slit
524: Rear pressure receiving plate
524*b*: Main body portion
524*c*: Inclined portion
524*d*: Rib
524*e*: Through hole
530: Support member
531: First part
532: Second part
533: Third part
534: Fourth part
535: Connecting portion
540: Thigh fluid bag
550: ECU
610: Seat cushion frame
640: Thigh fluid bag
710: Seat cushion frame
740: Biasing member
741: Torsion spring
742: Support plate
743: Thigh fluid bag
744: Elastic rotating body
744*a*: Protruding portion
750: ECU
810: Seat cushion frame
811: Cushion side frame
812: Fixed pan frame
812*a*: Side member
812*b*: Front member
812*c*: Plate-shaped portion
812*e*: Front wall
812*f*: Rear wall
812*g*: Side wall
812*h*: Bottom wall
812*k*: Box body
812*l*: Reinforcement portion 812*m*: Rear flange
813: Movable pan frame
813*a*: Upper plate
813*b*: Front plate
813*c*: Pressure receiving plate
813*d*: Long hole
813*e*: Fixing portion
814: Front pipe
815: Rear pipe
816: Fastening member
820: Length adjustment mechanism
821: First actuator
821*a*: First fluid bag
822: Second actuator
822*a*: Second fluid bag
823: Compressor
824: First control valve
825: First connecting pipe
826: Second control valve
827: Second connecting pipe
828: Operating switch
850: ECU
911: Seat cushion pad
912: Pad main body
912*a*: Middle portion
912*b*: Side portion
912*c*: Cover attachment portion
912*d*: First engaging portion
912*e*: Second engaging portion
920: First cover member
920*a*: Engaged portion
920*b*: Ventilation hole
921: Second cover member
921*a*: Engaged portion
921*b*: Seating sensor attachment portion
930: Skin material
941: Ventilation path
942: Inlet
943: Outlet
945: Seating sensor
946: Control circuit
947: Harness
960: Fluid bag
960*a*: Thigh fluid bag
960*b*: Lumbar fluid bag
960*c*: Side fluid bag
S901: Vehicle seat (conveyance seat)
S911: Seat cushion
S912: Seat back
S913: Headrest
1010: Seat cushion frame
1046: External sensor
1047: Collision sensor
1050: ECU
1051: Acquisition unit
1052: Determination unit
1052*a*: Collision prediction unit
1052*b*: Collision determination unit
1060: Fluid bag
1061: Buttock fluid bag
1062: Thigh fluid bag
1063: Lumbar fluid bag
1064: Side fluid bag
1070: Airbag device
1071: Airbag main body
1071*a*: Front portion
1071*b*: Rear portion 1072: Inner bag
1072*a*: Discharge hole
1073: Gas generating device
S1001: Vehicle seat (conveyance seat)
S1011: Seat cushion
S1011*a*: Seat cushion pad
S1011*b*: Skin material
S1012: Seat back
S1013: Headrest
1120: Pad
1130: Skin material
1131: Quilting pattern
1132: Protrusion
1133: Recess
1140: Fluid bag
1141: First fluid bag
1142: Second fluid bag
S1101: Vehicle seat (conveyance seat)
S1111: Seat cushion
S1112: Seat back
S1113: Headrest
1210, 1210A: Seat cushion pad (pad member)
1210*a*: Front surface
1210*b*: Back surface
1211: Front end portion (first end portion)
1212, 1212A: Rear end portion (second end portion, end portion)
1212*a*: Bulging portion
1212*b*: Recess
1212*c*: Protrusion
1213: Side end portion
1214, 1214A: Through hole
1214Aa: Connector insertion portion
1214Ab: Slit
1220: Sensor member
1221: Detection unit
1222: External output unit
1223: Connector
1224: Conducting portion (harness, wiring member)
1224*a*: First bent portion
1224*b*: Second bent portion
1230: Trim cover (skin material)
S1201: Vehicle seat (conveyance seat)
S1211: Seat cushion (seating portion)
S1212: Seat back (seating portion)
S1213: Headrest

The invention claimed is:

1. A conveyance seat, comprising:
a seat back frame;
a skin material covering the seat back frame;
a movable body arranged between the seat back frame and the skin material and protruding forward with respect to the seat back frame; and
a control device controlling movement of the movable body, wherein
the movable body has
right and left first movable bodies arranged at upper parts of the seat back frame, and
a second movable body arranged below the first movable bodies in the seat back frame,
each of the first movable bodies is a shoulder movable body configured to support a shoulder of a seated occupant, the shoulder movable body including an inflatable and deflatable shoulder fluid bag,
the second movable body is a lumbar movable body configured to support a waist of the seated occupant, the lumbar movable body including an inflatable and deflatable lumbar fluid bag, and the control device:

acquires pressure signals related to pressure applied to the shoulder fluid bag and the lumbar fluid bag, determines a seating posture of the seated occupant by comparing determination conditions for determining the sitting posture of the seated occupant with the pressure signals, and based on a determination result of the seating posture, inflates one of the shoulder fluid bag and the lumbar fluid bag that corresponds to a part of the seated occupant that is bent forward in the seating posture, and deflates the other of the shoulder fluid bag and the lumbar fluid bag based on an amount of inflation of the one of the shoulder fluid bag and the lumbar fluid bag.

2. The conveyance seat according to claim 1, wherein the control device performs control based on the pressure signal so as to limit the amount of protrusion of the bag body.

3. The conveyance seat according to claim 1, wherein the control device acquires a steering angle signal related to a steering angle of a conveyance and controls the amount of protrusion of the movable body in real time based on the steering angle signal.

4. The conveyance seat according to claim 1, wherein the first movable bodies have inside first movable bodies arranged on both the right and left sides of the seat back frame in the seat width direction and right and left outside first movable bodies arranged at positions outside the inside first movable bodies in the seat width direction.

5. The conveyance seat according to claim 1, wherein the seat back frame has right and left lower side frames extending in the up to down direction, right and left upper side frames attached to respective upper end portions of the right and left lower side frames and pivotable in the front to back direction with respect to the lower side frames, and an upper frame connecting the upper side frames, and at least a portion of the first movable body is arranged at a position between the right and left upper side frames in the seat width direction.

6. The conveyance seat according to claim 5, comprising a seat cushion frame, wherein the seat back frame is attached to a rear end portion of the seat cushion frame and is pivotable in the front to back direction with respect to the seat cushion frame, and the control device acquires a first pivoting angle signal related to a pivoting angle of the seat back frame with respect to the seat cushion frame and a second pivoting angle signal related to a pivoting angle of the upper side frame with respect to the lower side frame and controls the amount of protrusion of the movable body based on the first pivoting angle signal and the second pivoting angle signal.

7. The conveyance seat according to claim 1, comprising a lifting and lowering mechanism supporting the first movable body to be capable of ascending and descending in the up to down direction with respect to the seat back frame.

8. The conveyance seat according to claim 7, wherein the lifting and lowering mechanism supports the second movable body to be capable of ascending and descending in the up to down direction with respect to the seat back frame, and the control device controls the lifting and lowering mechanism so as to lift and lower the first movable body to correspond to a position of the second movable body in the up to down direction.

9. The conveyance seat according to claim 1, wherein the movable body has right and left third movable bodies arranged at positions between the first and second movable bodies in the up to down direction of the seat back frame, the third movable body has a plurality of inflatable and deflatable bag bodies, and the plurality of bag bodies are stacked, have mutually different sizes, and are disposed in mutually different directions.

10. The conveyance seat according to claim 1, wherein the control device inflates the shoulder fluid bag and deflates the lumbar fluid bag in a case where it is determined that the seating posture of the seated occupant is stooped back.

11. The conveyance seat according to claim 1, wherein the control device inflates the lumbar fluid bag and deflates the shoulder fluid bag in a case where it is determined that the seating posture of the seated occupant is curved back.

* * * * *